United States Patent
Yu et al.

(10) Patent No.: US 9,197,478 B2
(45) Date of Patent: Nov. 24, 2015

(54) METHOD AND RECEIVER FOR RECEIVING A COMPOSITE SIGNAL

(71) Applicant: DEERE & COMPANY, Moline, IL (US)

(72) Inventors: Wei Yu, Torrance, CA (US); Richard G Keegan, Palo Verde Estates, CA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/310,775

(22) Filed: Jun. 20, 2014

(65) Prior Publication Data
US 2015/0200800 A1 Jul. 16, 2015

Related U.S. Application Data

(60) Provisional application No. 61/925,752, filed on Jan. 10, 2014.

(51) Int. Cl.
*H03D 1/00* (2006.01)
*H04L 27/26* (2006.01)

(52) U.S. Cl.
CPC .................................. *H04L 27/2663* (2013.01)

(58) Field of Classification Search
CPC .... H04L 7/042; H04L 7/2662; H04B 1/7093; H04B 1/75809; H04B 1/7085; H04B 2201/70715
USPC .......... 375/343, 130, 131, 142, 150; 341/118, 341/120, 155
See application file for complete search history.

(56) References Cited

U.S. PATENT DOCUMENTS

| | | | |
|---|---|---|---|
| 6,603,803 B1 | 8/2003 | Hatch | |
| 7,555,033 B2 | 6/2009 | Lillo et al. | |
| 7,616,678 B2 * | 11/2009 | Cangiani et al. | ............... 375/146 |
| 7,706,429 B2 | 4/2010 | Chen et al. | |
| 7,948,929 B1 | 5/2011 | Gilmour et al. | |
| 7,949,038 B2 | 5/2011 | Avellone et al. | |
| 8,374,223 B2 | 2/2013 | Chen et al. | |
| 8,781,039 B2 * | 7/2014 | Keegan | ........................ 375/343 |
| 2005/0270997 A1 | 12/2005 | Julien et al. | |
| 2005/0281325 A1 | 12/2005 | Lillo et al. | |

(Continued)

FOREIGN PATENT DOCUMENTS

| | | |
|---|---|---|
| EP | 2012488 A1 | 1/2009 |
| WO | 2009030772 A2 | 3/2009 |

OTHER PUBLICATIONS

Chen, K.C., Frequency Estimation, National Taiwan University, 2008 [online] [retrieved on Jul. 24, 2014]. Retrieved from the Internet <http://santos.ee.ntu.edu.tw/mobile2008/2a%20Frequency%20Estimation.pdf>.

(Continued)

*Primary Examiner* — Khai Tran

(57) ABSTRACT

A data processor selects a set of BOC correlations in accordance with a BOC correlation function for the sampling period if the primary amplitude exceeds or equals the secondary amplitude for the sampling period. An electronic data processor determines whether the receiver is operating in a steady-state mode by evaluating the detected primary amplitude. The data processor selects and/or processes a set of BOC correlations for the sampling period to track a carrier of the received composite signal if the receiver is operating in the steady-state mode. In one embodiment, the data processor forms a first code error using the selected BOC correlations with a first chip spacing to drive the code tracking.

13 Claims, 35 Drawing Sheets

(56) References Cited

U.S. PATENT DOCUMENTS

| | | |
|---|---|---|
| 2008/0069187 A1 | 3/2008 | Chen et al. |
| 2008/0262726 A1 | 10/2008 | Hoult |
| 2009/0092038 A1 | 4/2009 | Mujtaba et al. |
| 2009/0207891 A1 | 8/2009 | Pon |
| 2010/0104046 A1 | 4/2010 | Hodgart et al. |
| 2010/0135364 A1 | 6/2010 | Hodgart |
| 2011/0309978 A1 | 12/2011 | Matsumoto |

OTHER PUBLICATIONS

Ward, Philip W. and Lillo, Walter E. Ambiguity Removal Method for any GNSS Binary Offset Carrier (BOC) Modulation, Institute of Navigation 2009 International Technical Meeting proceedings, Jan. 2009, Anaheim, CA.

Ward, Philip W. A Design Technique to Remove the Correlation Ambiguity in Binary Offset Carrier (BOC) Spread Spectrum Signals, Institute of Navigation 2004 International Technical Meeting proceedings, Jan. 2004, San Diego, CA.

Dempster, Andrew G. and Wu, Jinghui. New Code Discriminator for Multiplexed Binary Offset Carrier (MBOC) Modulated Signals, School of Surveying and Spatial Information Systems, University of New South Wales, 2008, Sydney, Australia.

Wu, Jinghui and Dempster, Andrew G. Applying a BOC-PRN discriminator to Cosine phased BOC(fs,fc) Modulation, School of Surveying and Spatial Information Systems, University of New South Wales, 2009, Sydney, Australia.

Van Dierendonck, A. J. Theory and Performance of Narrow Correlator Spacing in a GPS Receiver. Navigation: Journal of the Institute of Navigation, vol. 39, No. 3, Fall 1992.

Hein, Guenter W.; Avila-Rodriguez, Jose-Angel; Wallner, Stefan; Pratt, Anthony T.; Owen, John; Issler, Jean-Luc; Betz, John W.; Hegarty, Chris J.; Lenahan, Sean; Rushanan, Joseph J.; Kraay, Andrea L.; and Stansell, Thomas A. MBOC: The New Optimized Spreading Modulation Recommended for GALILEO L1 OS and GPS L1C, 2006, Institute of Electrical and Electronics Engineers.

Kaplan, Elliot D. and Hegarty, Christopher C. "Satellite Signal Acquisition, Tracking, and Data Demodulation" in: Understanding GPS Principles and Applications (Boston, Artech House Publishers, 2006), pp. 153-241. G109.5K36 2006.

Lee, Euihyoung; Lee, Chulho; Yoo, Seungsoo; Kim, Sun Yong; and Yoon, Seokho. A Novel Time Delay Estimation Bias Reduction Scheme using Maximum Slope Change in GNSS, The 9th International Conference of Advanced Communication Technology, Feb. 2007, Phoenix Park, South Korea [online] [retrieved on Jul. 28, 2014]. Retrieved from the Internet <http://ieeexplore.ieee.org/stamp/stamp.jsp?tp=&arnumber=4195612>.

Wu, Jinghui and Dempster, Andrew G. The "BOC-Gated-PRN", A Multipath Mitigation Technique for BOC (n, n) Waveforms, School of Surveying and Spatial Information Systems, University of New South Wales, 2008, Sydney, Australia.

Benedetto, F. et al. "Effective Code Acquisition of Galileo Boc Signals," 2011 International Conference on Localization and GNSS (ICL-GNSS), Institute of Electrical and Electronics Engineers , pp. 1-6, Jun. 29-30, 2011.

Hodgart, M.S. et al. "Double Estimator a New Receiver Principle for Tracking BOC Signals," InsideGNSS.com, Spring 2008 [online] [retrieved 2015-02-18]. Retrieved from the Internet: <http://www.insidegnss.com/node/622>.

The International Search Report and Written Opinion of the International Searching Authority, issued in application No. PCT/US2014/057681, dated Jan. 2, 2015 (7 pages).

International Search Report and Written Opinion of the International Searching Authority, issued in related application No. PCT/US2014/057669, dated Jun. 25, 2015 (10 pages).

\* cited by examiner

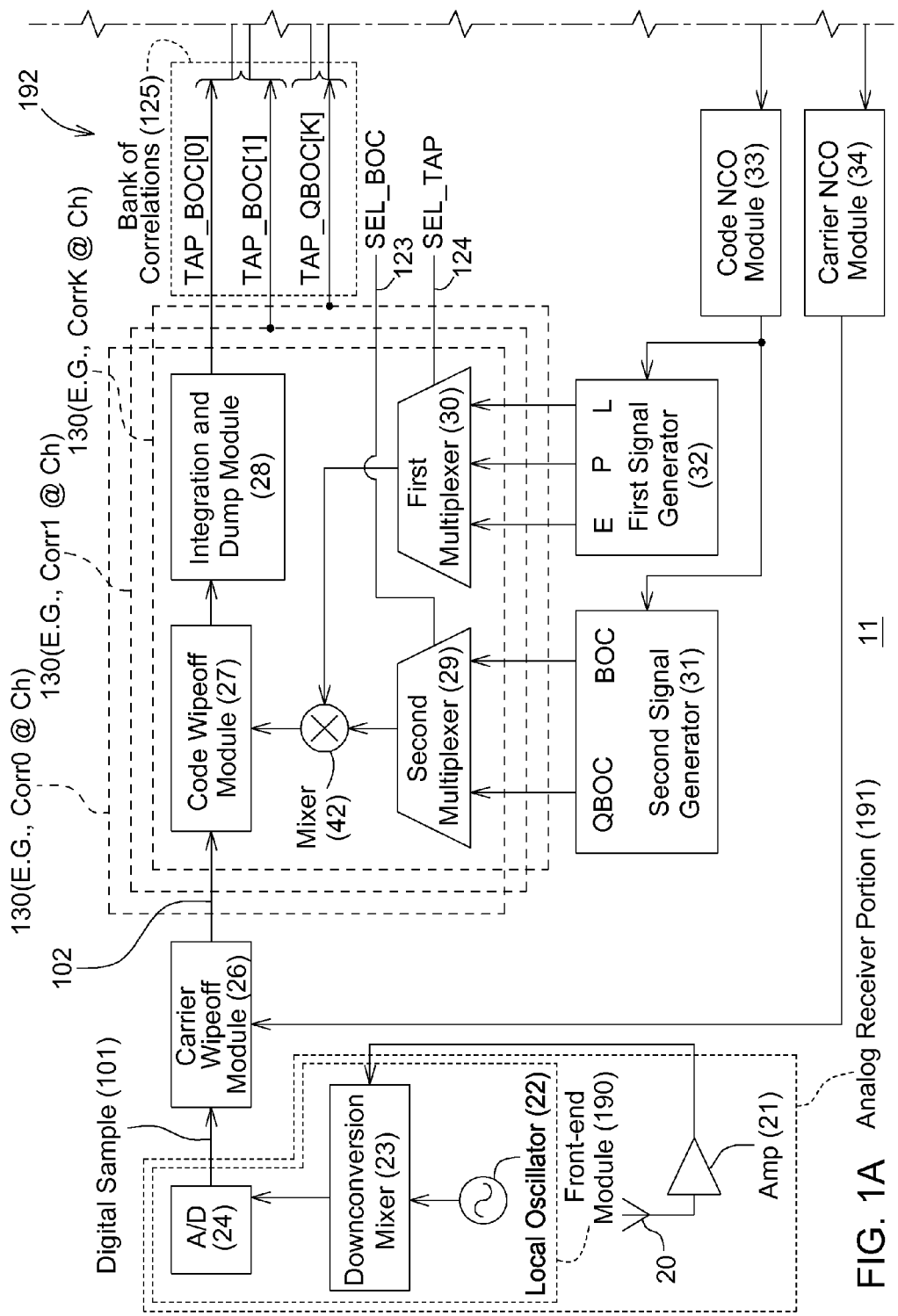
FIG. 1A  Analog Receiver Portion (191)

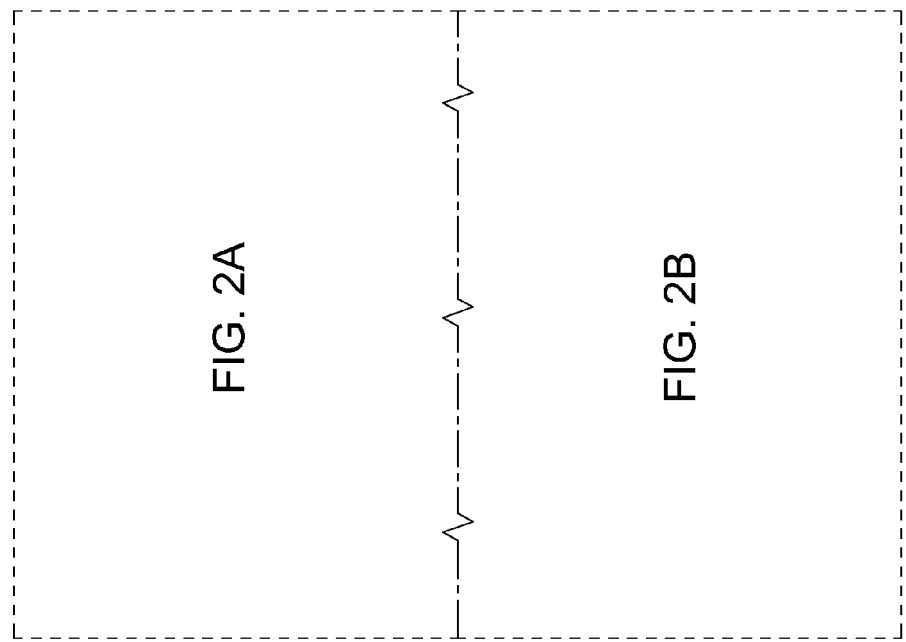

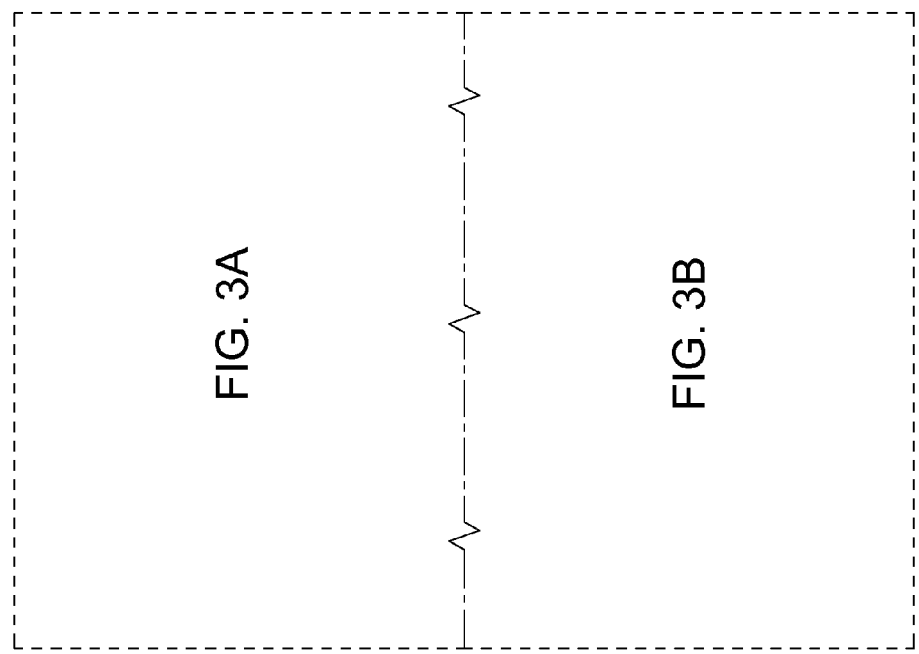

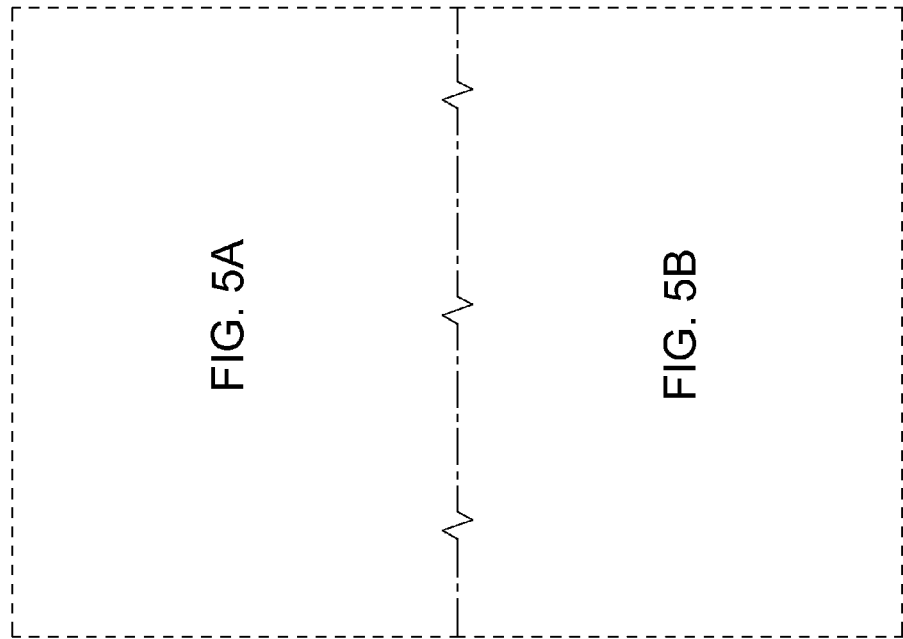

FIG. 7B-1
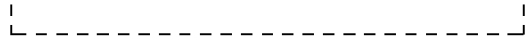
FIG. 7B-2
FIG. 7B

```
S700
```

RECEIVE A COMPOSITE SIGNAL, COMPRISING BINARY OFFSET CARRIER (BOC) MODULATED SIGNALS, TO EXTRACT A BOC COMPONENT BY COMBINING WITH A LOCAL BOC REPLICA, AND TO DERIVE A QUADRATURE BOC (QBOC) COMPONENT BY COMBINING WITH A LOCAL QBOC REPLICA. THE BOC COMPONENT COMPRISING AN IN-PHASE BOC COMPONENT AND A QUADRATURE-PHASE BOC COMPONENT, THE QBOC COMPONENT COMPRISING IN-PHASE QBOC COMPONENT AND A QUADRATURE-PHASE QBOC COMPONENT.

S702

DETECT A PRIMARY AMPLITUDE OF THE BOC COMPONENT.

S704

DETECT A SECONDARY AMPLITUDE OF THE QBOC COMPONENT.

S716

IS A RECEIVER (E.G., ONE OR MORE RECEIVER CHANNELS) IN A STEADY STATE MODE? — YES

S706 ↓ NO

DOES THE PRIMARY AMPLITUDE EXCEEDS THE SECONDARY AMPLITUDE FOR A SAMPLING PERIOD? — NO

S708 ↓ YES

SELECT A SET OF BOC CORRELATIONS IN ACCORDANCE WITH A BOC CORRELATION FUNCTION FOR THE SAMPLING PERIOD.

S710

SELECT A SET OF QBOC CORRELATIONS IN ACCORDANCE WITH A QBOC CORRELATION FUNCTION FOR THE SAMPLING PERIOD.

S812

DETERMINE A FIRST CARRIER FREQUENCY ERROR IN ACCORDANCE WITH A DOT-PRODUCT FREQUENCY ERROR FUNCTION USING THE PROMPT BOC CORRELATION AND THE PROMPT BOC CORRELATION AT PREVIOUS EPOCH.

DETERMINE A FIRST CARRIER PHASE ERROR IN ACCORDANCE WITH A DOT-PRODUCT PHASE ERROR FUNCTION USING THE PROMPT BOC CORRELATION.

FIG. 7D-1

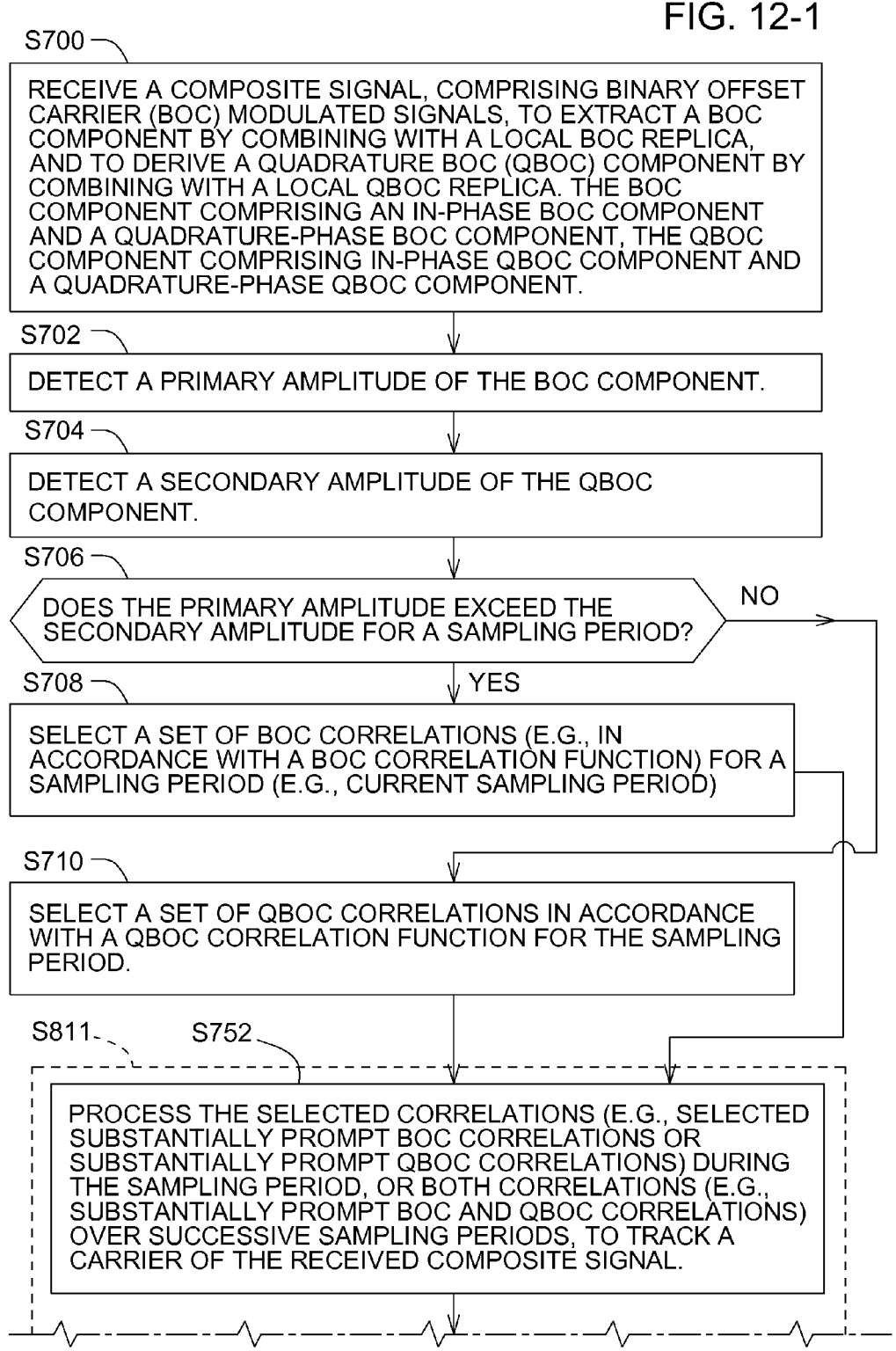

FIG. 13-1
FIG. 13-2
FIG. 13

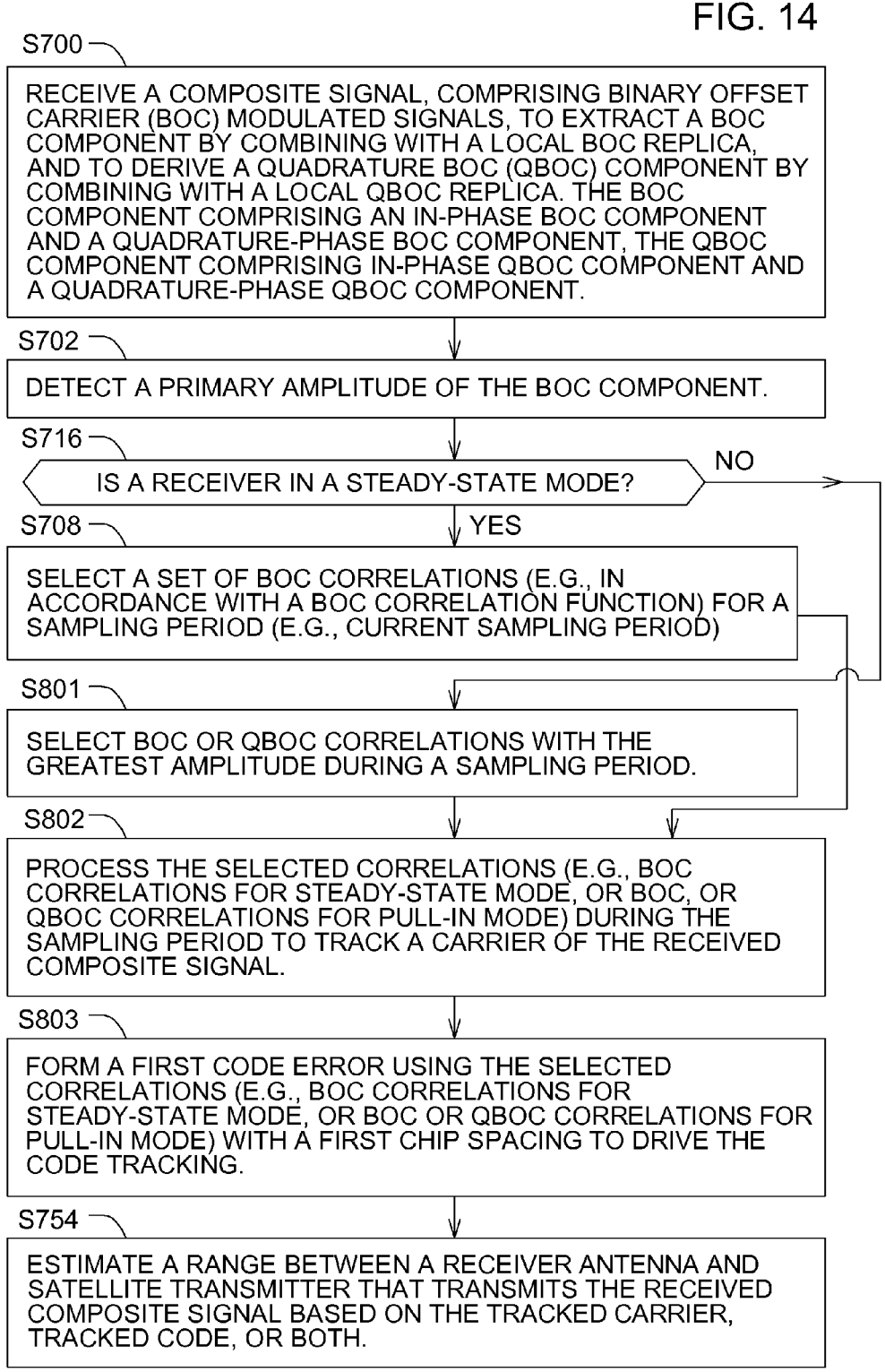

US 9,197,478 B2

METHOD AND RECEIVER FOR RECEIVING A COMPOSITE SIGNAL

RELATED APPLICATION

This document (including the drawings) claims priority and the benefit of the filing date based on U.S. provisional application No. 61/925,752, filed Jan. 10, 2014 under 35 U.S.C. §119 (e), where the provisional application is hereby incorporated by reference herein.

FIELD OF THE INVENTION

This invention relates to a method and receiver for receiving a composite signal.

BACKGROUND

A transmitter of a navigation satellite might transmit a composite signal such as a multiplexed binary offset carrier signal or a binary offset carrier (BOC) signal. In certain prior art, the receiver may lock on a false zero crossing point of a discriminator function that results in a synchronization error, reduced reliability in decoding, or instability of the demodulator in demodulating the composite signal. Thus, there is a need for a method and receiver with an unambiguous correlation function for reducing or minimizing phase synchronization error to the received signal.

SUMMARY OF THE INVENTION

In one embodiment, a method or receiver for receiving a received composite signal comprises receiving a composite signal, which comprises binary offset carrier (BOC) modulated signal, to extract a BOC component by combining the received signal with a local BOC replica, and to derive a quadrature BOC (QBOC) component by combining the received signal with a local QBOC replica. The BOC component comprises an in-phase BOC component and a quadrature-phase BOC component; the QBOC component comprises in-phase QBOC component and a quadrature-phase QBOC component. A first detector detects a primary amplitude of the BOC component. An electronic data processor determines whether the receiver is operating in a steady-state mode by evaluating the detected primary amplitude. The data processor selects and/or processes a set of BOC correlations for the sampling period to track a carrier of the received composite signal if the receiver is operating in the steady-state mode. In one embodiment, the data processor forms a first code error using the selected BOC correlations with a first chip spacing to drive the code tracking. The data processor estimates a range between range between a receiver antenna and a satellite transmitter that transmits the received composite signal (e.g., based on the tracked code, tracked carrier, or both).

BRIEF DESCRIPTION OF THE DRAWINGS

FIG. 1 includes FIG. 1A and FIG. 1B, collectively.

FIG. 2 includes FIG. 2A and FIG. 2B, collectively.

FIG. 3 includes FIG. 3A and FIG. 3B, collectively.

FIG. 5 includes FIG. 5A and FIG. 5B, collectively.

FIG. 14 is still another embodiment of a method for receiving a composite signal.

DESCRIPTION OF THE PREFERRED EMBODIMENT

Figures 1, 1A, 1B:
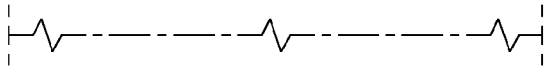
FIG. 1 is a block diagram of one embodiment of a receiver for receiving a received composite signal that comprises a binary offset carrier (BOC) modulated signal.
Figure 1B:
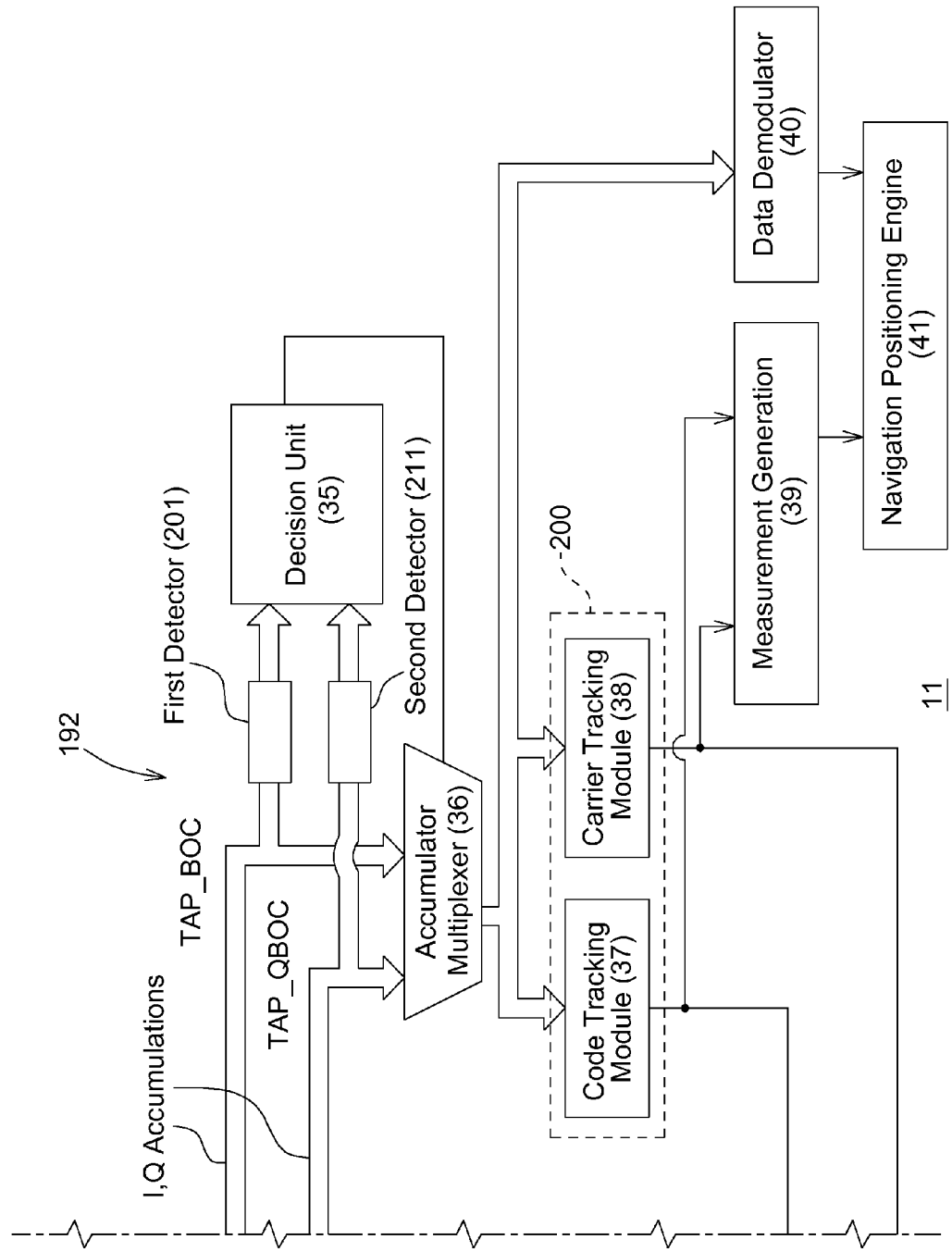

In accordance with one embodiment, FIG. 1 (collectively FIG. 1A and FIG. 1B) discloses a system or receiver 11 (e.g., satellite navigation receiver) capable of reliable and expedient code (CD) and carrier (CR) pull-in for received composite signals, such as a binary offset carrier (BOC) signal. As used in this document, "CD" shall refer to code and "CR" shall refer to the carrier of the received signal or a digital representation of one or more samples of the received signal. The code comprises a modulating code (e.g., pseudo-random noise code modulated with information) that modulates the carrier. "I" shall refer to an in-phase signal, whereas "Q" shall refer to a quadrature phase signal. The receiver 11 receives a composite signal that comprises one or more BOC modulated signals. The received composite signal is transmitted from one or more satellites, such as a navigation satellite, or such as a Galileo-compatible navigation satellite or Global Positioning System (GPS) satellite.

In any of the above referenced drawings of this document, any arrow or line that connects any blocks, components, modules, multiplexers, memory, data storage, accumulators, data processors, electronic components, oscillators, signal generators, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components. In one embodiment, the system, method and receiver 11 disclosed in this document may comprise a computer-implemented system, method or receiver 11 in which one or more data processors process, store, retrieve, and otherwise manipulate data via data buses and one or more data storage devices (e.g., accumulators or memory) as described in this document and the accompanying drawings.

As used in this document, "configured to, adapted to, or arranged to" mean that the data processor or receiver 11 is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in FIG. 1 and/or any other drawing in this disclosure. Alternately, separately from or cumulatively with the above definition, "configured to, adapted to, or arranged to" can mean that the receiver 11 comprises one or more components described herein as software modules, equivalent electronic hardware modules, or both to execute any referenced functions, mathematical operations, calculations, determinations, processes, methods, algorithms, subroutine.

As used in this document, the BOC signal may include one or more of the following types of signals: a BOC signal represented by a binary sine function, a quadrature-phase BOC (QBOC) represented by a binary cosine function, a time-division multiplexed BOC (TMBOC) signal (e.g., an L1C signal of a GPS system), an alternative BOC (AltBOC) signal (e.g.; E5A and E5B signal on Galileo system), or a composite BOC (cBOC, e.g., an E1B or E1C signal on Galileo system) signal. A simple BOC signal is denoted as BOC (m, n) where m is $f_m/f_c$ and n is $f_n/f_c$, $f_m$ is a first subcarrier frequency, $f_n$ is the actual chip frequency, and $f_c$ is the reference chipping rate of 1.023 MHz or another suitable chipping rate.

In one embodiment, the receiver 11 comprises an analog receiver portion 191 coupled to a digital receiver portion 192. The analog receiver portion 191 comprises an antenna 20, an amplifier 21 and a receiver front end 190. The digital receiver portion 192 includes that portion of the receiver that processes data after the analog-to-digital conversion by the analog-to-digital converter (ADC or A/D) 24. For example, the digital receiver portion 192 can comprise an electronic data processor, a data storage device (e.g., electronic memory) and a data bus for communication between the electronic data processor and the data storage device, where software instructions and data are stored in the data storage device and executed by the data processor to implement any of the blocks, components or modules (e.g., electronic modules, software modules, or both) illustrated in FIG. 1. The receiver 11 may comprise a location-determining receiver for: (a) determining a location of a receiver antenna 20, (b) a range-determining receiver for determining a range or distance between the receiver antenna 20 and a satellite (e.g., satellite antenna) or (c) determining ranges between the receiver antenna 20 and one or more satellites.

In one embodiment, a receiver front end 190 receives an amplified composite signal (e.g., from the amplifier 21). In turn, the receiver front end 190 is coupled to an analog-to-digital converter 24. The receiver front end 190 comprises a downconversion mixer 23 and a local oscillator 22. For example, the amplifier 21 comprises radio frequency (RF) or microwave amplifier (e.g., low noise amplifier) that is coupled to the antenna 20 for receiving the composite signal or received signal that is transmitted from one or more satellites. The amplifier 21 provides an amplified signal to the downconversion mixer 23 as a first input. The local oscillator 22 provides a signal to the downconversion mixer 23 as a second input. The downconversion mixer moves the signal spectrum of the received signal from RF to an intermediate frequency (IF) or baseband frequency. The downconversion system may include multiple mixing, amplifying, and filtering stages, although only one stage is shown in FIG. 1A.

The output of the downconversion mixer 23 or the output of the receiver front end 190 is coupled to an analog-to-digital converter (ADC) 24. The ADC 24 converts the analog intermediate frequency signal or analog baseband signal to a digital signal. The digital signal comprises one or more digital samples that are available at a sampling rate. Each sample has a finite quantization level and each sample is capable of being processed by an electronic data processing system or digital receiver portion 192.

The digital signal outputted by the ADC 24 is fed into a carrier wipe-off module 26. In one embodiment, the carrier wipe-off module 26 converts the digital samples of digital signal 101 to an exact baseband digital signal 102 representation by removing the residual CR frequency. The carrier NCO module 34 provides a local estimation of CR phase to each digital sample 101, which is used to remove the residual CR frequency and phase in the sample 101.

In one configuration, the a digital signal 101 inputted into the carrier wipe-off module 26 comprises a digital signal with a residual frequency component (e.g., residual carrier radio frequency component) such that the carrier wipe-off module 26 produces exact digital baseband signals 102 for input into a correlator module 130. An output of the carrier wipe-off module 26 is fed into a bank or set of correlators or correlator modules 130. In one embodiment, there is at least one correlator or correlator module 130 per received channel or carrier of the composite received signal, where each satellite within a set of satellites may transmit at least one channel or carrier. An example of correlator module 130 may comprise a code wipe-off module 27 and an integration-and-dump module 28.

In one embodiment, in the receiver 11 a correlator module 130 comprises a CD correlator; where their multiple outputs are used to synchronize the local CD phase, CR frequency, and CR phase estimation with the received samples. For example, each correlator module 130 comprises one or more of the following modules: a CD wipe-off module 27, an integration-and-dump module 28, a multiplier or mixer 42, and one or more multiplexers (29, 30). As used in this document, a module may comprise hardware, software, or both. In one embodiment, each correlator module 130 maximizes a correlation between the received signal with a locally generated code by synchronizing the locally generated CD phase with the CD phase in digital sample or digital signal (101 or 102). Further, multiple locally generated CD signals (e.g., early, prompt and late CD signals) are used to form a corresponding CD misalignment signal using various discriminator functions.

A first signal generator 32 generates a locally generated replica of a pseudo random noise code, a pseudo noise (PN)

code sequence, or the like. The first signal generator 32 has multiple outputs that are offset in time or phase with respect to each other. As illustrated, the first signal generator 32 has an early output, a prompt output and a late output, which are inputted to a first multiplexer 30 associated with the code correlator module 130. "E," "P," and "L" shall mean early, prompt and late, respectively. The early output provides an early PN code that is advanced against the current estimated code phase by a known time period (e.g., one chip); the prompt output provides a prompt PN code that reflects the current estimated code phase; the late output provides a late PN code that is delayed in time with respect to the prompt PN code by a known time period (e.g., one chip). If correlations are available between the received signal and the early, prompt and late variants of the locally generated replica of the received signal, the receiver 11 may adjust the phase and time delay (e.g., via shift registers) of the locally generated replica in an attempt to maximize correlation, for example.

In one embodiment, the first signal generator 32 may comprise any generator for generating a spread spectrum code, spread spectrum sequence, binary sequences, Gold codes, PN code, a pseudo-random noise code sequence, or a PN code that is similar to a spread spectrum code, spread spectrum sequence, binary sequences, Gold codes, pseudo-random noise code, pseudo-random noise code sequence, or a PN code transmitted by a transmitter of a satellite for reception by the receiver 11 as the composite received signal. In another embodiment, the first signal generator 32 may be formed of series of shift registers that are loaded with an initial starting code sequence, where the shift registers have various selectable or controllable taps for providing feedback and reiterative values as the output.

A second signal generator 31 (e.g., BOC/QBOC generator) generates a local replica of a BOC and QBOC waveform. The first multiplexer 30 and the second multiplexer 29 may be referred to as the first selector and the second selector. The first selector (30) selects a time period or chip, in terms of chip phase, either advancing, synchronizing, or delaying the received sample (101 or 102); the second selector (29) picks either the BOC or QBOC waveform, whose output is mixed with the selected PN chip sequence to generate either BOC-PN replica or QBOC-PN replica for received sample 101.

The first signal generator 32 and the second signal generator 31 provides output signals to one or more correlator modules 130 (e.g. code correlators). The first multiplexer 30 and the second multiplexer 29 each have a select input (123, 124) to select which mux input terminal is routed to a mux output terminal for the multiplexers (29, 30), where the select input can be determined by the decision unit 35 as explained in detail later. The mux output terminals are fed into the multiplier or code mixer 42 to create a locally generated replica of either BOC-PN or QBOC-PN signal for correlation to the received composite sample (101 or 102). The output of the multiplexer or code mixer 42 is provided to the code wipe-off module 27 to remove BOC-PN or QBOC-PN modulation from the received signal (101 or 102). The three versions of PN code by the first signal generator 32 can interact with the two versions of squared waveform BOC or QBOC from the second signal generator 31 to produce various permutations of local replica signals to generate different correlations through the integration-and-dump module 28. A bank of correlations 159 is used for decoding, demodulating, CD and CR phase tracking.

Here, the code wipe-off module 27, together with integration-and-dump module 28, produces correlations or correlation values between the received signal and the locally generated BOC-PN component to generate BOC I vector data, BOC Q vector data; the code wipe-off module 27 produces correlations or correlation values between the received signal and the locally generated QBOC-PN component to generate QBOC I vector data, QBOC Q vector data. In one configuration, the BOC correlations are associated with a BOC correlation function, whereas the QBOC correlations are associated with a QBOC correlation function.

A decision unit 35 or electronic data processor decides whether: (a) to generate the BOC I vector data and BOC Q vector data for any given time interval or sampling period, where the BOC correlation function is used to demodulate the received signal for the sampling period; or (b) to generate the QBOC I vector data and the QBOC Q vector data for any given time interval or sampling period, where the QBOC correlation function is used to demodulate the received signal for the sampling period. A first detector 201 (e.g., first signal envelope/amplitude detector) and a second detector 211 (e.g., second signal envelope/amplitude detector) provide primary amplitude and secondary amplitude data for the received I and Q vector data to the decision unit 35 or data processor.

At the antenna 20, the received composite signal can have the total signal power or total signal energy divided between the BOC component or QBOC component of the signal, where a greater primary amplitude than a second amplitude indicates that a majority of the total signal power is in the BOC component during any sampling interval (e.g., sampling epoch); a greater secondary amplitude than primary amplitude indicates that a majority of total signal power is in the QBOC component during any sampling interval. The data processor or decision unit 35 selects (e.g., via the first and second multiplexers 29, 30) a set of BOC correlations in accordance with a BOC correlation function for the sampling period if the primary amplitude exceeds the secondary amplitude for the sampling period. The data processor or decision unit 35 selects a set of QBOC correlations in accordance with a QBOC correlation function for the sampling period if the secondary amplitude exceeds the primary amplitude for the sampling period.

In general, the data processor or correlator module 130, at every sampling epoch or sampling period, uses either BOC correlation function or the QBOC correlation function, whichever retains more energy, to support unambiguous CD pull in of the received signal by eliminating the false zero-crossing points of the discriminator S-curve. Such amplitude-driven selection is named as decision-directed selection (DDSel). An epoch means a specific instant in time of a navigation satellite system or the time interval during which the receiver 11 measures the carrier phase at a corresponding frequency or rate. In the digital receiver portion 192, the data processor, at every sampling epoch, can also use multiple BOC correlation with different chip spacing to eliminating the false zero-crossing points of its discriminator S-curve. One or more false maxima or local maxima of a correlation function may result in the false zero-crossing points on the discriminator S-curve. If more than one zero-crossing point is present in the discriminator S-curve, the zero-crossing points can present ambiguity to detecting the maximum correlation.

Figure 8:
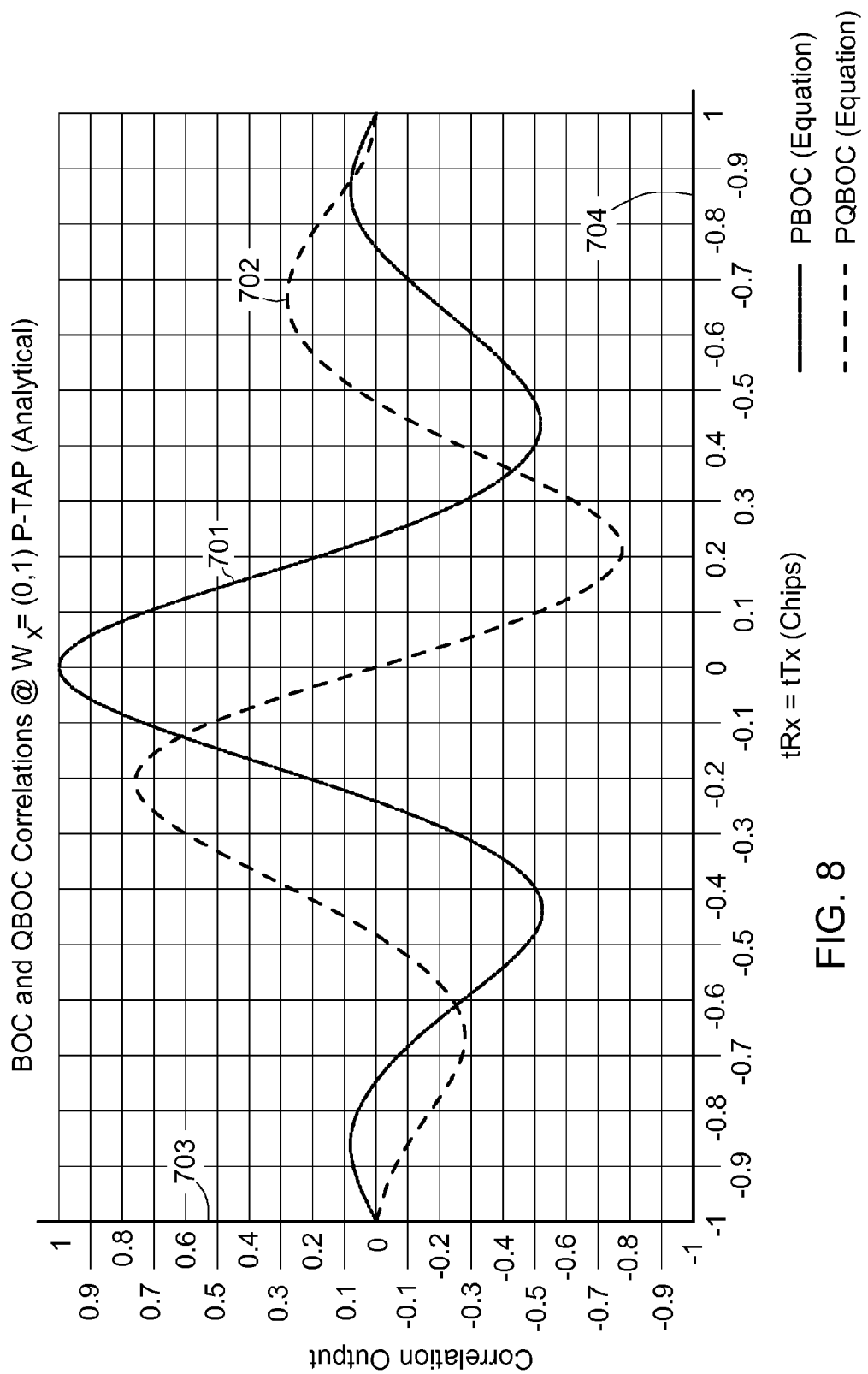
FIG. 8 is a graph of a BOC correlation function (e.g., for a BOC(1,1) signal) and QBOC correlation function (e.g., for a QBOC(1,1) signal) using a closed-formula representation.

In one embodiment, in the digital receiver portion 192 the data processor forms the correlation function by selecting the greater amplitude, either the primary amplitude derived from BOC component or the secondary amplitude derived from QBOC component. The resultant DDSel amplitude estimation, FIG. 9, eliminates all the zero-crossing points, within +/−1 chips, being present on either BOC or QBOC correlation functions as shown by FIG. 8.

The decision unit 35 selects either the BOC correlations (including BOC I vector data, BOC Q vector data) or QBOC correlations (including, QBOC I vector data and QBOC Q vector data) for use in the position measurement, position estimation, or attitude estimation (e.g., tilt, roll and yaw angle) and for tracking of the code and carrier of the received composite signal. For example, the decision unit 35 controls the first multiplexer 30 (e.g., first selector), the second multiplexer (e.g., second selector) or both to form BOC correlations, QBOC correlations, or both that are aligned with or track the composite received signal for each carrier or channel.

Figure 7A:
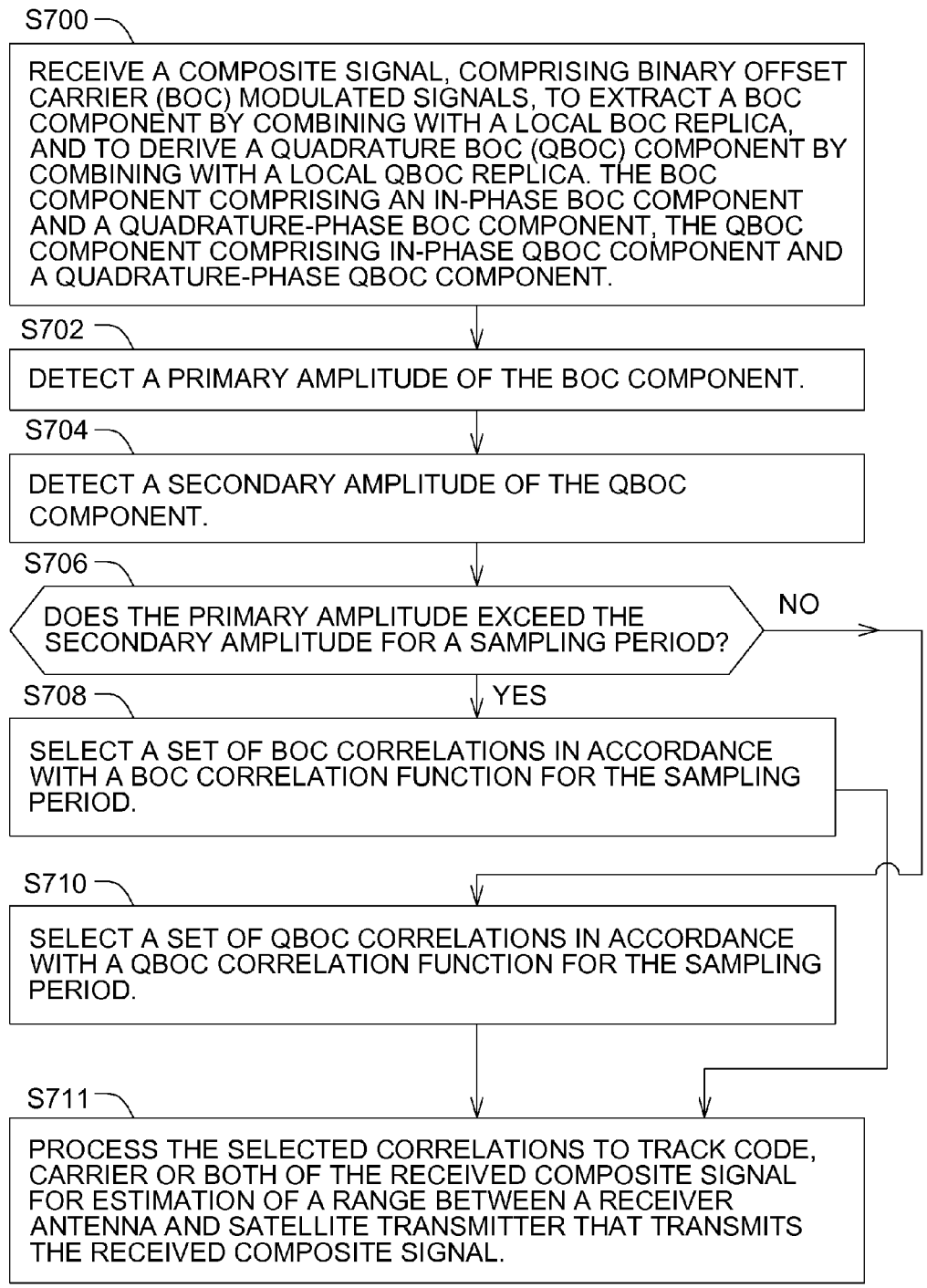
FIG. 7A is a flow chart of one embodiment of a method for demodulating a received composite signal that comprises a binary offset carrier (BOC) modulated signal.
Figures 1, 7B:
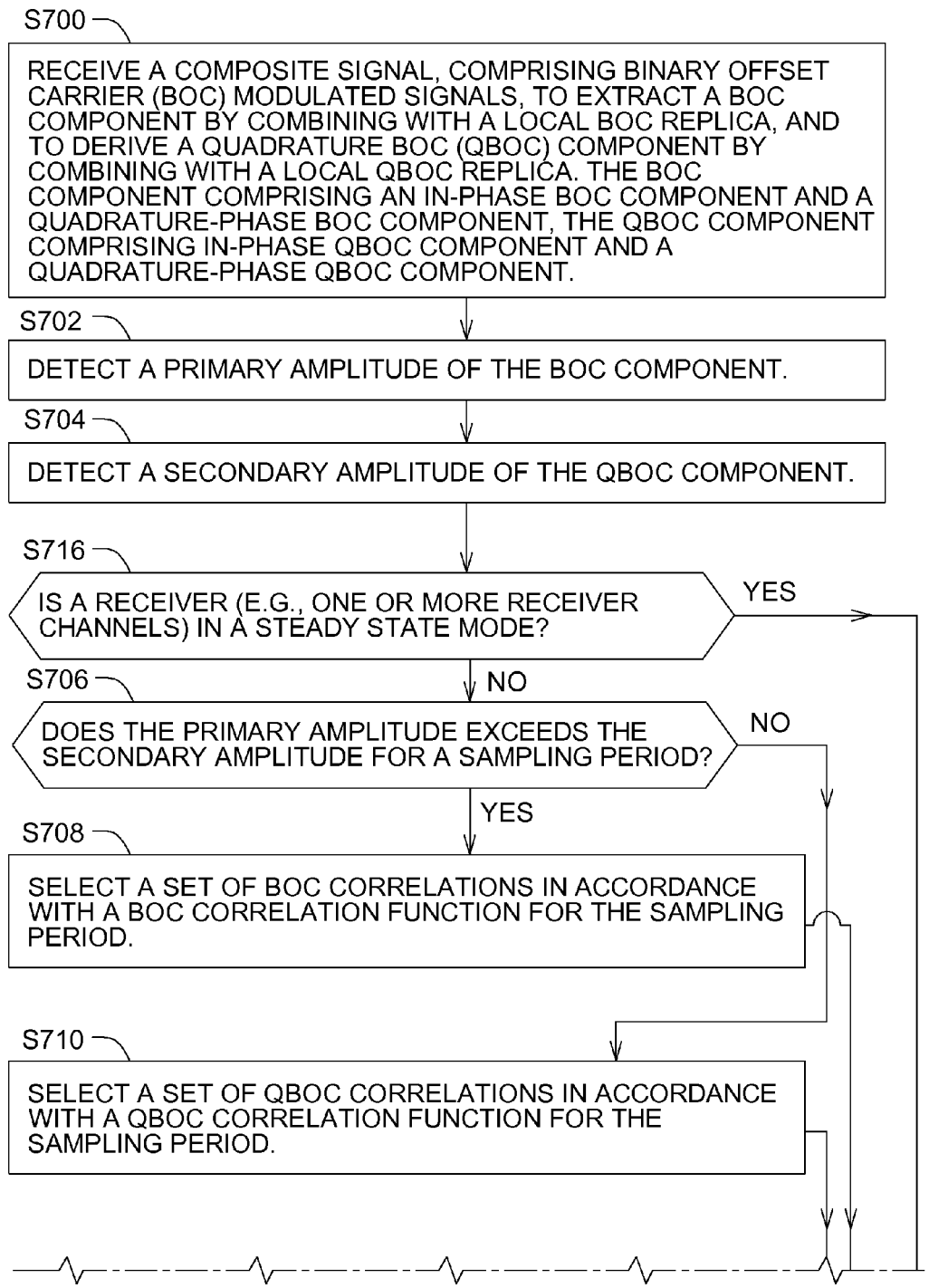
FIG. 7B (collectively FIG. 7B-1 and FIG. 7B-2) is a flow chart of another embodiment of a method for demodulating a received composite signal that comprises a binary offset carrier (BOC) modulated signal.
Figures 2, 7B:
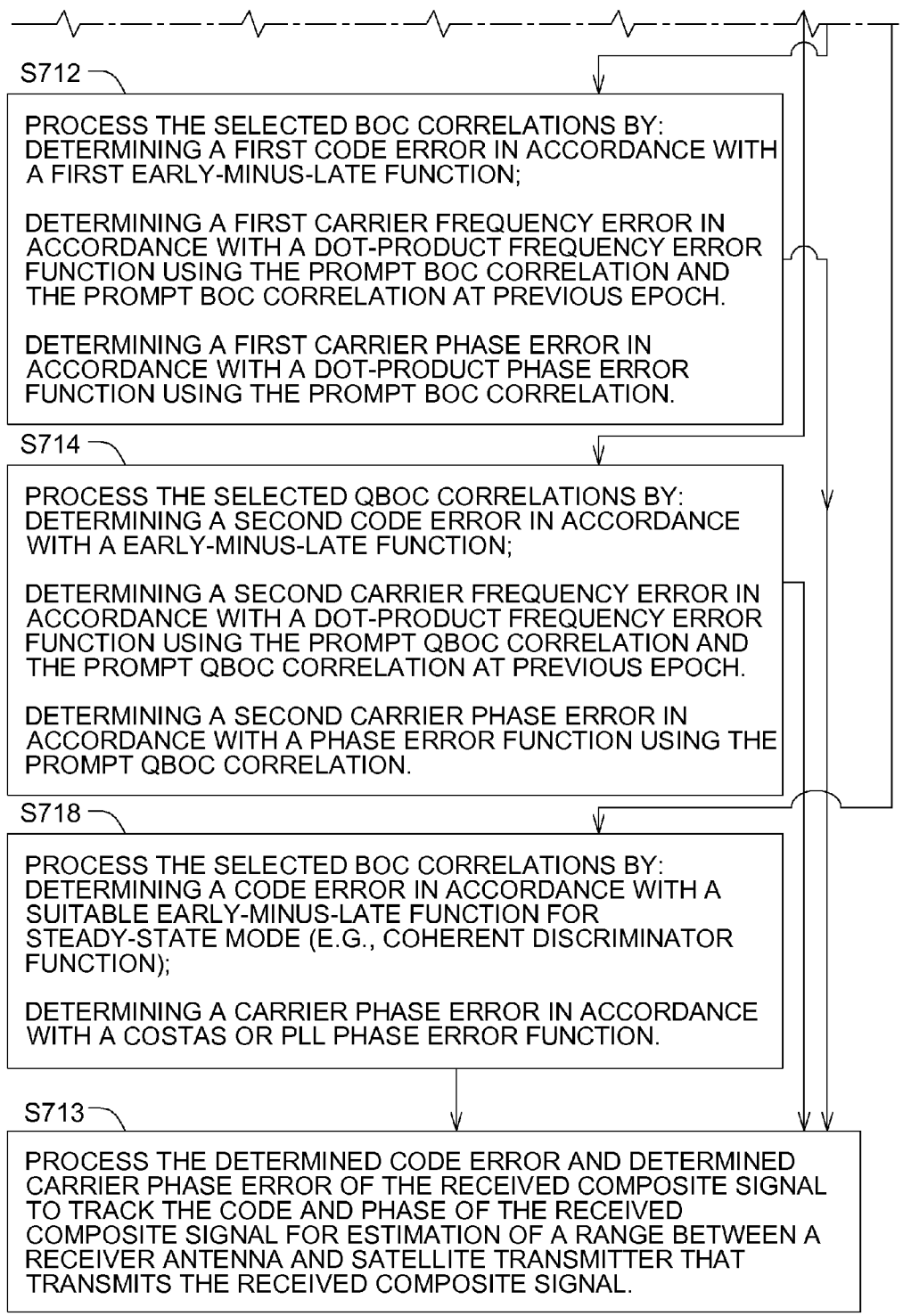

The CR tracking module 38 and CD tracking module 37 are collectively referred to as the tracking module 200 in FIG. 1 and FIG. 2. The tracking module 200 supports measurement of the CR frequency, CR phase, and CD phase (e.g., individually or collectively, measurement data) of the received signals to control one or more locally generated reference signals with respect to corresponding received signals (derived from the composite received signal) to maximize correlation of the corresponding received signals to the respective locally generated reference signals. In one embodiment, there are multiple received signals because the receiver 11 receives four received signals from at least four different satellite transmitters to estimate the position of the receiver antenna 20. For example, the CD tracking module 37 or CR tracking module 38 can generate measurement data that the data processor or receiver uses to control an adjustable time delay (e.g., route data through known number or sequence of shift registers), or engage in other data processing of one or more digital signals associated with a locally generated reference signal with respect to the received signal to maximize correlation of each received signal to the corresponding locally generated reference signal.

In one embodiment, the carrier tracking module 38 may comprise one or more of the following: a CR measurement module, a CR phase counter, a frequency detector, and a phase detector. For example, the CR phase counter counts both the number of integer cycles plus the fractional cycles of the received CR during a known time period and a phase detector that measures the fractional CR phase of the received CR at an instantaneous time or sampling interval within the known time period to synchronize the receiver's CR phase with the observed or measured CR phase of the received signal.

In certain embodiments, the code tracking module 37 is arranged for generating a control signal, a clock signal, or shifting an adjustable time delay of the locally generated reference CD signal with respect to the digital received signal in response based on maximizing correlation of the received signal to the locally generated reference code signal.

In one embodiment, the tracking module 200 and corresponding NCO's (33, 34) are collectively adapted to shift an adjustable time delay of one or more locally generated reference signals with respect to the digital received composite signal (or its CD and CR components) in response to control data, measurement data, or both provided by the tracking loop signal processor of the tracking module 200 based on maximizing correlation of the received composite signal (or its code and carrier components) to the locally generated reference signal.

A carrier tracking module 38 facilitates alignment of the phase of the locally generated replica of the CR to the received signal. The carrier tracking module 38 provides control data or a control signal to a carrier numerically controlled oscillator (NCO) module 34 to adjust the locally generated replica signal of the CR produced by carrier NCO module 34. In one embodiment, the carrier NCO module 34 provides the locally generated replica of the carrier to the carrier wipe-off module 26. The carrier NCO module 34 may receive an input reference clock signal and output an adjusted clock signal or another control signal for generating the locally generated CR frequency that accurately aligns with the CR phase or the residual carrier phase of received sample (101 or 102).

The code tracking module 37 facilitates alignment of the phase of the locally generated BOC-PN or QBOC-PN replica with respect to the received sample (101 or 102). The CD tracking module 37 provides control data or a control signal to adjust a code numerically controlled oscillator (NCO) module 33, where the code NCO module 33 controls the chipping rate of the first signal generator 32 and a binary sine or cosine waveform using the second signal generator 31. The code tracking module 37, which normally comprises a delay locked loop (DLL), generates a control signal to tune the chipping rate of code NCO module 33. The CD phase, output of code NCO module 33, is used to drive the first signal generator 32 (e.g., PN sequence generator) and the second signal generator 31 (e.g., BOC/QBOC generator). Multiple local PN sequences are generated by the first signal generator 32; the local PN waveform either advances, synchronizes, or delays its phase against the CD phase of the received sample 101.

The code mixer 42 mixes or multiplies the output of the first multiplexer 30 and the second multiplexer 29. The first output of the first multiplexer 30 may comprise an early PN code, a prompt PN code, or a late PN code. The second output of the second multiplexer 29 may comprise a locally generated BOC signal or a QBOC signal. The first multiplexer 30 has first inputs that are coupled to output of an early PN code, a prompt PN code, or a late PN code. The second multiplexer 29 has second inputs that are coupled to a BOC generator, a QBOC generator, or the combination of a BOC/QBOC generator.

The data demodulator 40 provides satellite navigation data for estimating a range (e.g., distance between a satellite and the antenna 20) or a position (e.g., in two or three dimensional coordinates) of phase center of the antenna 20. The satellite navigation data or other signal information may comprise one or more of the following information that modulates the baseband waveform of the received signal: date, satellite navigation system time, satellite status, orbital data, ephemeris data, almanac, satellite location, and satellite identifier. The data demodulator may use phase shift keying, phase demodulation, pulse width demodulation, amplitude demodulation, quadrature amplitude demodulation, or other demodulation technique that is consistent with the modulation by the modulator at the satellite transmitter.

In one embodiment, the data demodulator 40 outputs a demodulated signal or demodulated encoded data, such as a demodulated digital signal with a quadrature phase component and in-phase component at baseband. The data may comprise one or more following information such as date, satellite navigation system time, satellite status, orbital data, ephemeris data, almanac, satellite location, and satellite identifier.

In one embodiment, the measurement generation module 39 measures the propagation time between transmission of a satellite signal from a certain satellite to the receiver antenna 20 and converts the propagation time into a distance or range proportional to the speed of light. The measurement generation module 39 determines a range, pseudo-range or estimated range between the receiver antenna 20 and four or more satellites with a reliable signal quality or signal strength based upon one or more of the following: (a) the measured CD phase of each received signal, and (b) the measured CR phase of each received signal. In one embodiment, the measurement generation module 39 may resolve ambiguities in the measured CR phase of the received signal by searching for a solution that is consistent with one or more of the following: (1) a position estimated from decoding the code portion of the signal, (2) known reference position of the receiver antenna 20, and (3) differential correction data applicable to the received signal. Further, the measurement generation module 39 may be associated with a wireless receiver (e.g., satellite receiver, mobile transceiver, or cellular transceiver) that receives navigation correction data from a reference satellite navigation receiver to reduce or eliminate sources of bias or error (e.g., certain clock errors or propagation errors) in the CR phase measurements.

The navigation positioning engine 41 determines the position estimate of the receiver antenna 20 based on the measured CR phases, estimated ranges of the measurement generation module 39 and demodulated data. For example, the positioning engine 41 may use ranges from four or more satellites to determine the position, velocity, or acceleration of the antenna 20 of the receiver in two or three dimensions.

In the digital receiver portion 192, the receiver 11 or its data processing system may comprise hardware and software instructions. For example, in one illustrative embodiment the hardware comprises a data processor that communicates to a data storage device, which stores software instructions, via one or more data buses.

In the digital receiver portion 192, as used throughout the document the data processor may comprise one or more of the following: an electronic data processor, a microprocessor, a microcontroller, an application specific integrated circuit (ASIC), digital signal processor (DSP), a programmable logic device, an arithmetic logic unit, or another electronic data processing device. In the digital receiver portion 192, the data storage device may comprise electronic memory, registers, shift registers, volatile electronic memory, a magnetic storage device, an optical storage device, or any other device for storing data. The data processor may be coupled to the data storage device via one or more data buses, which support communication between the data processor and the data storage device. As used herein the, data processor may refer to one or more components or modules of the digital receiver portion 192, including by not limited to any of the following: the carrier wipeoff module 26, the code wipeoff module 27, the integration-and-dump module 28, correlator module 130, mixer 42, second multiplexer 29, first multiplexer 30, first signal generator 32, second signal generator 31, first detector 201, second detector 211, decision unit 35, accumulator multiplexer 36, code tracking module 37, carrier tracking module 38, measurement generation module 39, data demodulator 40, and navigation positioning engine 41.

In general, the digital receiver portion 192 comprises computer or an electronic data processing system that comprises an electronic data processor, digital logic circuits, multiplexers, multipliers, digital filters, integrators, delay circuits, oscillator, signal generator, PN code sequence generator, registers, shift registers, logic gates, or other hardware. The electronic data processing system may support storage, retrieval and execution of software instructions stored in a data storage device.

In one embodiment, the digital receiver portion 192 or electronic data processing system is capable of extracting a BOC component from the composite received signal by combining the received composite signal with a local BOC-PN replica (e.g., at the output node of code mixer 42). The digital receiver portion 192 is capable of deriving a QBOC component by combining with a local QBOC-PN replica (e.g., at the output node of the code mixer 42). The BOC component comprises an in-phase BOC component and a quadrature-phase BOC component, the QBOC component comprising in-phase QBOC component and a quadrature-phase QBOC component. The digital receiver portion 192 advantageously decides whether to select the local BOC-PN replica or the local QBOC-PN replica to generate the CD and CR control signal to CD tracking module 37 and CR tracking module 38. Such selection minimizes false locks that might otherwise occur with respect to a correlation function associated solely with a BOC early minus late (EML) error function or a QBOC correlation EML function. For example, a BOC EML error function comprises an early BOC correlation and corresponding late BOC correlation for a same sampling period or epoch; QBOC EML function comprises an early QBOC correlation and corresponding QBOC correlation for a common sampling period or epoch.

Figure 2A:
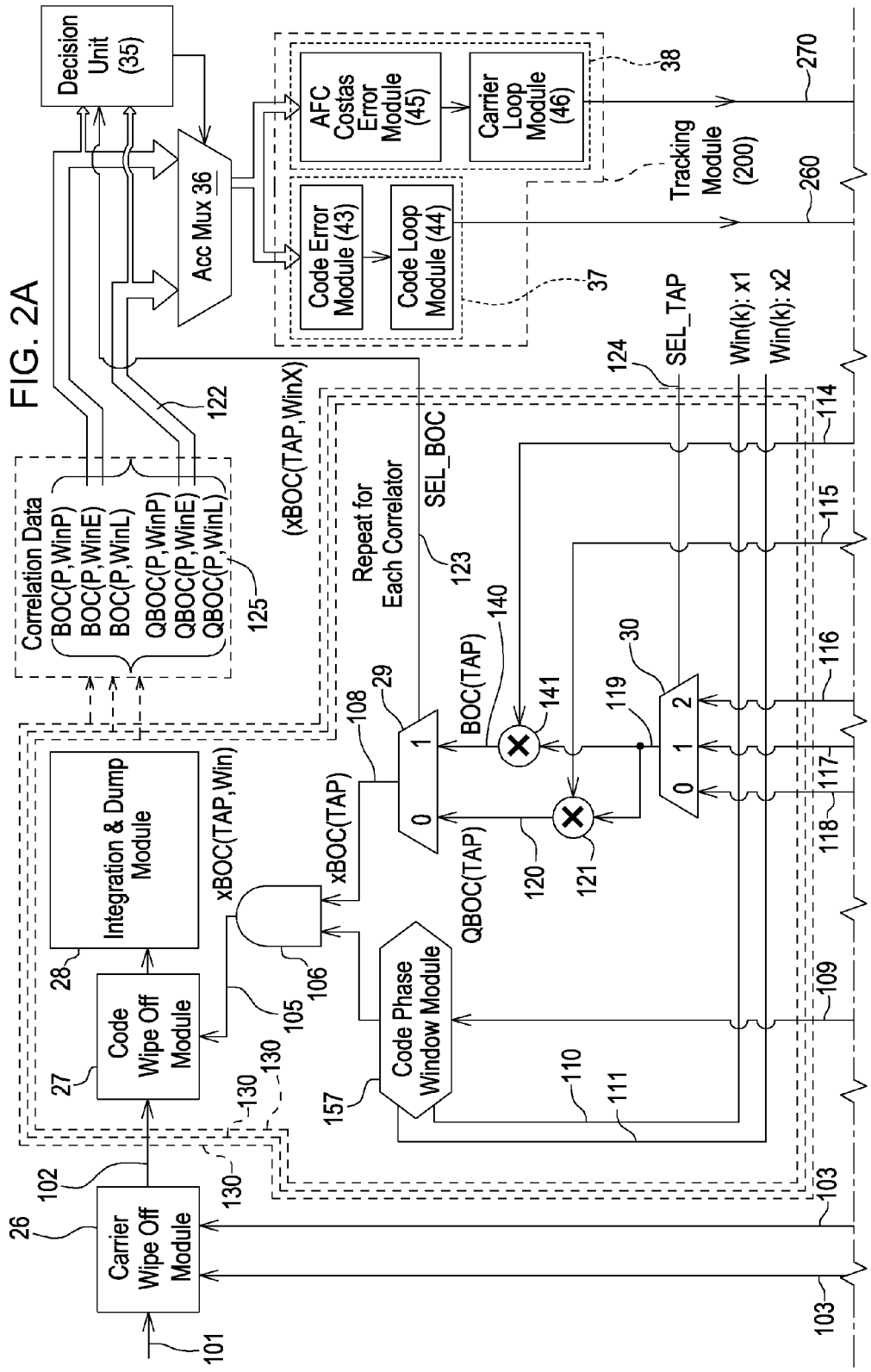
FIG. 2 is a block diagram of the digital section of the receiver of FIG. 1 in greater detail than FIG. 1.
Figure 2B:
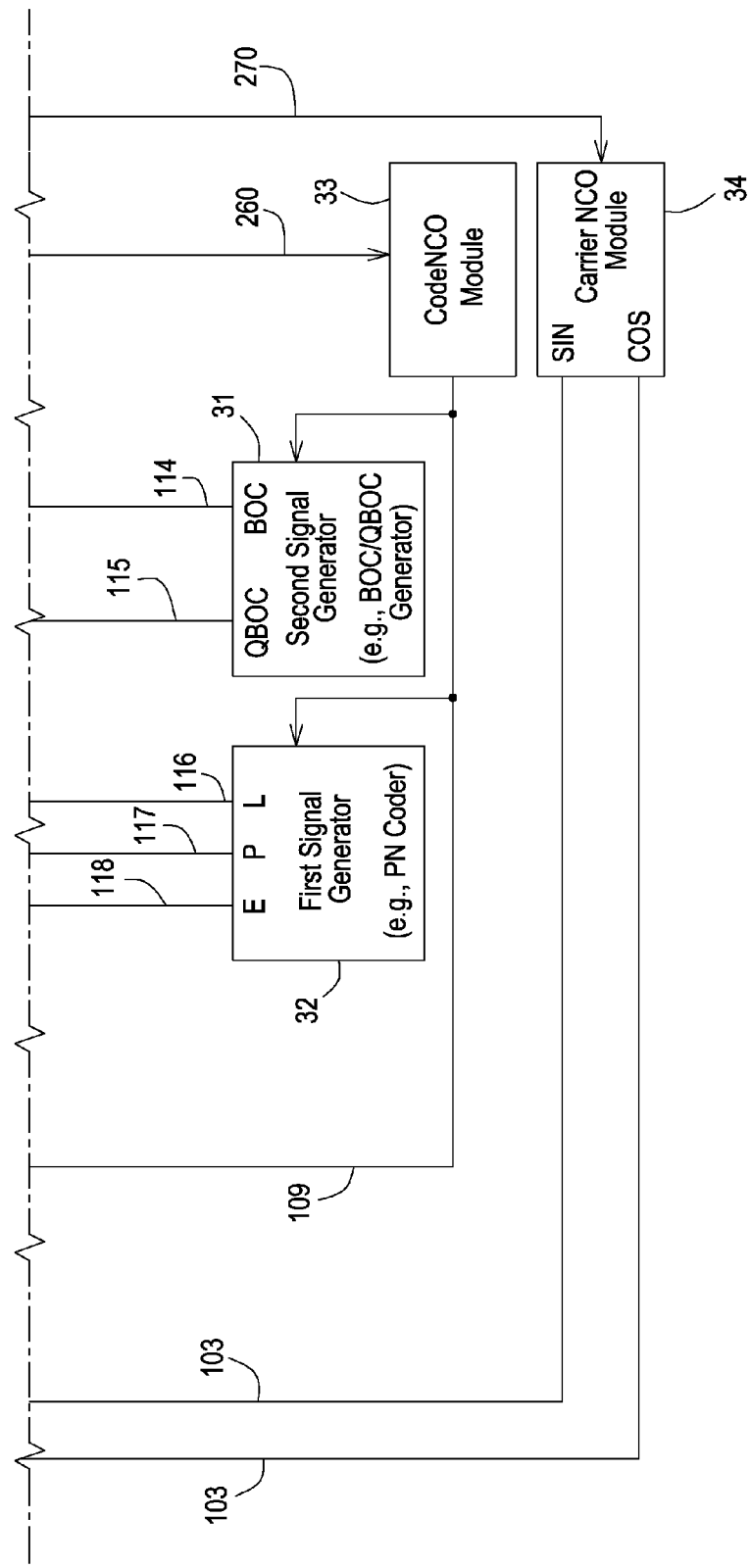

FIG. 2A and FIG. 2B are collectively referred to as FIG. 2. FIG. 2 illustrates one possible realization of the digital receiver portion 192 or digital processing section of the receiver 11 in greater detail than FIG. 1. Like reference numbers in FIG. 1 and FIG. 2 indicate like elements.

FIG. 2 illustrates an example of the realization of one or more correlators (130) of a channel using a window correlation technique (e.g., WinCorr). Here, the WinCorr technique provides a flexible resolution to observe any section (e.g., fraction or window) of a chip. As illustrated, the digital received sample 101, with residual frequency, from the ADC 24 is inputted to the CR wipe-off module 26 at a suitable sampling rate (e.g., at least in the MHZ range). The CR wipe-off module 26 mixes the digital received sample with local CR replica 103. For example, the CR wipe-off module 26 mixes the digital received sample with a synchronized CR carrier replica 103 through a digital CR phase rotator to wipe off the carrier. The output of the CR wipe-off module 26 is inputted to a set of correlator modules 130, such that each received channel (e.g., each modulated carrier) is assigned (dynamically or statically) at least one correlator module 130. Each correlator module 130 may comprise at least a code wipe-off module 27 and an integration-and-dump module 28.

In one embodiment, the set of the correlator modules 130 despreads the PN code and generates a group of accumulation products or correlation data 125 at millisecond or multi millisecond rates for CR tracking and CD tracking by the tracking module 200. The correlation data 125 (e.g., correlations or accumulation products) are stored in a data storage device associated with the digital receiver portion 192 of the receiver 11. Although FIG. 2 shows three correlator modules 130 as dashed rectangular blocks, any number of correlator modules 130 can be used. For example, a BOC group of correlator modules 130, a QBOC group of correlator modules 130, or both can be used for each received channel to produce a corresponding early, late or prompt correlation or accumulation for each received channel, where illustrative possible permutations of the correlation data 125 are within correlation data block 125 in FIG. 2. The correlation data 125 can be generally characterized in accordance with the representation of xBOC(TAP,WinX), where xBOC specifies a BOC or QBOC correlation, WinX specifies an early (E), prompt (P) or late (L) correlation, and TAP indicates a particular tap or output of a respective correlator module 130.

The first signal generator 32 and the second signal generator 31 provide input data to one or more correlator modules 130. The first signal generator 32 (e.g., PN coder) provides the early (E), punctual or prompt (P), and late (L) locally generated replicas of the code signals (118, 117, and 116, respectively) for the BOC EML function, the QBOC early EML function, or both. The second signal generator 31 (e.g., BOC/QBOC generator) provides a BOC signal 114 and a QBOC signal 115. A first code mixer 141 modulates BOC waveform on the selected chip 119 to form a BOC-PN signal 140 (e.g., BOC(TAP)). The second code mixer 121 modulates QBOC waveform on the selected chip 119 to form corresponding QBOC-PN signal 120 (e.g., QBOC(TAP)). The first signal generator 32 provides the PN code signals (early, prompt and late variants of the PN code signal) to a multiplexer 30. In turn, the multiplexer provides one of PN coded signals to the inputs of the first code mixer 141 and the second code mixer 121. The first signal generator 32 and the second signal generator 31 are synchronously controlled by the CD NCO module 33. An individual window control signal or data comprises a lower window limit 110 and an upper window limit 111 that is provided to the code phase window module 157. Each correlator module 130 of the channel may have different window configuration.

In FIG. 2 (collectively FIG. 2A and FIG. 2B), through tap selection signal 124, the PN-BOC signal 140 or the PN-QBOC signal 120, in terms of code phase, can advance, synchronize, or delay against the CD phase of received sample (101 or 102). The second multiplexer 29 (or selector) is used to select the local BOC-PN signal 140 or the local QBOC-PN signal 120 as locally generated replica signal 105 at the output of logic module 106 for generation of BOC or QBOC correlations for any sampling period or duration. In one particular configuration, the correlations may be consistent with the BOC early-minus-late error (EML) function or the QBOC early-minus-late (EML) error function, for any sampling period or duration. The SEL_BOC signal or selection signal 123 determines whether to select the BOC or QBOC correlation functions based on amplitude measurements of the primary amplitude and secondary amplitude.

The code phase window module 157 provides the flexible resolution or variable window size to visualize any section of the chip of the PN code. For example, the fractional chip phase signal 109 compares with the two window limits, the lower limit 110 (e.g., Win(k):x1) and the upper limit 111 (e.g., Win(k):x2). If the chip phase is located within observing section, the code wipe off module (27) is enabled to operate and to provide a non-zero output for input to integration-and-dump module 28 for accumulating, otherwise (if the chip phase is located outside of the observing section) zero output is fed into the module 28 for integrating. During window enable period, the local signal 108 (e.g., xBOC(TAP)) is used to despread the PN modulation of the received sample (101 or 102). The correlator modules 130 despread the local signals 108 that may comprise, but are not limited to, various available signal versions or signal permutations. Here, the available signal versions for the local signals 108 are named E-BOC, E-QBOC, P-BOC, P-QBOC, L-BOC, L-QBOC, where E means early, P means prompt and L means late, and where Q means quadrature. The output of the code phase window module 157 and the second multiplexer 29 are applied to a logic module 106. In one embodiment, the logic module 106 may comprise an AND gate or other suitable logic device, logical circuit or logic function. The output of the logic module 106 is coupled to code wipe off module 27 to provide an enable signal and window limit for accumulating the despreaded samples by integration-and-dump modules 28.

Multiple correlator modules 130 provide a bank of correlation data 125 for the tracking module 200. The code wipe off module 27 convolutes the local replica signal (105 or 108) with the baseband signal 102 to despread the BOC and PN modulation. The integration-and-dump module 28 integrates multiple dispreading samples over millisecond or multiple millisecond periods. The integrated output correlation data 125 from multiple correlators 130 may comprise one or more of the following information in encoded or modulated form: date, satellite navigation system time, satellite status, orbital data, ephemeris data, almanac, satellite location, and satellite identifier, for example. Each correlator module 130 comprises an integration- and dump-module 28 that generates a corresponding correlation or accumulation. The correlations or accumulations are stored or held in a data storage device, such as electronic memory, a register, or another device within the digital receiver portion (e.g., 192) for subsequent or real-time processing by the decision unit 35 and the tracking module 200, among other things.

Depending on the tap selection signal 124, BOC selection signal 123, and window limit data (110, 111) or control signals associated with window limit data (110, 111), each correlator module 130 is configurable to generate one of various correlation data as but not limited to those listed in correlation data 125. Window control signals, associated with window limit data 110 and 111, provide different resolution to a chip of the PN code which determines the pull in range and the lock accuracy. Normally, observing a small section of the chip by the code phase window module 157 improves the tracking accuracy while minimizing the pull-in range; while an observing a large section of the chip extends the pull-in range at the expense of accuracy. For example, the tap selection signal 124 (e.g., SEL_TAP) provides a flexible visualization across multiple chips to examine the correlation between the received samples (101 or 102) and its next chip by selecting E tap for its corresponding early chip, by selection P tap for its corresponding prompt chip, by selecting L tap for its corresponding late chip. The BOC selection signal 123 provides an efficient way to recover the energy from the received sample (101 or 102) with BOC modulation by either extracting its BOC correlation component or deriving its QBOC correlation components.

In FIG. 2, a set of correlation data 125 is stored in a register or set of registers, a processor or data storage device for storing intermediate results or other data. In one embodiment, correlation data 125 comprise correlations, correlation values, or outputs of one or more correlators of the correlator module 130 for processing to support the formation of or realization of a dual early-minus-late error function for each BOC channel and each QBOC channel, for example.

For each channel, the correlation data 125 provides essential information to extract the information such as amplitude, CD phase misalignment and CR phase misalignment from either BOC or QBOC correlation output. As shown by FIG. 8, depending on the CD phase alignment, the recovered energy to input sample (101 or 102) either locates at BOC component or QBOC component. The multiple local maxima presented on FIG. 8 possibly deteriorate the CD tracking by incurring false lock point on the discriminator S-curve. The multiple zero points presented on FIG. 8 negatively impact the amplitude estimation which is important to correctly estimate CD and CR tracking error through a normalization process; for example, the zero BOC correlation component misleads to a decision of a false signal loss (or perceived false cycle slip) while the energy still exists on the QBOC correlation component, and vice versa. Therefore, the strategy named DDSel selects either the set of BOC correlations or the set of QBOC correlations at every epoch (or sampling period) to facilitate amplitude estimation, CR tracking and CD tracking. DDSel amplitude estimation, compared to using only BOC or QBOC demodulated component, take advantage by always choosing the component with most of demodulation energy to minimize noise infection; DDSel CD tracking not only eliminates the false zero-crossing points on discriminator S-curve, but also reflects improvement in terms of both reliability and accuracy. DDSel CR tracking also reveals the improvement in both reliability and accuracy.

The output of every correlator within the correlator module 130 contains an I part and a Q part. Multiple correlations, not limited to those listed as correlation data 125, support the envelope detector 300 (reflected by detectors 201 and 211 at FIG. 3), CD tracking module 37, and CR tracking module 38. As used herein, receiver channel information means one or more of the following data: (a) code phase 109 from code (CD) numerical control oscillator (NCO) 126, (b) late (L) tap 116, punctual (P) tap 117, or early (E) tap 118 from a first signal generator 32 (e.g., PN Coder), (c) BOC signal 114, QBOC signal 115 from a second signal generator 31 (e.g., BOC/QBOC generator), and (d) local carrier (CR) replica 103 (e.g., in sine or cosine form) resulting from carrier NCO module 34.

The receiver channel information is fed into the set of the correlator modules 130. In one configuration, each correlator module 130 functions or operates in accordance with one or more of the following parameters: (a) a lower window limit 110 (e.g., signal or data) in chips (e.g., or fractional chips), (b) an upper window limit 111 (e.g., signal or data) in chips, (c) BOC versus QBOC selection via selection BOC selection data 123, and (d) tap selection signal 124 for selection of the early (E), prompt (P) or late (L) versions or variants of the PN code for application to the first and second code mixer (141, 121). The output of each correlator of the correlator module 130 varies based on the output of the first code mixer 141 (e.g., tap BOC code mixer), and second code mixer 121 (e.g., tap QBOC code mixer).

In one configuration, each correlator module 130 comprises a code wipe-off module (e.g., 27 in FIG. 1A) that supports wiping off (e.g., removing) the PN modulation using a locally generated replica signal 105 (e.g., XBOC(TAP, Win). The set of accumulations or correlation data 125, but not limited to those listed in FIG. 2 or FIG. 3, are processed by the carrier tracking module 38 and code tracking module 37. The resultant code rate 260 (e.g., code NCO rate) and carrier rate 270 (e.g., carrier NCO rate) are used to drive the code NCO module 33 and carrier NCO module 34 in FIG. 2. In one embodiment, the code tracking module 37 comprises a code error module 43 linked or coupled to a code loop module 44. In one embodiment, the carrier tracking module 38 comprises an Automatic Frequency Control (Costas Error) module 45 linked or coupled to the carrier loop module 46.

Figure 3A:
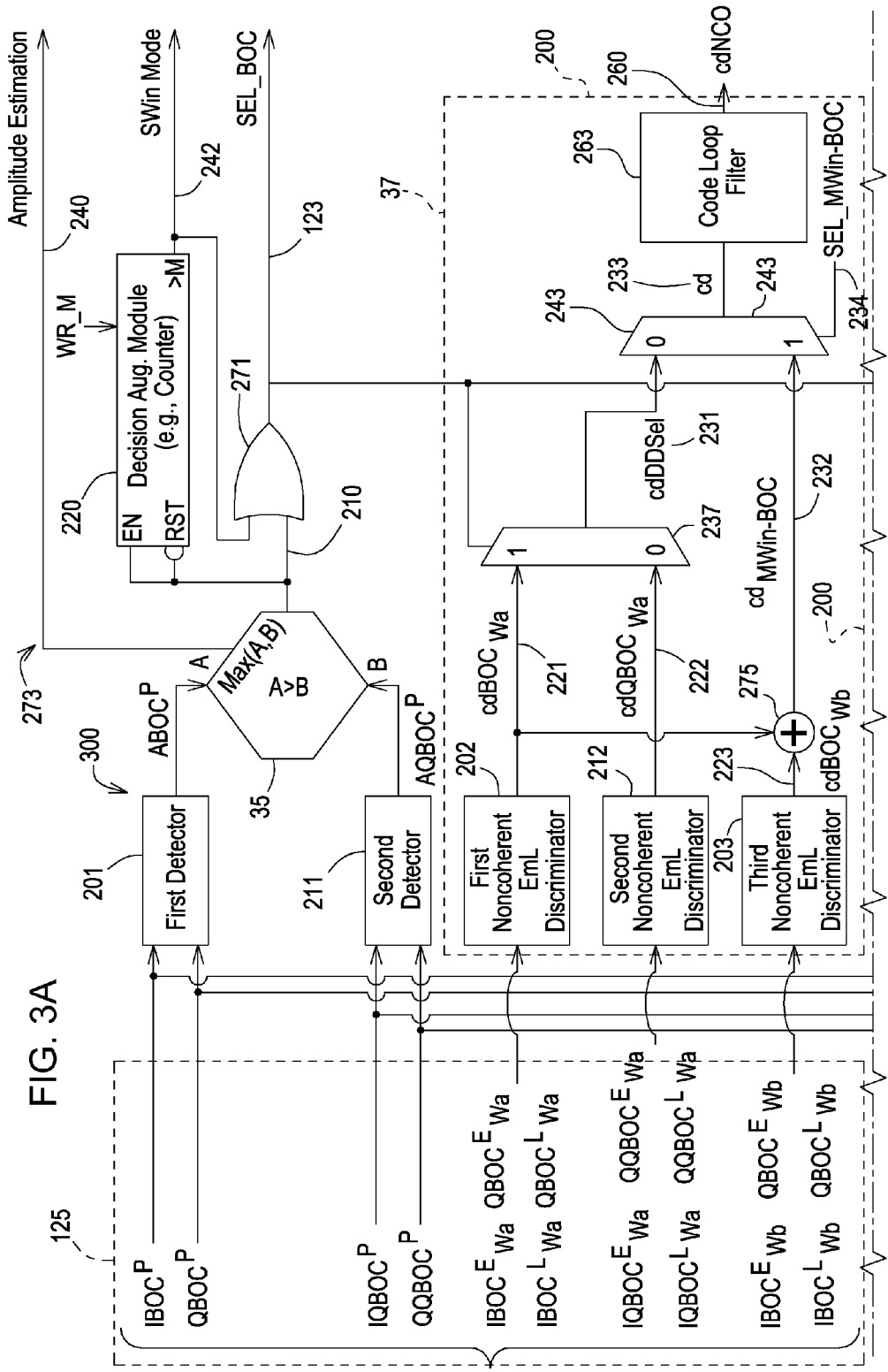
FIG. 3 is a block diagram of the detectors (e.g., envelope detectors), decision unit, and code(CD) and carrier(CR) tracking module of FIG. 1 in greater detail than FIG. 1.
Figure 3B:
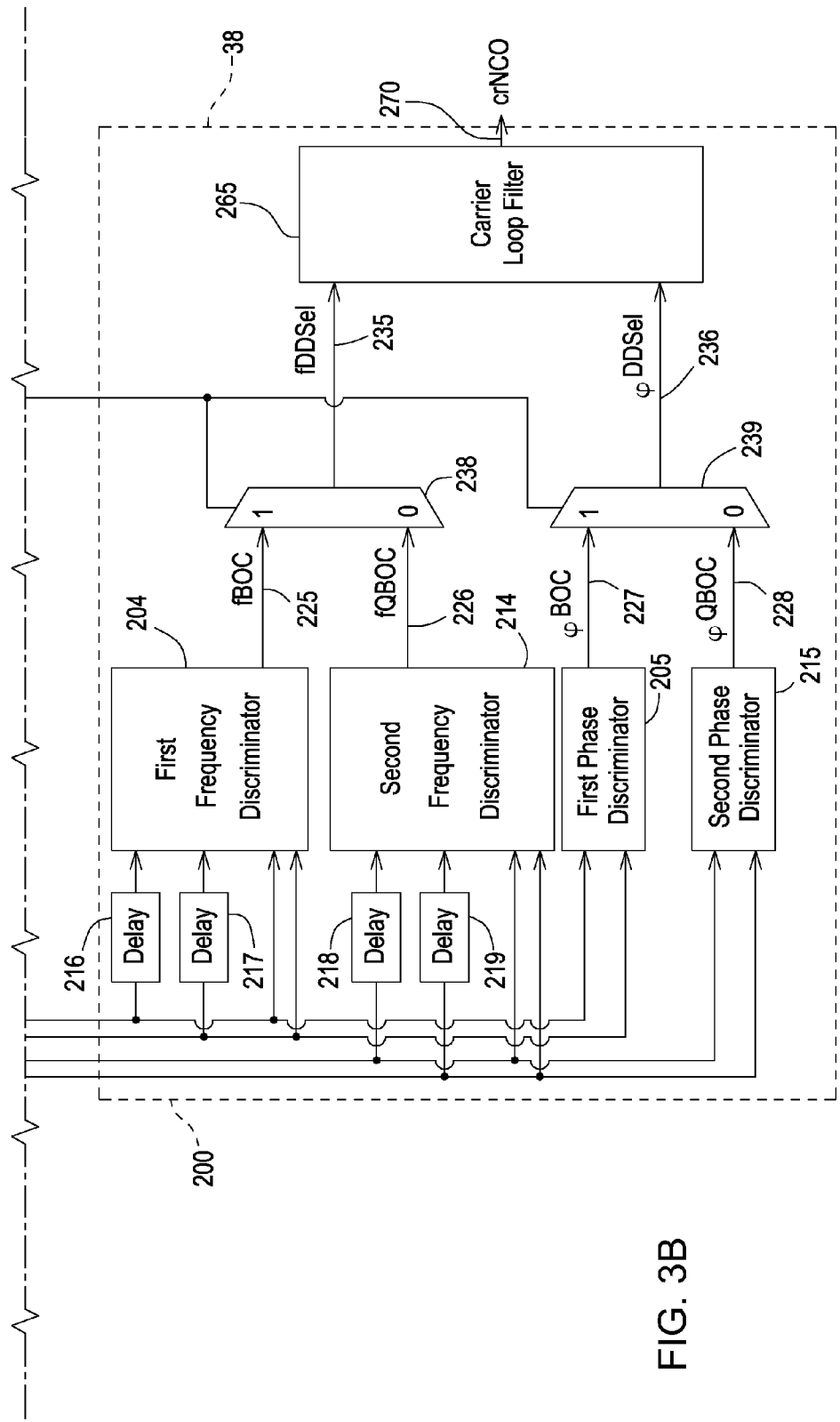

FIG. 3A and FIG. 3B collectively may be referred to as FIG. 3. FIG. 3 illustrates the tracking module 200 of FIG. 2 in greater detail than FIG. 2. Further, FIG. 3 illustrates the envelope detector (201, 211) and decision unit 35.

In FIG. 3, a first detector 201 (e.g., first envelope detector) detects a primary amplitude of the BOC component. The first detector 201 may comprise an envelope detector that detects the signal energy or power of the BOC component, including an in-phase (I) component of BOC correlation and a quadrature (Q) component of BOC correlation. For example, the first detector 201 may detect the primary amplitude as the aggregate power of the I vector of the prompt BOC component and the Q vector of the prompt BOC component.

A second detector 211 detects a secondary amplitude of the QBOC component. The second detector 211 may comprise an envelope detector that detects the signal energy or power of the QBOC component comprising in-phase QBOC component and a quadrature-phase QBOC component. For example, the second detector 211 may detect the secondary amplitude as the aggregate power of the I vector of the prompt QBOC component and the Q vector of the prompt QBOC component.

The first detector 201 and the second detector 211 provide output of the primary amplitude and secondary amplitude or energy data on the received signals to a data processor, an evaluator, or the decision unit 35. The decision unit 35 comprises an electronic data processor or evaluator. The decision unit 35 provides the amplitude estimation by selecting either the primary amplitude or the secondary amplitude, whichever is greater; it also outputs a logic signal 210 (e.g., at a corresponding node indicated in FIG. 2) to indicate whether the primary amplitude exceeds the secondary amplitude. If the channel operates at steady state mode, the selection signal (SEL_BOC) 123 always selects the set of BOC correlations to drive the CD and CR tracking loop; otherwise, the selection signal (SEL_BOC) 123 synchronizes with the signal 210. The selection signal 123 determines whether to use BOC component or QBOC component to estimate the CD and CR error, such as the multiplexor 237 for CD error, the multiplexor 238 for CR frequency error, and the multiplexor 239 for CR phase error.

In FIG. 3, the decision unit 35 generate two signals; the amplitude estimation signal 273 reflects the power/amplitude of demodulated signal; the logic signal 210 has a first state (e.g., true) if the primary amplitude from BOC component is greater than the secondary amplitude from QBOC component, otherwise the logic signal 210 has a second state (e.g., false) that is different than the first state.

The steady state operation mode of the receiver 11 occurs after pull-in or lock-on of the code phase of the received signal. In steady state operation mode for any received composite signal, the local CD and CR phase estimation tightly synchronizes with the phase (e.g., of the CD and CR) of the received sample (101 or 102) in FIG. 2; therefore, the demodulation energy is concentrated in the BOC component while leaving QBOC component dominated by noise. To mitigate the negative impact of noise, if using DDSel method during the pull-in mode, only the set of BOC correlation data 125 is preferred at steady state. After code acquisition (e.g., or pull-in) of the received signal and during a steady state mode in which a local code replica and a local carrier replica is synchronized with a phase, or respective code and carrier, of the received signal over one or more sampling periods that meet or exceed a threshold duration, the digital receiver portion 192 or data processor can use only the set of BOC correlations to drive the code and carrier tracking.

In an alternate embodiment, during the pull-in mode the receiver (e.g., 11) may use multiple BOC correlations with different windows (referred to as MWin-BOC), instead of the DDSel method during the pull-in mode. If the receiver uses multiple BOC correlation with different windows (MWin-BOC) method during the pull-in mode, then for the steady state mode the correlation with a single window (referred to as SWin-BOC) is preferred to formulate the CD error estimation.

The receiver or data processor determines whether the operation mode should be the pull-in mode or the steady state mode by analyzing the primary amplitude. In one embodiment, if the detector or receiver determines that the primary amplitude is continuously greater than the secondary amplitude for equal to or greater than a threshold duration (e.g., number of epochs or sampling intervals), the decision augmentation module or counter 220 drives the CD tracking module 37 and CR tracking module 38 of FIG. 2 into a steady state mode. In one embodiment of the steady state mode, the receiver (e.g., 11) assumes the completion of CD and CR pull-in process (either using DDSel method or MWin-BOC method) and only uses the BOC correlations to drive the CR and CD tracking. If the signal window-BOC signal 242 (e.g., SWin-BOC) is enabled, only the set of BOC correlations contributes to the CD and CR tracking operation. In another embodiment, if the detector or receiver determines that the primary amplitude is continuously greater than or equal to a threshold amplitude for greater than a threshold duration, the decision augmentation module or counter 220 drives the CD tracking module 37 and CR tracking module 38 of FIG. 2 into a steady state mode.

FIG. 3 illustrates two CD tracking methods operating at pull in stage, the selection signal 234 (SEL_MWIN_BOC) determines either to use DDSel CD tracking method or MWin-BOC method. DDSel CD tracking method generates the CD error estimation using BOC or QBOC correlations, whichever contains most of the energy. The MWin-BOC method combines multiple BOC correlations with different chip spacing to estimate the CD error. Both methods achieve the same purpose, eliminating the false zero-crossing points on discriminator S-curve.

FIG. 3 addresses the DDSel estimations for CD error 231, CR frequency error 235 (e.g., fDDsel), and CR phase error 236, which minimize the impact of the noise disturbance by selecting either the set of BOC correlation or the set of QBOC correlation, whichever contains most of the demodulated energy. As shown in FIG. 3, the CD discriminators 202, 212 and 203 are noncoherent, i.e., using both the I vectors and Q vectors to estimate CD error, such method solves or determines the previously unknown allocation of energy between the I component and Q component.

FIG. 3 illustrates the signal processing chain to explain the details of determining DDSel and MWin-BOC technique. A mathematical model for BOC and QBOC using window correlation (e.g., WinCorr) techniques is introduced. As mentioned before, a local QBOC retains the missing part of signal energy if the local BOC replica signal hasn't perfectly aligned with the received BOC signal. The mathematic model of BOC and QBOC component to a general window correlation configuration (TAP, $W_x$) are modeled as the following equations:

Equation 1

$$TAP_{BOC}^{W_X} = A W_X \sum_{i=0, di=F_{Chip}/F_S}^{N_{Chip}} \left\{ \begin{array}{l} c_i c_{i-\tau} \cdot \\ \sin(2\pi N_{BOC} i)\sin(2\pi N_{BOC}(i-\tau)) \cdot \\ e^{j\delta\theta_i} \end{array} \right\}$$

$$= \frac{A}{2} W_X R(\tau)\cos(2\pi N_{BOC}\tau)e^{j\delta\varphi}$$

$$= \underbrace{\frac{A}{2} W_X R(\tau)\cos(2\pi N_{BOC}\tau)\cos\delta\varphi}_{I\_TAP_{BOC}^{W_X}} + \underbrace{j\frac{A}{2} W_X R(\tau)\cos(2\pi N_{BOC}\tau)\sin\delta\varphi}_{Q\_TAP_{BOC}^{W_X}}$$

Equation 2

$$TAP_{QBOC}^{W_X} = A W_X \sum_{i=0, di=F_{Chip}/F_S}^{N_{Chip}} \left\{ \begin{array}{l} c_i c_{i-\tau} \cdot \\ \sin(2\pi N_{BOC} i)\cos(2\pi N_{BOC}(i-\tau)) \cdot \\ e^{j\delta\theta_i} \end{array} \right\}$$

$$= \frac{A}{2} W_X R(\tau)\sin(2\pi N_{BOC}\tau)e^{j\delta\varphi}$$

$$= \underbrace{\frac{A}{2} W_X R(\tau)\sin(2\pi N_{BOC}\tau)\cos\delta\varphi}_{I\_TAP_{QBOC}^{W_X}} + \underbrace{j\frac{A}{2} W_X R(\tau)\sin(2\pi N_{BOC}\tau)\sin\delta\varphi}_{Q\_TAP_{QBOC}^{W_X}}$$

where
- $TAP_{BOC}^{W_X}$ is the correlation based on the BOC input and BOC local replica with a selection of PN TAP, TAP can be early (E), prompt (P), or late (L),
- $TAP_{QBOC}^{W_X}$ is the correlation based on the BOC input and QBOC local replica with a selection of PN TAP,
- i is chip phase in unit of chips,
- $N_{Chip}$ is number of chips per millisecond,
- di is sample phase increment in unit of chips,
- A is the amplitude of signal at level of millisecond integration,
- $W_X$ is the window size in chips,
- $N_{BOC}$ is equal to m/n of BOC (m,n), where m is $f_m/f_c$ and n is $f_n/f_c$, $f_m$ is a first subcarrier frequency, $f_n$ is the actual chip frequency, and $f_c$ is the reference chipping rate,
- $F_{Chip}$ is the chipping rate in chips/second,
- $F_S$ is the sampling rate in samples/second,
- $R(\tau)$ is the conventional correlation function for PN code,
- $\tau$ is the chip phase error estimated at receiver side,
- $\delta\theta_i$ is the carrier phase estimation error for each sample,
- $\delta\varphi$ is the average carrier phase estimation error over $N_{Chip}$ period,
- $I\_TAP_{BOC}^{W_X}$ is the in-phase or real part of $TAP_{BOC}^{W_X}$,
- $Q\_TAP_{BOC}^{W_X}$ is the quadrature or imaginary part of $TAP_{BOC}^{W_X}$,
- $I\_TAP_{QBOC}^{W_X}$ is the in-phase or real part of $TAP_{QBOC}^{W_X}$,
- $Q\_TAP_{QBOC}^{W_X}$ is the quadrature or imaginary part of $TAP_{QBOC}^{W_X}$.

Equation 1 and Equation 2 show that $\cos(2\pi N_{BOC}\tau)$ and $\sin(2\pi N_{BOC}\tau)$ are orthogonal against $\tau$, i.e., as shown in FIG. 8, $P_{BOC}^{(0,1)}$ (indicated by a solid curved line 701) and $P_{QBOC}^{(0,1)}$ (indicated by a dashed curved line 702), the amplitude (correlation output) of the curved lines (701, 702) reach or cross zero at alternating times measured in chips. Curved line 701 represents the BOC correlation function of Equation 1, whereas curved line 702 represents the QBOC correlation function of Equation 2. The horizontal axis 704 of FIG. 7 shows a time difference between the received signal and locally generated replica signal in chips, whereas the vertical axis 703 shows correlation between the received signal and locally generated replica signal.

Equation 1 and Equation 2 approximates the binary subcarrier by using a sine or cosine model to remove the discontinuity of sign( ) function which reflects the binary characteristics. The model of Equation 1 and Equation 2, through extensive comparison, effectively reflect the characteristics of BOC and QBOC, correlations with binary characteristics included. For example, the sign( ) function typically outputs a first logic level or a positive input and a second logic level, different than the first logic level, for a negative input.

In FIG. 3, in one embodiment the decision unit 35 makes the BOC/QBOC selection resulting from the DDSel technique. The decision unit 35 does one or more of the following: (a) compares the primary amplitude with the secondary amplitude, and selects the greater one to update the amplitude estimation; sets signal 210 with true (e.g., or a first logic state) if the primary amplitude exceeds the secondary amplitude, or reset it otherwise (e.g., or set with second logic state opposite to the first logic state), (b) provides the DDSel data for control of the selection multiplexers (237, 238, 239) to choose either BOC CD and CR errors or QBOC CD and QBOC CR errors for tracking in the CD loop and CR loop, and adjustment of the CD and CR phase to maximize correlation between the received signal and locally generated replicas.

If the primary amplitude continuously exceeds the secondary amplitude for more than M epoch, the most demodulation energy concentrates in the BOC component, i.e., the local BOC-PN replica assumedly aligns with the CD phase of input sample 101 (FIG. 2). Under such circumstance, the channel could operate at steady state mode which set signal 242, thus turning on the BOC selection signal 123.

The first detector 201 and the second detector 211 may use Equation 3 or Equation 4 to determine or estimate the amplitude of the BOC or QBOC signal components.

$$\mathrm{Amp}(Y) = \sqrt{I\_Y^2 + Q\_Y^2}, \quad \text{Equation 3}$$

where

I_Y is the in-phase xBOC component,

Q_Y is the quadrature-phase xBOC component, and xBOC refers to the BOC or QBOC signal component of the received composite signal. Under above Equation 3, the primary amplitude comprises the combined signal power of the BOC in-phase component and BOC quadrature phase component. Similarly, the secondary amplitude comprises the combined signal power of the QBOC in-phase component and a QBOC quadrature-phase component. Equation 3 is ideal amplitude calculation based on in-phase and quadrature components. However a linear approximation for Equation 3 is as follows:

$$\mathrm{Amp}^{approx}(Y) \triangleq \max(|I\_Y|, |Q\_Y|) + \mu \min(|I\_Y|, |Q\_Y|) \quad \text{Equation 4,}$$

where $$Y = \mathrm{TAP}_{BOC/QBOC}^{WX}, \quad \text{Equation 5}$$

simplifies the amplitude calculation by eliminating the nonlinear processing in Equation 3, and μ is a selected scale or constant scaling factor (e.g., 0.5). The first detector 201 and the second detector may use Equation 3 or Equation 4 to determine or estimate the amplitude of the BOC or QBOC signal components.

Figure 9:
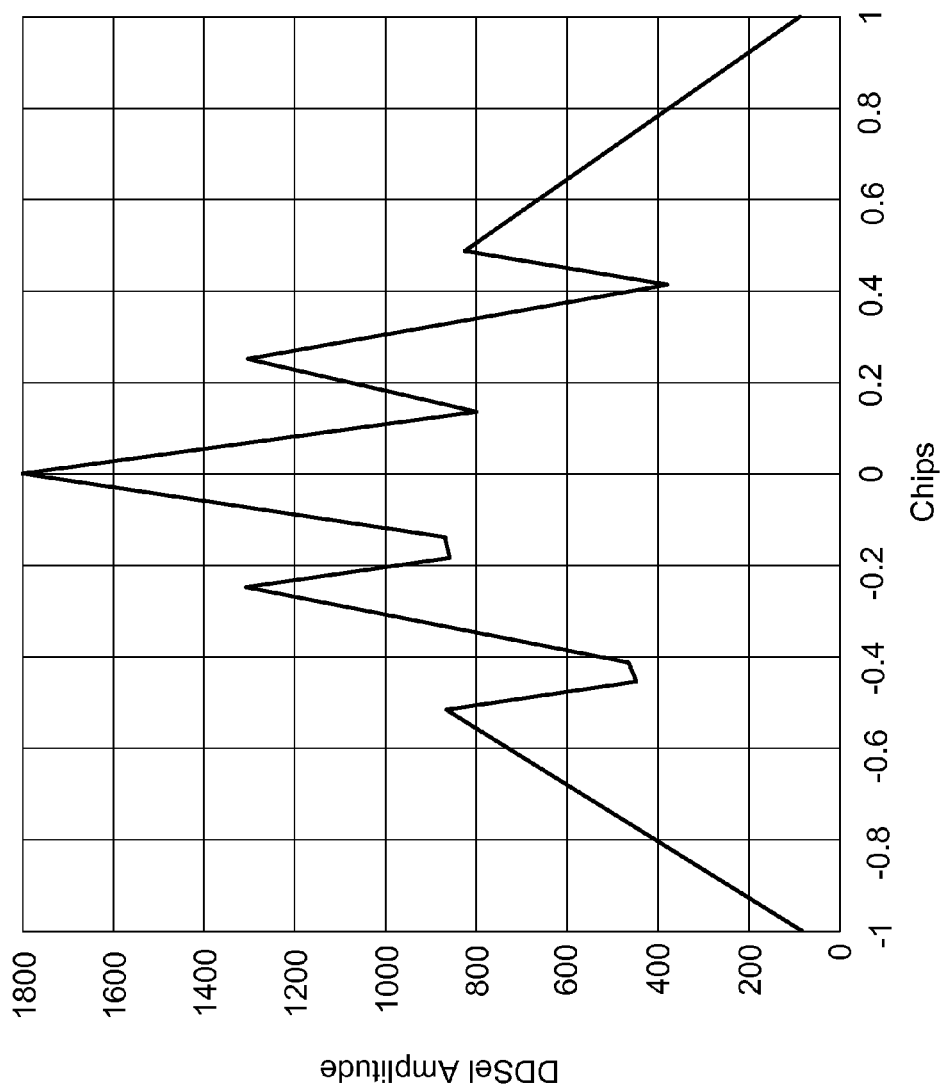
FIG. 9 is a graph of decision-directed selection (DDsel) amplitude derived from either the BOC or the QBOC signal components, and is representative of an aggregate correlation function resulting from either BOC or QBOC correlation at each sampling period.

The decision-directed selection (DDSel) technique, as shown by Equation 6, selects one component (BOC or QBOC) with more energy or signal amplitude for any given sampling period or interval, consistent with the DDSel amplitude plot of FIG. 9 that represents a universal amplitude function for any sampling period, where the universal correlation function includes the contributions from either the BOC or QBOC correlation functions that are associated with the greater signal amplitude during any sampling period or interval (e.g., an epoch). Accordingly, the DDSel code error 231, the DDSel carrier frequency error 235 (fDDSel), and the DDSel carrier phase error 236 (φDDSel) result from the set of correlations (either BOC or QBOC) that has the greater estimated amplitude for the sampling period. The amplitude and the error calculation results from the same set of correlations, regardless of whether it is based on BOC or QBOC; such selection of BOC or QBOC correlations guarantees appropriate normalization. Of the accumulations/correlation data 125, the first detector 201 uses the I and Q component for BOC correlation at prompt phase to estimate the primary amplitude; the second detector 211 uses the I and Q component for QBOC correlation at prompt phase to estimate the secondary amplitude.

In an alternate embodiment, where a multi-window BOC method is used during the pull-in instead of the DDSel method, the correlations for the multi-window-BOC (MWin-BOC) technique do not exceed the maximum component selected by decision unit 35 or the data processor, which guarantee the appropriate normalization. In one configuration the MWin-BOC refers to a dual EML error function. The horizontal axis of FIG. 9 shows a time CD phase difference between the received signal and locally generated replica signal in chips, whereas the vertical axis shows aggregate amplitude.

In one configuration, the tracking module 200 contains one or more discriminators (202, 212, 203). The tracking module 200 comprises the code tracking module 37 and the carrier tracking module 38. A discriminator (202, 212, 203) comprises a circuit, a set of correlators, or software instructions that can be adjusted to output, accept or reject signals of different characteristics, such as phase or frequency. In one embodiment, one or more discriminators (202, 212, 203), using the difference between the early correlations and late correlations (or the EML correlation), synchronizes the received code with the locally generated PN code phase. The concentration of signal energy at the BOC component indicates that CD tracking loop is closely tracking and locked on the received signal, as opposed to distributing received signal energy more evenly between the BOC and QBOC signal processing paths of the receiver. One or more discriminators (202, 212, 203) may facilitate determining a time offset or phase offset for the local generated replica with respect to the received CD phase to avoid tracking multipath signals, phase noise, false lock, or a local peak correlation in the correlation function.

In FIG. 3, collectively FIG. 3A and FIG. 3B, the correlation data 125, including the I and Q vector of the E BOC, L BOC, E QBOC and L QBOC signals, feed into a group of non-coherent, early-minus-late (EML) discriminators (202, 212, 203), where E and L represent early and late, respectively. As illustrated in FIG. 3, the group of non-coherent early-minus-late (EML) discriminators (202, 212, 203) comprises: (a) first EML discriminator 202 (e.g., a BOC EML discriminator for a first window (Window A or Wa)), (b) a second EML discriminator 212 (e.g., QBOC EML discriminator for a first window (Window A)), and (c) a third EML discriminator 203 (e.g., a BOC EML discriminator for a second window (Window B or Wb)).

The first EML discriminator 202 and the second EML discriminator 212 communicate with a first selection multiplexer 237. The first EML discriminator 202 provides BOC-derived CD error 221 (e.g., code BOC Wa) to the first selection multiplexer 237. The second EML discriminator 212 provides QBOC-derived CD error 222 to the first selection multiplexer 237. Outputs of the first EML discriminator 202 and the third EML discriminator 203 are summed by summer 275. The output (MWin-BOC signal) of the summer 275 and the output signal 231 (called cdDDSEL) are inputted into a multiplexer 243 that determines the code error signal 233 based on the selection of DDSel method or MWin-BOC method for the pull-in mode, for example.

In an alternate embodiment of the pull-in mode, the multiplexer is configured to support a hybrid pull-in mode in which the DDSel method is used for tracking carrier phase and carrier frequency, in which the MWin-BOC method is used for code tracking, and in which the DDSel amplitude estimation is used for the DDSel tracking of carrier phase and carrier frequency.

Depending on the selection signal 234 (SEL_MWin-BOC), the receiver either uses MWin-BOC method or DDSel method to pull in the CD phase. The CD error signal 233 results from CD error 231 at DDSel mode; otherwise, the CD error signal 233 results from 232 at selection of MWin-BOC. At every sampling epoch, the CD error 231 uses either BOC-derived CD error 221 or QBOC-derived CD error 222 depending on the selection signal (e.g., SEL_BOC) 123. MWin-BOC 232 combines two BOC-derived CD errors 221 and 223, where CD error 221 and 223 result from BOC correlations with different chip spacing. The output of the CD error 233, passing through a CD loop filter 263, generates a code rate signal 260 (e.g., code frequency or code phase signal) for input to the CD NCO module 33.

As illustrated in FIG. 3 for the carrier tracking module 38, a group of delay modules (216, 217, 218, and 219) receives accumulations of the prompt BOC and QBOC signals for the in-phase (I) and quadrature phase (Q) vectors. The outputs of the delay modules provide input to a first frequency discriminator 204 and a second frequency discriminator 214. For example, the first frequency discriminator 204 uses the set of BOC correlations, whereas the second frequency discriminator 214 uses the set of QBOC correlations. The BOC-derived frequency error signal 225 and the QBOC-derived frequency error signal 226 (e.g., fQBOC) are inputted into a second selection multiplexor 238, which outputs a decision-directed-selection frequency error signal 235 (e.g., fDDSel). The decision-directed (DDSel) method selects the BOC frequency error if the primary amplitude exceeds the secondary amplitude, otherwise it selects the QBOC frequency error to drive the CR loop.

Meanwhile, a first phase discriminator 205 and a second phase discriminator 215 receive accumulations of the in-phase and quadrature vectors for the prompt BOC or QBOC signals. For example, the first phase discriminator 205 uses the set of BOC correlations, whereas the second phase discriminator 215 uses the set of QBOC correlations. The first phase discriminator 205 outputs the CR phase error 227 (e.g., φBOC) derived from BOC correlations and the second phase discriminator 215 outputs a carrier phase error 228 (e.g., φQBOC) derived from QBOC correlations. Similarly to frequency error selection, BOC-derived phase error 227 is selected if the primary amplitude is greater than the secondary amplitude; otherwise, the QBOC-derived phase error 228 is selected to drive the CR loop via the decision-directed-selection carrier phase error 236. The carrier loop filter receives the decision-directed-selection carrier phase error 236. The carrier rate signal 270 from carrier loop filter 265 is applied to the carrier NCO module 34.

Figure 4:
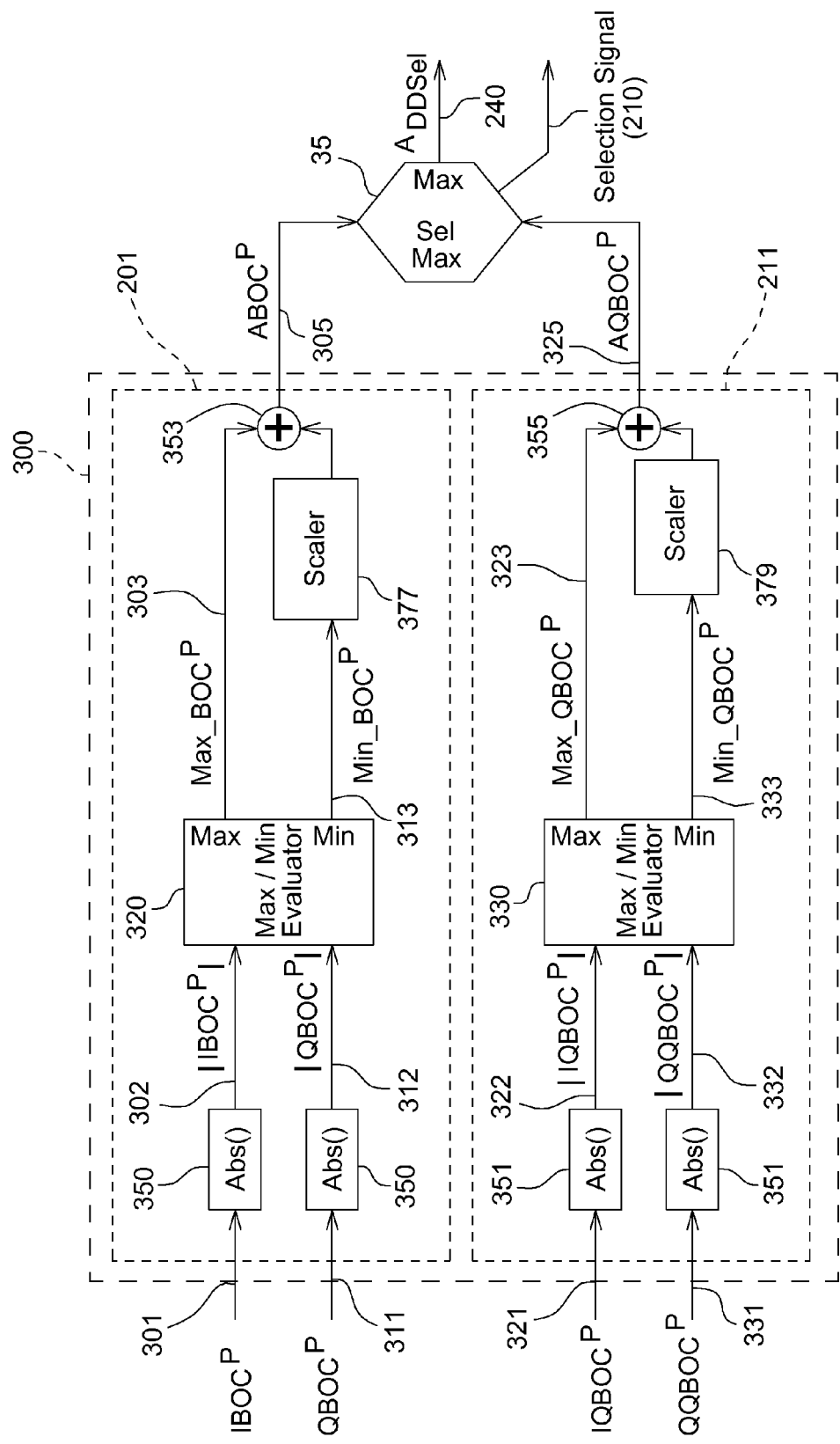
FIG. 4 is a block diagram of the detectors of FIG. 3 in greater detail than FIG. 3.

FIG. 4 illustrates the first detector 201 and the second detector 211 of FIG. 3 in greater detail than FIG. 3. Like reference numbers in FIG. 3 and FIG. 4 indicate like elements, blocks, processes, or sub-networks.

The first detector 201 comprises first set of absolute value modules 350, a first minimum/maximum evaluator 320, a first scaler 377 (e.g., first divider or a first multiplier by reciprocal value of the divisor (e.g., approximately 2)), and a first summer 353. The second detector 211 comprises a second set of absolute value modules 351, a second minimum/maximum evaluator 330, a second scaler 379 (e.g., second divider or multiplier by reciprocal value of the divisor (e.g., approximately 2)), and a second summer 355. The first detector 201 and the second detector 211 may use Equation 4 to compute the BOC and QBOC amplitudes.

In the first detector 201, the first set of absolute value modules 350 determines the absolute value of the prompt IBOC signal 301 and the prompt QBOC signal 311. The absolute values (302, 312) of the prompt IBOC signal and the prompt QBOC signal are inputted into the minimum/maximum evaluator 320 that determines the maximum aggregate signal amplitude 303 of the prompt IBOC signal and the prompt QBOC signal and the minimum aggregate signal amplitude 313 of the prompt IBOC signal and the prompt QBOC signal. By application of the scaler 377, the minimum aggregate signal amplitude 313 is scaled approximately by one-half at every sampling period. The output of the scaler 377 is added to the maximum aggregate amplitude 303 in the summer 353, which outputs the prompt BOC amplitude (ABOC) 305 for input into the decision unit 35. In one embodiment, the scaler 377 may comprise a multiplier, a divider, an amplifier or another suitable device.

In the second detector 211, the second set of absolute value modules 351 determines the absolute value of the prompt IQBOC signal 321 and the prompt QQBOC signal 331. The absolute values (322, 332) of the prompt IQBOC signal and the prompt QQBOC signal are inputted into the minimum/maximum evaluator 330 that determines the maximum aggregate signal amplitude 323 of the prompt IQBOC signal and the prompt QQBOC signal and the minimum aggregate signal amplitude 333 of the prompt IQBOC signal and the prompt QQBOC signal. By application of the scaler 379, the minimum aggregate signal amplitude 333 is scaled approximately by half at every sampling period. The output of the scaler 379 is added to the maximum aggregate amplitude 323 in the summer 355, which outputs the prompt QBOC amplitude (AQBOC) 325 for input to the decision unit 35. In one embodiment, the scaler 379 may comprise a multiplier, a divider, an amplifier or another suitable device.

In one embodiment, the decision unit 35 or data processor may use the following equation:

$$A_{DDSel} = \max(\text{Amp}(P_{BOC}^{(0,1)}), \text{Amp}(P_{QBOC}^{(0,1)})) \quad \text{Equation 6}$$

In one embodiment, the decision unit 35 or data processor calculates the overall signal amplitude 240 (e.g., $A_{DDSel}$). Equation 6 may include an approximation of Equation 4 as a substitute for the ideal envelope calculation of Equation 3. The first detector 201 and the second detector 211 may use Equation 3 or Equation 4 to determine or estimate the amplitude of the BOC or QBOC signal components. Further Equation 6 provides a selection signal 210 to the logic device 271 (e.g., OR gate or exclusive-OR gate) through comparing the primary amplitude with the secondary amplitude. The output of logic device 271 provides the BOC selection signal 123 (e.g., SEL_BOC).

As mentioned before, to achieve reliable signal detection, smaller search spacing is required to avoid multiple zero-crossing points on the BOC correlation. Such demand extends the acquisition time, and requires either software, hardware, or both to finely control the phase of local replica. As illustrated by the universal correlation function of FIG. 9, the DDSel method, eliminates the zero-crossing point within −1 and +1 chips of the peak amplitude and associated prompt correlation. The universal correlation function of FIG. 9 supports computational stability and correct estimation of signal power.

Figure 5A:
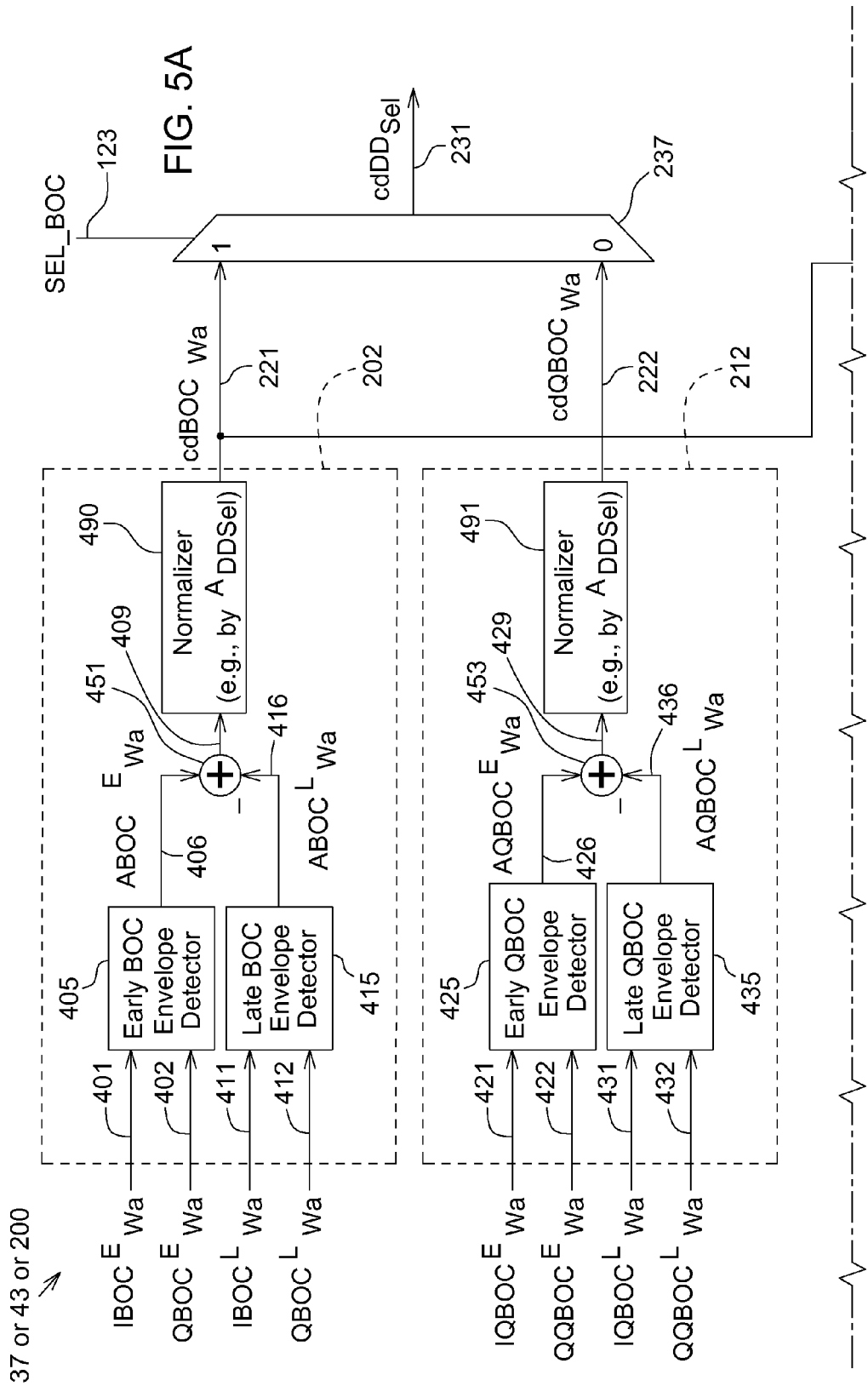
FIG. 5 is a block diagram of the CD error estimator of FIG. 3 in greater detail than FIG. 3.
Figure 5B:
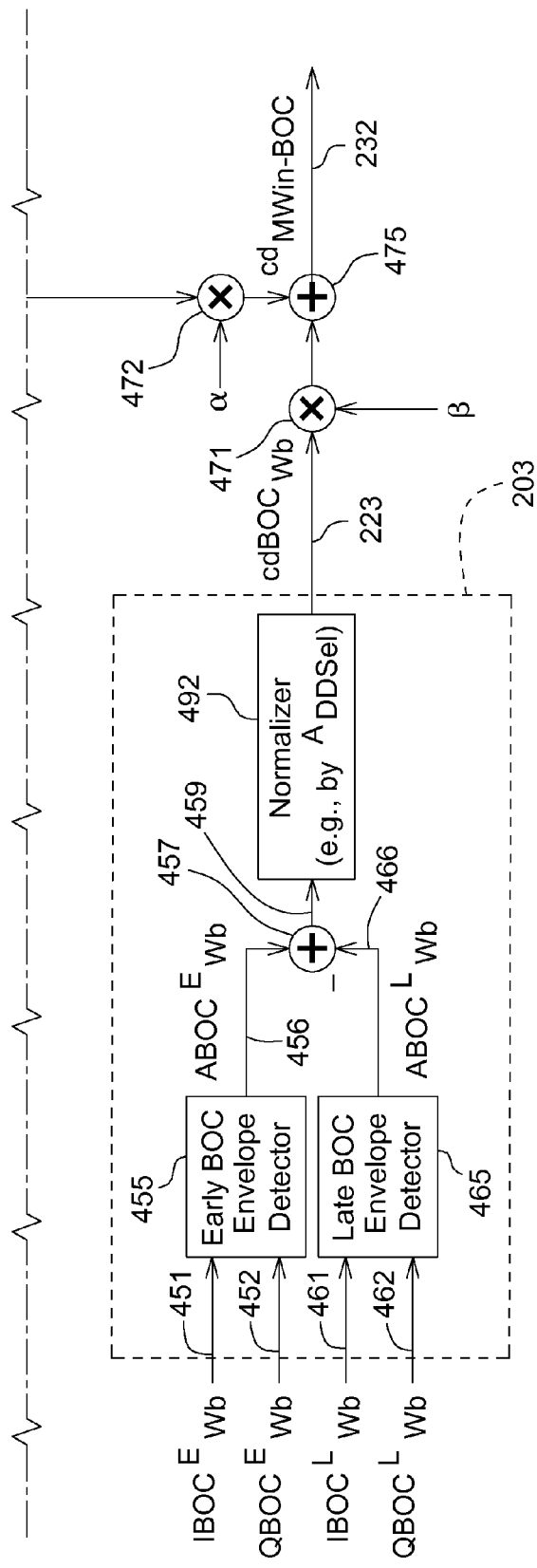

FIG. 5A and FIG. 5B are collectively referred to as FIG. 5. FIG. 5 shows the first EML discriminator 202, the second EML discriminator 212, and the third EML discriminator 203 in more detail than FIG. 3. Like reference numbers in FIG. 3 and FIG. 5 indicate like elements.

The first EML discriminator 202 receives input correlation data, accumulation data or other input data (401, 402, 411, 412). The first EML discriminator 202 comprises an early (E) BOC envelope/amplitude detector 405 and a late (L) BOC envelope/amplitude detector 415 that provide outputs (E BOC amplitude 406 and L BOC amplitude 416) to construct a first EML accumulation at summer output 409 through summer 451. At the summer output of summer 451, the first EML accumulation is then normalized by normalizer 490 (e.g., normalization unit) to provide a BOC-derived CD error 221 with first window of Wa to first selection multiplexer 237. In one configuration, the early BOC envelope detector 405 and the late BOC envelope detector 415 may comprise the same or similar software modules or the same or similar algorithms that are applied to early BOC correlation data and late BOC correlation data, respectively.

The second EML discriminator 212 receives input correlation data, accumulation data or other input data (421, 422, 431, 432). The second EML discriminator 212 comprises an early (E) QBOC envelope/amplitude detector 425 and a late (L) QBOC envelope/amplitude detector 435 that provide outputs (E QBOC amplitude 426 and L QBOC amplitude 436) to construct a second EML accumulation at summer output 429 through summer 453. The second EML accumulation is then normalized by normalizer 491 (e.g., normalization unit) to provide a code QBOC correlation as a second QBOC-derived CD error 222 with first window of Wa to first selection multiplexer 237. In one configuration, the early QBOC envelope detector 425 and the late QBOC envelope detector 435 may comprise the same or similar software modules or the same or similar algorithms that are applied to early QBOC correlation data and late QBOC correlation data, respectively.

The third EML discriminator 203 receives input correlation data, accumulation data or other input data (451, 452, 461, 462). The third EML discriminator 203 comprises an early (E) BOC envelope/amplitude detector 455 and a late (L) BOC envelope/amplitude detector 465 that provide outputs (E BOC amplitude 456 with Wb and L BOC amplitude 466 with Wb) at nodes to construct a third EML accumulation at summer output 459 through summer 457. The third EML accumulation is then normalized by normalizer 492 to provide another BOC-derived code error 223 (e.g., cdBOC Wb) with second window of Wb, where the first window (Wa) does not equal the second window (Wb). In one configuration, the early BOC envelope detector 455 and the late QBOC envelope detector 465 may comprise the same or similar software modules or the same or similar algorithms that are applied to early QBOC correlation data and late QBOC correlation data, respectively.

In FIG. 5, the decision-directed selection, early-minus-late code error (DDSel EML CD) error results from either first EML discriminator 202 or second EML discriminator 212 depending on the BOC selection signal 123. Such DDSel method removes the false lock points on the discriminator S-curve. The discriminator S-curve means an early minus late correlation function produced by the difference between an early correlator and a late correlator with respect to the received signal. If BOC selection signal 123 is a first logic level (e.g., high logic level or logic level 1), the first EML discriminator 202 enables the amplitude calculation of $P_{BOC}^{(0,Wa)}$ using module 405 and the amplitude calculation of $P_{BOC}^{(1-Wa,1)}$ using the envelope detector 415 of FIG. 5. The difference between $P_{BOC}^{(0,Wa)}$ and $P_{BOC}^{(1-Wa,1)}$ are then normalized by $A_{DDsel}$ to generate the BOC-derived, DDSel EML CD error 221 at the output of the first EML discriminator 202.

If the BOC selection signal 123 is a second logic level (e.g., low logic level or 0 logic level), which is different than the first logic level, the second EML discriminator 212 enables the amplitude calculation of $P_{BOC}^{(0,Wa)}$ using envelope detector 425 and the amplitude calculation of $P_{BOC}^{(1-Wa,1)}$ using envelope detector 435. The difference between $P_{BOC}^{(0,Wa)}$ and $P_{BOC}^{(1-Wa,1)}$ are then normalized by $A_{DDsel}$ to generate the QBOC-derived, DDSel EML CD error 222 (e.g., cdQBOC Wa) at the output of the second EML discriminator 212. The normalized code error is modeled by Equation 7.

$$\tau = \frac{|E_{xBOC}| - |L_{xBOC}|}{A_{DDSet}}, \quad \text{Equation 7}$$

referring to FIG. 5, where
xBOC is either BOC or QBOC,
$E_{xBOC}$ corresponds to $P_{xBOC}^{(0,W\alpha)}$,
$L_{xBOC}$ corresponds to $P_{xBOC}^{(0,W\alpha,1)}$,
where the DDSel reveals computation advantage in software implementation as only one component (either BOC or QBOC) really needs to be calculated.

Alternatively to the DDsel mode of operation during pull-in of the code of the received composite signal, a multi-window BOC code mode may be used during pull-in of the code. For example, a linear combination using the first BOC-derived code error 221 based on the first window (Wa) and the third BOC-derived code error 223 based on the second window (Wb) can eliminate the false zero-crossing points on discriminator S-curve, where the chip spacing for error signal 221 is different from the chip spacing for error signal 223, consistent with the first window and the second window. As shown in FIG. 5, a block diagram of the linear combination includes two generally linear scaling devices 471 and 472, and a combiner 475 (e.g., summer). The resultant error estimation 232 (e.g., composite code error estimate) is named MWin-BOC code error modeled through Equation 8.

$$\tau_{MWin-BOC} = \alpha \frac{|P_{BOC}^{(0,Wa)}| - |P_{BOC}^{(1-Wa,1)}|}{A_{DDSel}} + \beta \frac{|P_{BOC}^{(0,Wb)}| - |P_{BOC}^{(1-Wb,1)}|}{A_{DDSet}}, \quad \text{Equation 8}$$

referring to FIG. 5, where
α is the linear gain (e.g., at mixer or multiplier 472) applied on the first BOC-derived code error estimation with window Wa,
β is the linear gain (e.g., at mixer or multiplier 471) applied on the secondary BOC-derived code error estimation with window Wb.

Figure 6:
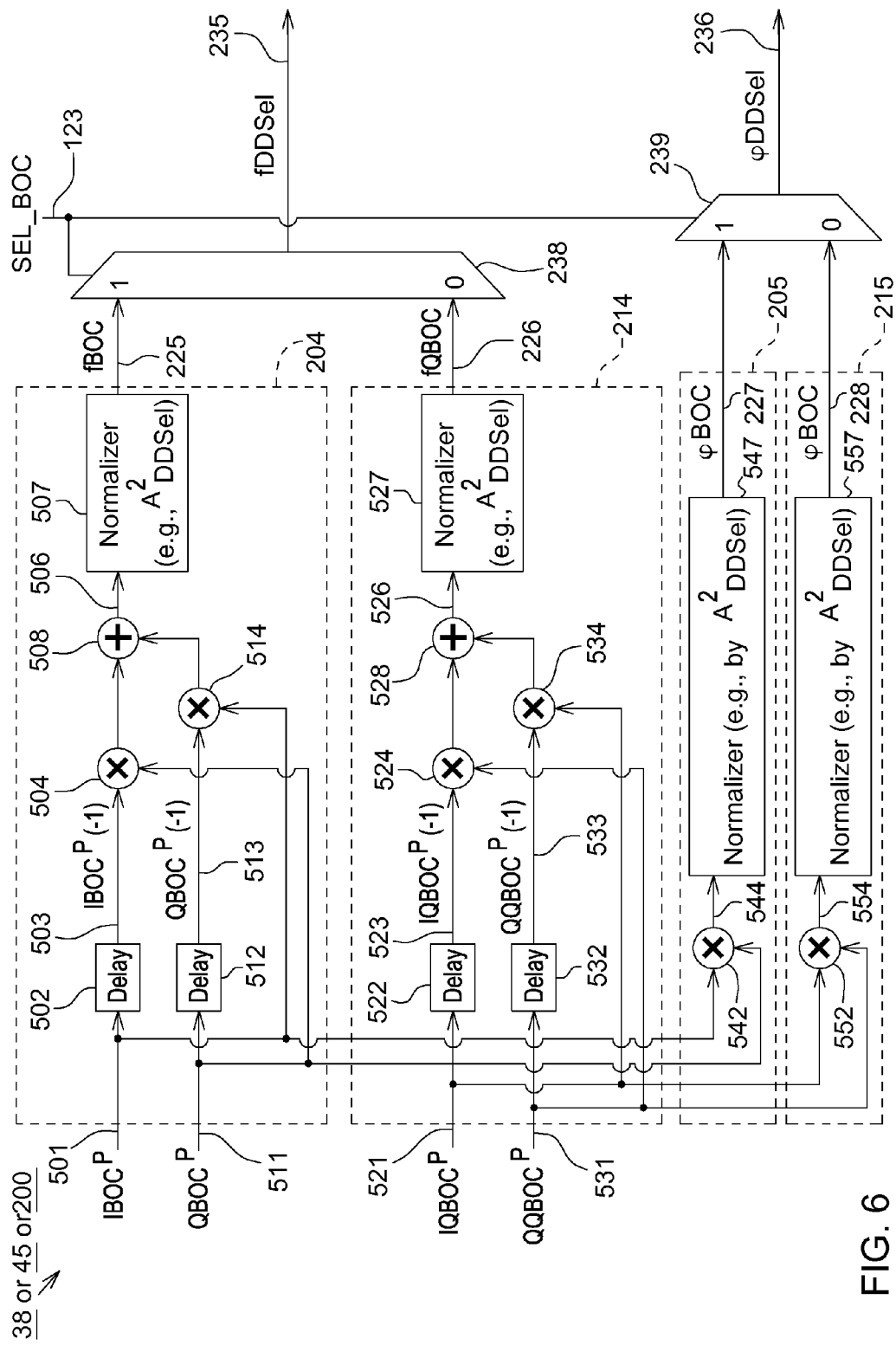
FIG. 6 is a block diagram of the CR frequency error and CR phase error estimator of FIG. 3 in greater detail than FIG. 3.

FIG. 6 discloses the nonlinear estimation on the CR frequency and CR phase estimation. Like reference numbers in FIG. 1, FIG. 3 and FIG. 6 indicate like elements. The tracking module 200 or the carrier tracking module 38 or the carrier phase/frequency error module 45 may conduct the nonlinear estimation on the CR frequency and CR phase estimation. The block diagram of FIG. 6 shows a first frequency discriminator 204, a second frequency discriminator 214, a first phase discriminator 205, and a second phase discriminator 215.

As shown in FIG. 6, the first frequency discriminator 204 receives input data, such as prompt IBOC signal 501 and prompt QBOC signal 511. Similar to the CR phase estimation previously mentioned in this document, the first frequency discriminator 204, for BOC-derived CR frequency error detection, comprises two delay units (502, 512). The two delay units (502, 512) store the BOC correlations (503, 513) for the previous sampling period. Two multipliers (504, 514) remove the CD uncertainty involved in the BOC correlations. A summer 508 to form a delta CR phase observation 506 over a sampling period, and a normalizer 507 (e.g., normalization unit) to remove the amplitude information modulated on the signal 506. The normalizer 507 outputs CR frequency error 225 (e.g., fBOC), derived from BOC correlations.

The second frequency discriminator 214 receives input data, such as prompt IQBOC signal 521 and prompt QQBOC signal 531. Like BOC-derived frequency error, a QBOC CR frequency error 226 is generated using the second frequency discriminator 214 in FIG. 6. The second frequency discriminator 214, for QBOC-derived CR frequency error detection, comprises two delay units (522, 532). The two delay units (524, 534) store the QBOC correlations (523, 533) for the previous sampling period. Two multipliers (524, 534) remove the CD uncertainty involved in the QBOC correlations. A summer 528 forms a delta CR phase observation 526 over a sampling period, and a normalizer 527 (e.g., normalization unit) removes the amplitude information modulated on the signal 526. The normalizer 527 outputs CR frequency error frequency error 226 (e.g., fQBOC), derived from QBOC correlations.

Depending on the BOC selection signal 123, the digital receiver portion 192 or the tracking module 200 uses either the CR frequency error 225, (e.g., fBOC) derived from BOC correlations, or the CR frequency error frequency error 226 (e.g., fQBOC), derived from QBOC correlations, to drive the CR loop.

For a general BOC correlation, modeled by Equation 1, both I component and Q component are convolved with CD uncertainty of $2\pi N_{BOC}\tau$ and CR phase uncertainty of $\delta\phi$. In order to extract the CR phase error $\delta\phi$ from the set of BOC correlations, the CD uncertainty of $2\pi N_{BOC}\tau$ needs to be wiped off. Equation 9 shows that the cross-product CR phase detection 544, using multiplier 542, can remove the code uncertainty.

$$QP_{BOC}IP_{BOC} = A^2\{R^2(\tau_k)\}\{\cos^2(2\pi N_{BOC}\tau_k)\}$$
$$\{\tfrac{1}{2}\sin 2\phi_k\} \qquad \text{Equation 9}$$

Similarly, for a general QBOC correlation, modeled by Equation 2, both I component and Q component are convolved with CD uncertainty of $2\pi N_{BOC}\tau$ and CR phase uncertainty of $\delta\phi$. Equation 10 shows that the cross-product CR phase detection 554, using multiplier 552, can remove the CD uncertainty.

$$QP_{BOC}IP_{BOC} = A^2\{R^2(\tau_k)\}\{\sin^2(2\pi N_{BOC}\tau_k)\}$$
$$\{\tfrac{1}{2}\sin 2\phi_k\} \qquad \text{Equation 10}$$

In FIG. 6, the BOC-derived CR phase error 227 is obtained by the normalizer 547 normalizing the BOC-derived phase detection 544 by square of amplitude using DDSel method. Similarly, the QBOC-derived CR phase error 228 is achieved by the normalizer 557 normalizing the QBOC-derived phase detection 554 by square of amplitude using DDSel method. The BOC selection signal 123 determines whether BOC-derived CR phase error or the QBOC-derived CR phase error is used to drive the CR loop. The BOC selection signal 123 controls the multiplexers (238, 239).

FIG. 7A generally discloses a method for receiving a composite signal in accordance with any embodiments of the receiver (e.g., 11) disclosed in FIG. 1 through FIG. 6, inclusive. In particular, FIG. 7A discloses a method, operating at pull-in mode, to acquire the code and carrier for a received composite signal. FIG. 7A illustrate the use of decision-direct selection (DDSel) to drive the code tracking, carrier tracking, and amplitude estimation. The method of FIG. 7A begins in block S700.

In step S700, a receiver 11 (e.g., satellite navigation receiver) or a digital receiver portion 192 receives a binary offset carrier (BOC) modulated signals to extract a BOC component by mixing or combining with a local BOC replica, and to derive a quadrature BOC (QBOC) component by combining with a local QBOC replica. In one embodiment, the BOC component comprises an in-phase BOC component and a quadrature-phase BOC component and the QBOC component comprises in-phase QBOC component and a quadrature-phase QBOC component. For example, the receiver 11 comprises a code mixer 42 (FIG. 1) for mixing or combining the BOC signal with the local BOC or QBOC replica from one or more signal generators (e.g., multiplexed output of a first signal generator 32 and second signal generator 31).

In step S702, a first detector 201 (e.g., in FIG. 1, FIG. 3 and FIG. 4) or data processor detects a primary amplitude of the BOC component during a sampling period or interval. Step S702 may be executed in accordance with various techniques, which may be applied alternately or cumulatively.

Under a first technique, the first detector 201 or data processor detects or measures the signal energy or aggregate power of the BOC component comprising in-phase BOC component and a quadrature-phase BOC component.

Under a second technique, the first detector 201 or data processor applies the correlation $P_{BOC}^{(0,1)}$ of Equation 3 to provide an amplitude (e.g., an ideal amplitude) estimate for a BOC component of the received composite signal during a sampling period or a time interval. For example, the first detector 201 applies a correlation $P_{BOC}^{(0,1)}$ of Equation 3 to provide ideal amplitude estimation for BOC component:

$$\text{Amp}(Y) = \sqrt{I\_Y^2 + Q\_Y^2},$$

where

I_Y is the in-phase BOC component, and
Q_Y is the quadrature-phase BOC component.

Under a third technique, the first detector 201 or the data processor uses the linear approximation Equation 4 to simplify or replaces the calculation of Equation 3. In one embodiment, the linear approximation of Equation 4 has a bias that is acceptable and facilitates rapid estimation of the primary amplitude. Under the third technique, the estimating or detecting of the primary amplitude or the secondary amplitude (e.g., by detectors 201, 211) for the sampling period is based on the following equations that use linear approximation separately for the BOC and QBOC signal components:

$$\text{Amp}^{approx}(Y) \triangleq \max(|I\_Y|,|Q\_Y|) + \mu\min(|I\_Y|,|Q\_Y|),$$

where $Y = P_{BOC}^{W_X}$,

μ is a selected scale or a constant scaling factor (e.g., 0.5),
$W_X$ is the window size of the correlator,
I_Y is the in-phase xBOC component, and
Q_Y is the quadrature-phase xBOC component,
xBOC refers to the BOC or QBOC signal component of the received composite signal. In the above equation, for instance, the first detector 201 detects the BOC signal component and substitutes the BOC signal component for xBOC.

In step S704, a second detector 211 (in FIG. 1, FIG. 3 and FIG. 4) or the data processor detects a secondary amplitude of the QBOC component during a sampling period or interval. Step S704 may be executed in accordance with various techniques, which may be applied alternately or cumulatively.

Under a first technique, the second detector 211 or data processor detects or measures the signal energy or aggregate power of the QBOC component comprising in-phase QBOC component and a quadrature-phase QBOC component.

Under a second technique, the second detector 211 or data processor applies a correlation $P_{QBOC}^{(0,1)}$ of Equation 3 to provide ideal amplitude estimation for QBOC component: Amp(Y)=$\sqrt{I\_Y^2+Q\_Y^2}$, where I_Y is the in-phase QBOC component, and
Q_Y is the quadrature-phase QBOC component.

Under a third technique, the linear approximation Equation 4 simplifies or replaces the calculation of FIG. 3. In one embodiment, the linear approximation of Equation 4 has a bias that is acceptable and facilitates rapid estimation of the primary amplitude. Under the third technique, the estimating or detecting the secondary amplitude (e.g., by the second detector 211 or data processor) for the sampling period is based on the following equations that use linear approximation separately for the QBOC signal components:

$$Amp^{approx}(Y) \triangleq \max(|I\_Y|, |Q\_Y|) + \mu \min(|I\_Y|, |Q\_Y|),$$

where
$Y = P_{QBOC}^{W_X}$,
µ is a selected scale or a constant scaling factor (e.g., 0.5),
$W_X$ is the window size of the correlator,
I_Y is the in-phase QBOC component, and
Q_Y is the quadrature-phase QBOC component.

In step S706, a decision unit 35, electronic data processor, or digital receiver portion 192 determines whether or not the primary amplitude exceeds (or equals) the secondary amplitude for a sampling period. For example, in step S706 does the primary amplitude exceed the secondary amplitude, or is the primary amplitude greater than or equal to the secondary amplitude? In step S706, if the primary amplitude exceeds or equals the secondary amplitude, the method continues with step S708. However, if the primary amplitude does not exceed the secondary amplitude, the method continues with step S710.

In step S708, data processor, a selector, or one or more multiplexers (e.g., second multiplexer 29 for each received channel) select a set of BOC correlations (e.g., early, prompt and late BOC correlations) in accordance with a BOC correlation function for the sampling period if the primary amplitude exceeds or equals the secondary amplitude for the sampling period. For example, the second multiplexer 29 selects a set of BOC correlations (e.g., via the BOC selection signal 123 provided to multiplexer 29) in accordance with a BOC correlation function for the sampling period if the primary amplitude exceeds or equals the secondary amplitude for the sampling period. In one embodiment, the zero crossing point for the BOC correlation function offsets by approximately $$\frac{1}{4N_{BOC}}$$

against the zero crossing point for the QBOC correlation function.

In one possible configuration in step S708, data processor, a selector, or one or more multiplexers (e.g., second multiplexer 29 for each received channel) select a first correlation or first set of BOC correlations associated with or resulting from: (a) substantially prompt timing (e.g., prompt signal 117) of the first signal generator 32 with respect to the received digital signal (102) and (b) a substantially full chip window (e.g., established by the code phase window module 157) within the correlator module 130.

In one possible configuration for step S708, the set of BOC correlations is modeled or estimated by the following equation:

$$TAP_{BOC}^{W_X} = AW_X \sum_{i=0, di=F_{Chip}/F_S}^{N_{Chip}} \left\{ \begin{array}{l} c_i c_{i-\tau} \cdot \\ \sin(2\pi N_{BOC} i) \sin(2\pi N_{BOC}(i-\tau)) \cdot \\ e^{j\delta\theta_i} \end{array} \right.$$

$$= \frac{A}{2} W_X R(\tau) \cos(2\pi N_{BOC} \tau) e^{j\delta\varphi}$$

$$= \underbrace{\frac{A}{2} W_X R(\tau) \cos(2\pi N_{BOC} \tau) \cos\delta\varphi}_{I\_TAP_{BOC}^{W_X}} + \underbrace{j \frac{A}{2} W_X R(\tau) \cos(2\pi N_{BOC} \tau) \sin\delta\varphi}_{Q\_TAP_{BOC}^{W_X}},$$

where
$TAP_{BOC}^{W_X}$ is the correlation based on the BOC input and BOC local replica with a selection of PN TAP, where PN TAP can be early, prompt or late,
i is chip phase in unit of chips,
$N_{Chip}$ is number of chips per millisecond,
di is sample phase increment in unit of chips,
A is the amplitude of signal at level of millisecond integration,
$W_X$ is the window size in chips,
$N_{BOC}$ is equal to m/n of BOC (m,n), where m is $f_m/f_c$ and n is $f_n/f_c$, $f_m$ is a first subcarrier frequency, $f_n$ is the actual chip frequency, and $f_c$ is the reference chipping rate,
$F_{Chip}$ is the chipping rate in chips/second,
$F_S$ is the sampling rate in samples/second,
$R(\tau)$ is the conventional correlation function for PN code,
τ is the chip phase error estimated at receiver side,
$\delta\theta_i$ is the carrier phase estimation error for each sample,
δφ is the average carrier phase estimation error over $N_{Chip}$ period,
$I\_TAP_{BOC}^{W_X}$ is the in-phase or real part of $TAP_{BOC}^{W_X}$, and
$Q\_TAP_{BOC}^{W_X}$ is the quadrature or imaginary part of $TAP_{BOC}^{W_X}$.

The digital receiver portion 192 or code tracking module 37 can use above equation for determining the correlation of step S708 to form early-minus-late functions for estimating the code error for the received composite signal in step S711.

In step S710, if the primary amplitude is less than the secondary amplitude or if the secondary amplitude exceeds the primary amplitude, the data processor, selector, or one or more multiplexors (e.g., second multiplexer 29 for each received channel) select a set of QBOC correlations (e.g., early, prompt and late QBOC correlations) in accordance with a QBOC correlation function for current sampling period to generate the error estimations to drive the code (CD) and carrier (CR) feedback loop. In one embodiment, the zero crossing point for the QBOC correlation function offsets by approximately $$\frac{1}{4N_{BOC}}$$

against the zero crossing point for the BOC correlation function.

In one possible configuration in step S710, data processor, a selector, or one or more multiplexers (e.g., second multiplexer 29 for each received channel) select a second correlation or second set of QBOC correlations associated with or resulting from: (a) substantially prompt timing (e.g., prompt signal 117) of the first signal generator 32 with respect to the received digital signal (102) and (b) a substantially full chip window (e.g., established by the code phase window module 157) within the correlator module 130.

Under one possible configuration in step S710, a set of QBOC correlations is modeled by the following equation:

$$TAP_{QBOC}^{W_X} = AW_X \sum_{i=0, di=F_{Chip}/F_S}^{N_{Chip}} \left\{ \begin{array}{l} c_i c_{i-\tau} \cdot \\ \sin(2\pi N_{BOC} i)\cos(2\pi N_{BOC}(i-\tau)) \cdot \\ e^{j\delta\theta_i} \end{array} \right\}$$

$$= \frac{A}{2} W_X R(\tau) \sin(2\pi N_{BOC} \tau) e^{j\delta\varphi}$$

$$= \underbrace{\frac{A}{2} W_X R(\tau) \sin(2\pi N_{BOC} \tau) \cos\delta\varphi}_{I\_TAP_{QBOC}^{W_X}} + \underbrace{j\frac{A}{2} W_X R(\tau) \sin(2\pi N_{BOC} \tau) \sin\delta\varphi}_{Q\_TAP_{QBOC}^{W_X}},$$

where
$TAP_{QBOC}^{W_X}$ is the correlation based on the BOC input and QBOC local replica with a selection of PN TAP, where PN TAP can be early, prompt or late,
i is chip phase in unit of chips,
$N_{Chip}$ is number of chips per millisecond,
di is sample phase increment in unit of chips,
A is the amplitude of signal at level of millisecond integration,
$W_X$ is the window size in chips,
$N_{BOC}$ is equal to m/n of BOC (m,n), where m is $f_m/f_c$ and n is $f_n/f_c$, $f_m$ is a first subcarrier frequency, $f_n$ is the actual chip frequency, and $f_c$ is the reference chipping rate,
$F_{Chip}$ is the chipping rate in chips/second,
$F_S$ is the sampling rate in samples/second,
$R(\tau)$ is the conventional correlation function for PN code,
$\tau$ is the chip phase error estimated at receiver side,
$\delta\theta_i$ is the carrier phase estimation error for each sample,
$\delta\varphi$ is the average carrier phase estimation error over $N_{Chip}$ period,
$I\_TAP_{QBOC}^{W_X}$ is the in-phase or real part of $TAP_{QBOC}^{W_X}$, and
$Q\_TAP_{QBOC}^{W_X}$ is the quadrature or imaginary part of $TAP_{QBOC}^{W_X}$.

The digital receiver portion 192 or code tracking module 37 can use above equation for determining the correlation of step S710 to form early-minus-late functions for estimating the code error for the received composite signal in step S711.

In step S711, the data processor, receiver 11 or tracking module 200 processes the selected correlations (e.g., from step S708 or step S710 for each sampling period) to track code and carrier (e.g., carrier frequency, carrier phase or both) of the received composite signal for the estimation of a range between a receiver antenna and a satellite transmitter that transmits the received composite signal. A measurement generation module 39 or a navigation positioning engine 41 can estimate the range or position of the receiver antenna, for example.

Step S711 may be carried out in accordance with various techniques that may be applied separately or cumulatively. Under a first technique, the data processor or digital receiver portion 192 uses the BOC-derived error for tracking code error, frequency error and phase error for a sampling period (e.g., epoch) if the primary amplitude exceeds, or equals, the secondary amplitude. Accordingly, the data processor or receiver 11 uses the selected set of BOC correlations in accordance with a BOC correlation function for a current sampling period to generate the error estimations to drive CD and CR feedback loop.

Under a second technique, the data processor or digital receiver portion 192 uses the QBOC-derived error for tracking code error, frequency error and phase error of a sampling period if the second amplitude exceeds the primary amplitude. Accordingly, the data processor or receiver uses the selected set of QBOC correlations in accordance with a QBOC correlation function for a current sampling period to generate the error estimations to drive CD and CR feedback loop.

Under a third technique, for each successive sampling period in a code loop during a pull-in mode that used DDSel, the data processor, tracking module 200, or code tracking module 37 selects or processes the set (or subset) of BOC correlations (e.g., early and late BOC correlations) or the set (or subset) of QBOC correlations (e.g., early and late QBOC correlations) to form the early-minus-late estimation of the code error T based on greater amplitude resulting from the BOC component or from the QBOC component, respectively, which is modeled by the following equation:

$$\tau = \frac{|E_{xBOC}| - |L_{xBOC}|}{A_{DDSel}},$$

where
xBOC is either BOC or QBOC,
$E_{xBOC}$ corresponds to $P_{xBOC}^{(0, W_a)}$,
$L_{xBOC}$ corresponds to $P_{xBOC}^{(1-W_a, 1)}$, and
where $W_a$ is window size of the correlator. For example, in the code tracking module 37 the code multiplexer 237 is controlled to output or select a BOC-derived CD error signal (231) or QBOC-derived CD error signal (231) via the BOC selection signal 123 provided from the decision unit 35, or through the logic device 271.

Under a fourth technique, for each successive sampling period in a carrier phase loop, the xBOC correlations (e.g., prompt BOC or prompt QBOC correlations), with greater amplitude, form the carrier phase error estimation, wherein the cross-product using the in-phase and quadrature phase component resolves the ambiguity from sine or cosine of BOC misalignment.

Under a fifth technique, the digital receiver portion 192 or data processor processes selected prompt BOC correlations or selected prompt QBOC correlations during the sampling period, or both correlations over successive sampling periods, to track a carrier of the received composite signal, or track both the carrier and the frequency of the received composite signal.

FIG. 7B refers to FIG. 7B-1 and FIG. 7B-2 collectively. FIG. 7B generally illustrates a flow chart of a method for receiving a composite signal comprising a receiver for receiving a composite signal. In particular, FIG. 7B provides an illustration of BOC tracking strategy in both pull-in mode and steady state mode. Like reference numbers in FIG. 7A and FIG. 7B indicate like elements, steps or procedures.

The method of FIG. 7B begins in block S700. Steps 700, 702, and 704 were described in FIG. 7A and the above description applies equally to FIG. 7B as if fully set forth here.

In the illustrative example of FIG. 7B, step 716 follows step S704. In step 716, the digital receiver portion 192, the data processor, or a combination of the decision module 35 and the decision augmentation module 220 (in FIG. 3A) determines whether (or not) the receiver operates in a steady state mode. For the received composite BOC signal, if the primary amplitude continuously exceeds the secondary amplitude for a threshold number of consecutive sampling periods or M epochs, the receiver (11) or the digital receiver portion 192 switches to or is determined to be in the steady state mode, otherwise the receiver remains in or is determined to be in the pull-in mode. In one configuration, the threshold number or M may be any whole number or integer greater than (3) three. However, the threshold number or M may be any suitable number that is determined by empirical evidence, operational tests, factory setting, programmable setting or otherwise of the receiver that reliably indicates operation of the receiver in the steady state mode for one or more received channels of the composite BOC signal.

The pull-in mode is a pre-alignment state in which the receiver is attempting to align the code, phase and frequency of the local replica signal with the received composite signal to track and demodulate effectively, reliably the received composite signal. In the pull-in mode the demodulated energy may be divided between the BOC component and QBOC component of the received signal, making it more difficult to accurately, reliably recover or decode the modulation on the received composite signal. In contrast, in the steady state mode, the demodulated energy is mostly concentrated in the BOC component.

If the digital receiver portion 192, the data processor, or the combination of the decision unit 35 and the decision augmentation module 220 determine that that the receiver (e.g., one or more channels of the received composite signal) is operating in the steady state mode, the method continues with step S718. However, if the digital receiver portion 192, data processor or the combination of the decision unit 35 and the decision augmentation module 220 determine that the receiver is not operating in the steady state mode, the method continues with step S706.

In step S718, the digital receiver portion 192, the code tracking module 37 or the tracking module 200 processes BOC correlations (e.g., selected BOC correlations or steady state BOC correlations collected during sampling periods of the steady state mode) by determining a code error in accordance with a suitable early-minus-late function for the steady state mode (e.g., coherent discriminator function). Further, the digital receiver portion, the code tracking module 37 or the tracking module 200 process the BOC correlations (e.g., selected BOC correlations or other BOC correlations) by determining a carrier phase error in accordance with a Costas or Phase Locked Loop (PLL) phase error function. The BOC correlations may be collected over a single window of the correlator module 130, for example.

In one possible configuration for carrying out step S718, the digital receiver portion 192, the code tracking module 37 or the tracking module 200 selects or processes only the BOC correlations for the steady state mode and uses only a BOC error function during the steady state mode for an epoch during the steady state mode, unless a cycle slip occurs. A cycle slip occurs when there is a discontinuity in measured carrier phase or the number of measured wavelengths between a satellite and the receiver from a temporary loss of lock of the carrier tracking loop within the carrier loop module 46 or the tracking module 200.

In the steady state mode, the demodulated energy is mostly concentrated in the BOC component. Therefore, in the steady state mode the receiver, data processor, or the decision unit 35 can disregard the QBOC component of the received composite signal under such circumstances, mitigate the noise impact and thus improve the tracking accuracy of the tracking module 200. As shown in FIG. 7B, step S718 only uses the BOC correlations, identical to tracking any binary phase shift keying (BPSK) signal, to drive a code tracking module 37, and to drive the carrier tracking module 38.

In step S706, a decision unit 35, electronic data processor, or digital receiver portion 192 determines whether or not the primary amplitude exceeds (or equals) the secondary amplitude for a sampling period. For example, in step S706 does the primary amplitude exceed the secondary amplitude, or is the primary amplitude greater than or equal to the secondary amplitude? In step S706, if the primary amplitude exceeds or equals the secondary amplitude, the method continues with step S708. However, if the primary amplitude does not exceed the secondary amplitude, the method continues with step S710.

In step S708, data processor, a selector, or one or more multiplexers (e.g., second multiplexer 29 for each received channel) select a set of BOC correlations in accordance with a BOC correlation function for the sampling period if the primary amplitude exceeds or equals the secondary amplitude for the sampling period. For example, the second multiplexer 29 selects a set of BOC correlations (e.g., via the BOC selection signal 123 provided to multiplexer 29) in accordance with a BOC correlation function for the sampling period if the primary amplitude exceeds or equals the secondary amplitude for the sampling period.

In one possible configuration in step S708, data processor, a selector, or one or more multiplexers (e.g., second multiplexer 29 for each received channel) select a first correlation or first set of BOC correlations associated with or resulting from: (a) substantially prompt timing (e.g., prompt signal 117) of the first signal generator 32 with respect to the received digital signal (102) and (b) a substantially full chip window (e.g., established by the code phase window module 157) within the correlator module 130.

In step S710, if the primary amplitude is less than the secondary amplitude or if the secondary amplitude exceeds the primary amplitude, the data processor, selector, or one or more multiplexors (e.g., second multiplexer 29 for each received channel) select a set of QBOC correlations in accordance with a QBOC correlation function for current sampling period to generate the error estimations to drive the code (CD) and carrier (CR) feedback loop. In one embodiment, the zero crossing point for the QBOC correlation function is offset by approximately $$\frac{1}{4N_{BOC}}$$

against the zero crossing point for the BOC correlation function.

In one possible configuration in step S710, data processor, a selector, or one or more multiplexers (e.g., second multiplexer 29 for each received channel) select a second correlation or second set of QBOC correlations associated with or resulting from: (a) substantially prompt timing (e.g., prompt signal 117) of the first signal generator 32 with respect to the received digital signal (102) and (b) a substantially full chip window (e.g., established by the code phase window module 157) within the correlator module 130.

In the pull-in mode, step S712 follows step S708. In step S712, the digital receiver portion 192, the data tracking module 200, the code tracking module 37, or the carrier tracking module 38 process the selected BOC correlations. Step S712 may be carried out by executing one or more procedures that may be applied separately or cumulatively.

Under a first procedure for executing step S712, the data processor or data tracking module 200 determines a first code error in accordance with a first early-minus-late function.

Under a second procedure, the data processor or carrier tracking module 200 determines a first carrier frequency error in accordance with a frequency error function (e.g., first frequency error function).

Under a third procedure, the data processor or carrier tracking module 200 determines a first carrier frequency error in accordance with a dot-product, frequency error function (e.g., first frequency error function) using a prompt BOC correlation and a prompt BOC correlation of a previous epoch or previous sampling period.

Under a fourth procedure, the data processor or carrier tracking module 38 determines a first carrier phase error in accordance with a phase error function (e.g., first phase error function).

Under a fifth procedure, the data processor or carrier tracking module 38 determines a first carrier phase error in accordance with a dot-product, phase error function (e.g., first phase error function) using the prompt BOC correlation.

Under a sixth procedure, any of the above procedures of step S712 are executed if the primary amplitude exceeds the secondary amplitude for the sampling period or if the primary amplitude equals the secondary amplitude for the sampling period. Under the seventh procedure, the first early-minus-late function comprises a BOC early-minus-late function that has a chip spacing of approximately 0.4 chips.

Step S714 follows step S710. In step S714, the digital receiver portion 192, the tracking module 200, the code tracking module 37, or the carrier tracking module 38 process the selected QBOC correlations. Step S714 may be carried out by executing one or more procedures that may be applied separately or cumulatively.

Under a first procedure for executing step S714, the data processor or data tracking module 200 determines a second code error in accordance with a second early-minus-late function or another early-minus-late error function. In certain embodiments, the second early-minus-late function is distinct from the first early-minus-late function (e.g., of step S712), whereas in other embodiments that second early-minus-late function is generally uniformly offset in time or chip spacing from the first early-minus-late function.

Under a second procedure, the data processor, carrier tracking module 38, or data tracking module 200 determines a second carrier frequency error in accordance with a frequency error function (e.g., a second frequency error function).

Under a third procedure, the data processor, carrier tracking module 38, or data tracking module 200 determines a second carrier frequency error in accordance with a dot-product, frequency error function (e.g., a second frequency error function) that uses prompt QBOC correlation of a previous epoch or sampling period.

Under a fourth procedure, the data processor, carrier tracking module 38, or data tracking module 200 determines a second carrier phase error in accordance with a phase error function (e.g., second phase error function).

Under a fifth procedure, the data processor, carrier tracking module 38, or data tracking module 200 determines a second carrier phase error in accordance with a phase error function (e.g., second phase error function) that uses the prompt QBOC correlation.

Under a sixth procedure, a second (carrier) phase error function or the second early-minus-late function comprises a QBOC early-minus-late function that has a chip spacing of approximately 0.4 chips.

Under a seventh procedure, any of the above procedures of step S714 are executed if the primary amplitude is less than the secondary amplitude for the sampling period.

Step S713 follows step S712, step S714 or step S718. In step S713, the tracking module 200, the measurement generation module 39, or the receiver 11 processes the determined code error and the determined carrier phase error of the received composite signal to track the code and phase of the received composite signal for estimation of a range between a receiver antenna and satellite transmitter that transmits the received composite signal. In an alternate embodiment, the tracking module 200, the measurement generation module 39, or the receiver 11 processes the determined code error, the determined carrier phase error, and the determined carrier frequency error of the received composite signal to track the code and phase of the received composite signal for estimation of a range between a receiver antenna and satellite transmitter that transmits the received composite signal. To determine the position of the receiver, multiple ranges for multiple carriers from at least four different satellites are tracked.

Accordingly, FIG. 7B describes DDSel code tracking and DDSel carrier tracking, where the carrier tracking includes carrier frequency tracking, carrier phase tracking, or both.

Figure 7C:
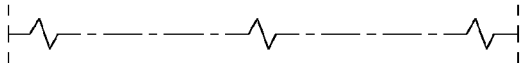
FIG. 7C (collectively FIG. 7C-1 and FIG. 7C-2) is a flow chart of yet another embodiment of a method for demodulating a received composite signal that comprises a binary offset carrier (BOC) modulated signal.
Figures 1, 7C:
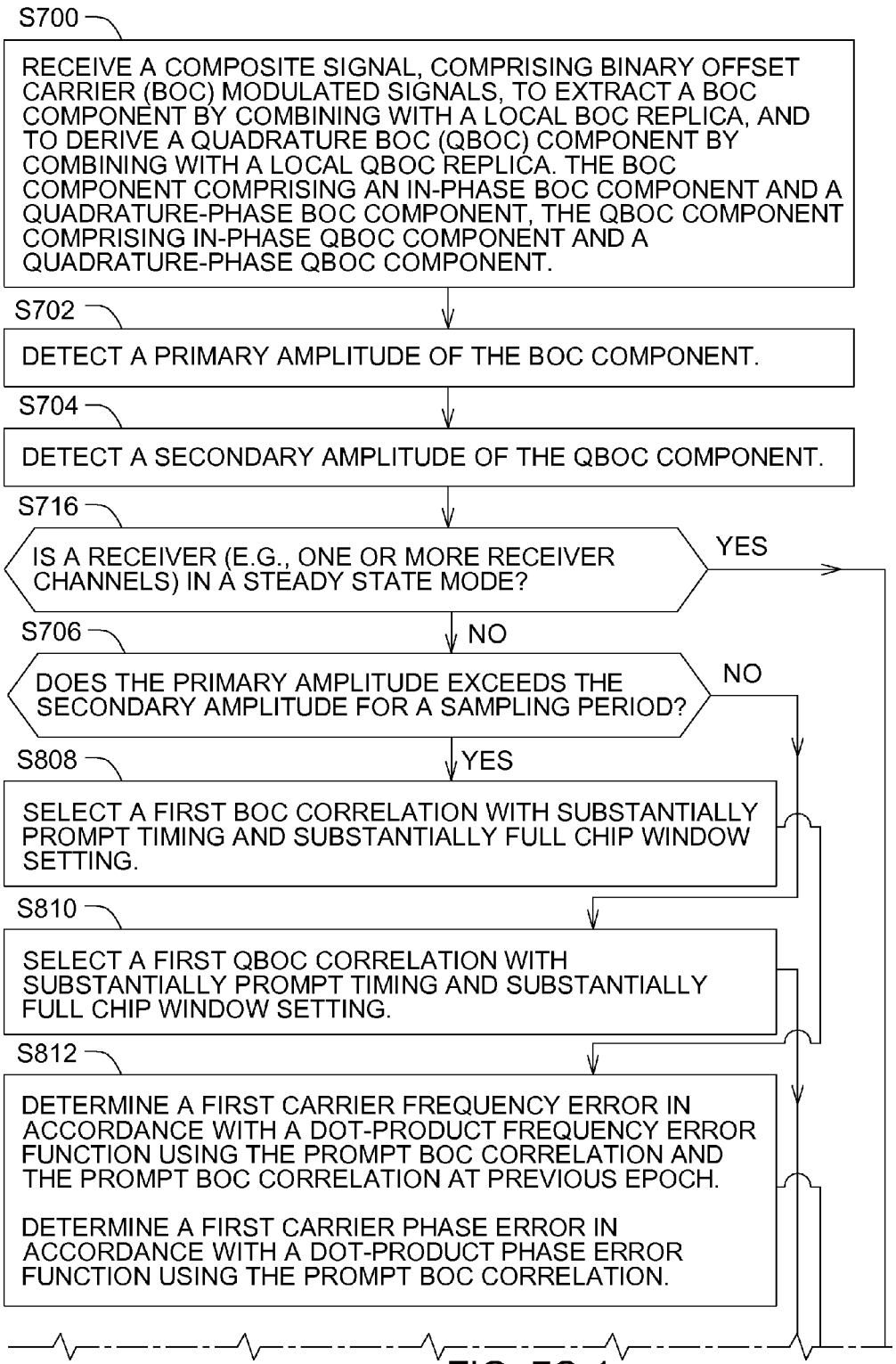
Figures 2, 7C:
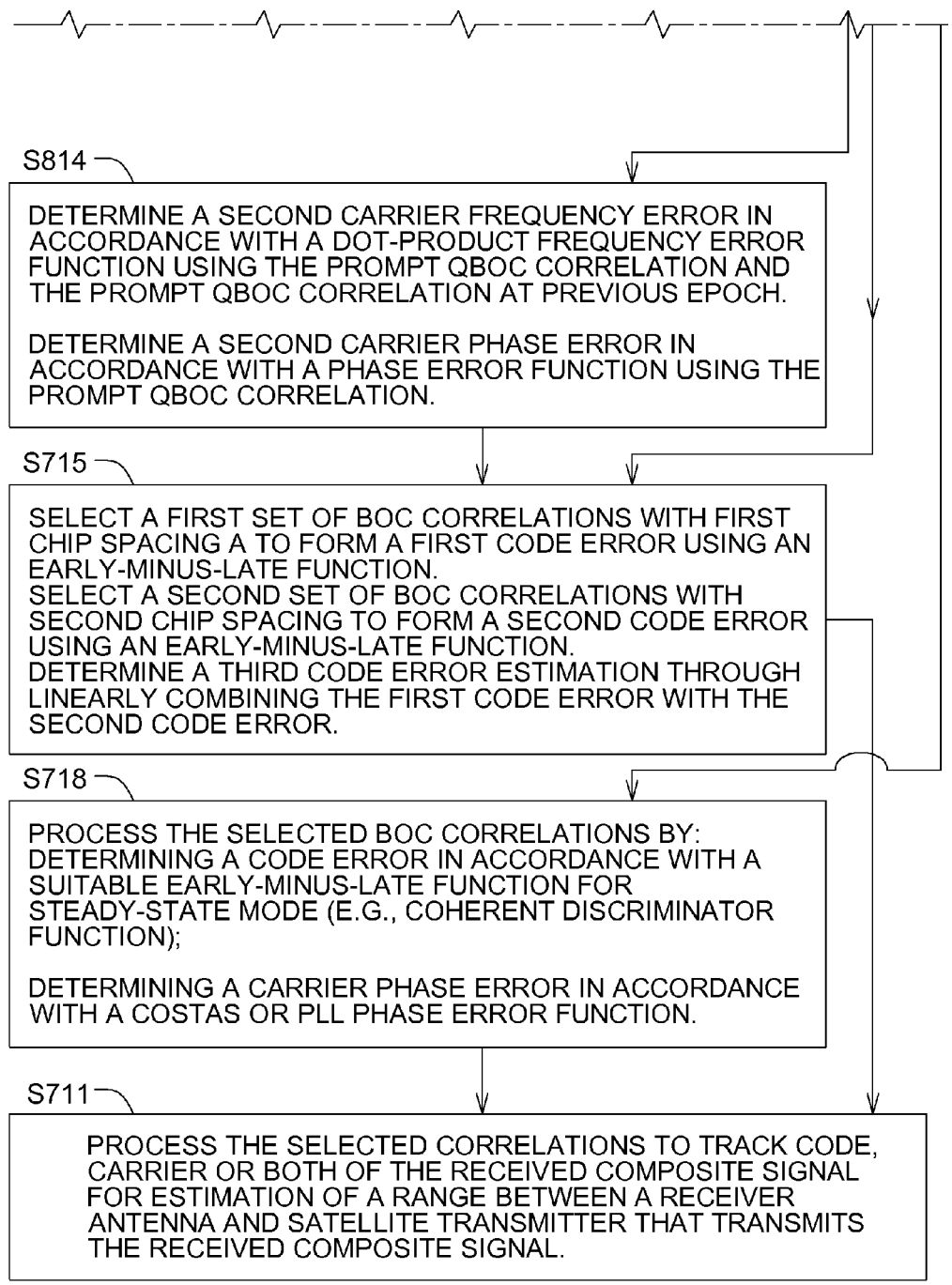

FIG. 7C refers to FIG. 7C-1 and FIG. 7C-2, collectively. FIG. 7C is a flow chart of a method for receiving a composite signal comprises a receiver for receiving a composite signal. Like reference numbers in FIG. 7A, FIG. 7B and FIG. 7C indicate like elements, steps or procedures.

The method of FIG. 7C, similar to FIG. 7B, uses decision-directed selection (DDSel) to estimate the amplitude of the signal, the carrier frequency error, and the carrier phase error. However the code error illustrated in FIG. 7C utilizes MWin-BOC method which linearly combines the two EML errors with difference chip spacing.

In FIG. 7C, the multiple window BOC (i.e., MWin-BOC) method is used for pull-in of the code error instead of using the primary amplitude and secondary amplitude to select correlations for code tracking. Under the MWin-BOC method for pull-in of the code (CD) error, the CD error estimation results from linear combination of two sets of BOC correlations, where the chip spacing for the first BOC correlations is different from that of the secondary BOC correlations and where Equation 8 describes the corresponding CD error estimation in greater detail. However, in FIG. 7C, the DDSel method is still used to drive the carrier tracking and amplitude estimation.

In FIG. 7C, steps S700, S702, S704, S716, and S706 have been described generally in conjunction with FIG. 7B. Like-designated or like-numbered steps in FIG. 7B and FIG. 7C indicate like steps or procedures. Because different steps follow steps S706 and S716 in FIG. 7C than those following steps set forth in FIG. 7B, FIG. 7C will be described beginning with steps S716 and S706.

In the illustrative example of FIG. 7C, step 716 follows step S704. In step 716, the digital receiver portion 192, the data processor, or a combination of the decision module 35 and the decision augmentation module 220 (in FIG. 3A) determines whether (or not) the receiver operates in a steady state mode.

For the received composite BOC signal, if the primary amplitude continuously exceeds the secondary amplitude for a threshold number of consecutive sampling periods or M epochs, the receiver (11) or the digital receiver portion 192 switches to or is determined to be in the steady state mode, otherwise the receiver remains in or is determined to be in the pull-in mode. The status of whether or not the receiver is in the pull-in mode or steady state mode may be determined regularly, or periodically, such as once per epoch or sampling period. In one configuration, the threshold number or M may be any whole number or integer greater than three. However, the threshold number or M may be any suitable number that is determined by empirical evidence, operational tests, factory setting, programmable setting or otherwise of the receiver that reliably indicates operation of the receiver in the steady state mode for one or more received channels of the composite BOC signal.

The pull-in mode is a pre-alignment state in which the receiver is attempting to align the code, phase and frequency of the local replica signal with the received composite signal to track and demodulate effectively, reliably the received composite signal. In the pull-in mode the demodulated energy may be divided between the BOC component and QBOC component of the received signal, making it more difficult to accurately, reliably recover or decode the modulation on the received composite signal. In contrast, in the steady state mode, the demodulated energy is mostly concentrated in the BOC component.

If the digital receiver portion 192, the data processor, or the combination of the decision unit 35 and the decision augmentation module 220 determine that that the receiver (e.g., one or more channels of the received composite signal) is operating in the steady state mode, the method continues with step S718. However, if the digital receiver portion 192, data processor or the combination of the decision unit 35 and the decision augmentation module 220 determine that the receiver is not operating in the steady state mode, the method continues with step S706.

In step S718, the digital receiver portion 192, the code tracking module 37 or the tracking module 200 processes BOC correlations by determining a code error in accordance with a suitable early-minus-late function for the steady state mode (e.g., coherent discriminator function). Further, the digital receiver portion, the code tracking module 37 or the tracking module 200 process the BOC correlations by determining a carrier phase error in accordance with a Costas or Phase Locked Loop (PLL) phase error function.

In the steady state mode of step S718, the demodulated energy is mostly concentrated in BOC component. Therefore, in the steady state mode the receiver, data processor, or the decision unit 35 can disregard the QBOC component of the received composite signal under such circumstances, mitigate the noise impact and thus improve the tracking accuracy of the tracking module 200. As shown in FIG. 7B, step S718 only uses the BOC correlations, identical to tracking any binary phase shift keying (BPSK) signal, to drive a code tracking module 37, and to drive the carrier tracking module 38.

In step S706, a decision unit 35 or electronic data processor determines whether or not the primary amplitude exceeds (or equals) the secondary amplitude for a sampling period. For example, in step S706 does the primary amplitude exceed the secondary amplitude, or is the primary amplitude greater than or equal to the secondary amplitude? Step S706 may be executed regularly or periodically, such as at each epoch or each sampling period. In step S706, if the primary amplitude exceeds or equals the secondary amplitude, the method continues with step S808. However, if the primary amplitude does not exceed the secondary amplitude, the method continues with step S810.

In step S808, data processor, a selector, or one or more multiplexers (e.g., second multiplexer 29 for each received channel) select a first correlation or first set of BOC correlations associated with or resulting from: (a) substantially prompt timing (e.g., prompt signal 117) of the first signal generator 32 with respect to the received digital signal (102) and (b) a substantially full chip window setting (e.g., established by the code phase window module 157) within the correlator module 130.

In step S810, data processor, a selector, or one or more multiplexers (e.g., second multiplexer 29 for each received channel) select a second correlation or second set of QBOC correlations associated with or resulting from: (a) substantially prompt timing (e.g., prompt signal 117) of the first signal generator 32 with respect to the received digital signal (102) and (b) a substantially full chip window setting (e.g., established by the code phase window module 157) within the correlator module 130.

In the pull-in mode, step S812 follows step S808. In step S812, the digital receiver portion 192, the data tracking module 200, or the carrier tracking module 38 process the selected BOC correlations. Step S812 may be carried out by executing one or more procedures that may be applied separately or cumulatively.

Under a first procedure for carrying out S812, the digital receiver portion 192, the data processor or carrier tracking module 200 determines a first carrier frequency error in accordance with a frequency error function (e.g., first frequency error function).

Under a second procedure, the digital receiver portion 192, the data processor or carrier tracking module 200 determines a first carrier frequency error in accordance with a dot-product, frequency error function (e.g., first frequency error function) using the prompt BOC correlation and the prompt BOC correlation of a previous epoch or previous sampling period.

Under a third procedure, the data processor or carrier tracking module 38 determines a first carrier phase error in accordance with a phase error function (e.g., first phase error function).

Under a fourth procedure, the data processor or carrier tracking module 38 determines a first carrier phase error in accordance with a dot-product, phase error function (e.g., first phase error function) using the prompt BOC correlation.

Under a fifth procedure, any of the above procedures or combination of procedures of step S812 are executed (e.g., if the primary amplitude exceeds the secondary amplitude for the sampling period or if the primary amplitude equals the secondary amplitude for the sampling period).

Under the sixth procedure, the first early-minus-late function comprises a BOC early-minus-late function that has a chip spacing of approximately 0.4 chips.

Under the seventh procedure, because the primary amplitude exceeds the secondary amplitude, in step 812 of FIG. 7C, the data processor, decision unit 35, or digital receiver portion 192 selects only the prompt BOC correlation to generate the BOC-derived carrier frequency error and carrier phase error at step 812.

Step S814 follows step S810. In step S814, the digital receiver portion 192, the tracking module 200, the code tracking module 37, or the carrier tracking module 38 process the selected QBOC correlations. Step S814 may be carried out by executing one or more procedures that may be applied separately or cumulatively.

Under a first procedure for executing step S814, the data processor, carrier tracking module 38, or data tracking module 200 determines a second carrier frequency error in accordance with a frequency error function (e.g., a second frequency error function).

Under a second procedure, the data processor, carrier tracking module 38, or data tracking module 200 determines a second carrier frequency error in accordance with a dot-product, frequency error function (e.g., a second frequency error function) that uses prompt QBOC correlation of a previous epoch or sampling period.

Under a third procedure, the data processor, carrier tracking module 38, or data tracking module 200 determines a second carrier phase error in accordance with a phase error function (e.g., second phase error function).

Under a fourth procedure, the data processor, carrier tracking module 38, or data tracking module 200 determines a second carrier phase error in accordance with a phase error function (e.g., second phase error function) that uses the prompt QBOC correlation.

Under a fifth procedure, any of the above procedures or combination of procedures of step S814 are executed (e.g., if the primary amplitude is less than the secondary amplitude for the sampling period).

Under a sixth procedure, the second early-minus-late function comprises a QBOC early-minus-late function that has a chip spacing of approximately 0.4 chips.

Under the seventh procedure, because the primary amplitude does not exceed the secondary amplitude, in step 814 of FIG. 7C, the data processor, decision unit 35, or digital receiver portion 192 selects only the prompt QBOC correlation to generate the QBOC-derived carrier frequency error and carrier phase error at step 814.

In step S715, the data processor or digital receiver portion 192: (a) selects a first set of BOC correlations with first chip spacing (e.g., approximately 0.25 chips) to form a first code error (e.g., first EML code error); (b) selects a second set of BOC correlations with a second chip spacing (e.g., approximately 0.125 chips), distinct from the first chip spacing, to form a second code error (e.g., second EML code error), and (c) linearly combines the first code error and the second code error to form a third code error or third code error estimation. Step S715 may use Equation 8, as previously set forth in this document.

Step S711 follows step S715 or step 718. In step S711, the tracking module 200, the measurement generation module 39, or the receiver 11 processes the selected correlations to track the code and carrier of the received composite signal for estimation of a range between a receiver antenna and satellite transmitter that transmits the received composite signal.

Figures 1, 2, 7D:
FIG. 7D (collectively FIG. 7D-1 and FIG. 7D-2) is a flow chart of still another embodiment of a method for demodulating a received composite signal that comprises a binary offset carrier (BOC) modulated signal.
Figures 2, 7D:
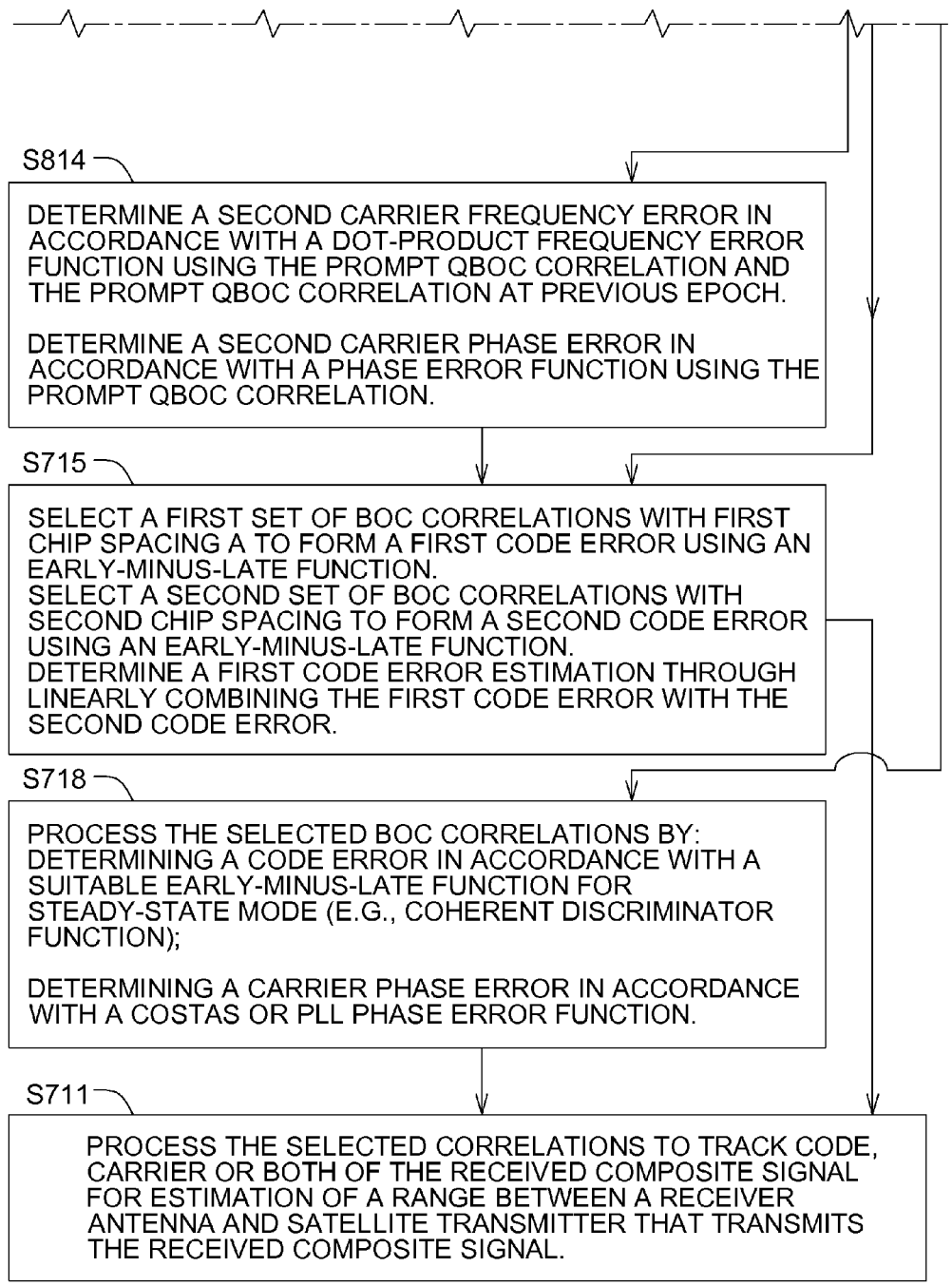

FIG. 7D refers to FIG. 7D-1 and FIG. 7D-2 collectively. Like reference numbers in FIG. 7C and FIG. 7D indicate like steps or procedures. FIG. 7C describes use of MWin-BOC for code tracking and the use of DDSel for carrier tracking. FIG. 7D is similar to FIG. 7C, except that FIG. 7D substitutes S708 and S710 for steps S808 and S810 of FIG. 7C, respectively.

In step S708, data processor, a selector, or one or more multiplexers (e.g., second multiplexer 29 for each received channel) select a set of BOC correlations in accordance with a BOC correlation function for the sampling period if the primary amplitude exceeds or equals the secondary amplitude for the sampling period. For example, the second multiplexer 29 selects a set of BOC correlations (e.g., via the BOC selection signal 123 provided to multiplexer 29) in accordance with a BOC correlation function for the sampling period if the primary amplitude exceeds or equals the secondary amplitude for the sampling period.

In step S710, if the primary amplitude is less than the secondary amplitude or if the secondary amplitude exceeds the primary amplitude, the data processor, selector, or one or more multiplexors (e.g., second multiplexer 29 for each received channel) select a set of QBOC correlations in accordance with a QBOC correlation function for current sampling period to generate the error estimations to drive the code (CD) and carrier (CR) feedback loop. In one embodiment, the zero crossing point for the QBOC correlation function is offset by approximately $$\frac{1}{4N_{BOC}}$$

against the zero crossing point for the BOC correlation function.

FIG. 8 is a graph of a BOC correlation function (e.g., for a BOC(1,1) signal) and QBOC correlation function (e.g., for a QBOC(1,1) signal) using a closed-formula representation. In FIG. 8, the vertical axis provides the correlation output or amplitude and the horizontal axis is in time (e.g., chips). The BOC correlation function (e.g., for a BOC(1,1) signal) is shown by solid line 701, whereas the QBOC correlation function (e.g., for a QBOC(1,1) signal) is shown by dashed line 702.

FIG. 9 is a graph of decision-directed selection (DDsel) amplitude derived from either the BOC or the QBOC signal components, and is representative of an aggregate correlation function (of BOC and QBOC correlations over multiple sampling periods without simultaneous use of BOC and QBOC correlations for any received channel during any single sampling period or any single epoch). An aggregate correlation function means a dual-correlation function (of BOC and QBOC correlations over multiple sampling periods, without simultaneous use of BOC and QBOC correlations for any received channel during any single sampling period or epoch), a decision-directed correlation function (of BOC and QBOC correlations over multiple sampling periods, without simultaneous selection of BOC and QBOC correlations for any received channel)), or intermittently alternating correlation functions over multiple sampling periods resulting from either BOC or QBOC correlation at each sampling period or epoch. The vertical axis represents amplitude, whereas the horizontal axis represents time in chips. For example, zero on the time axis represents a perfectly correlated BOC signal with the local replica of the BOC signal at the receiver during one or more sampling intervals, for example.

Figure 10:
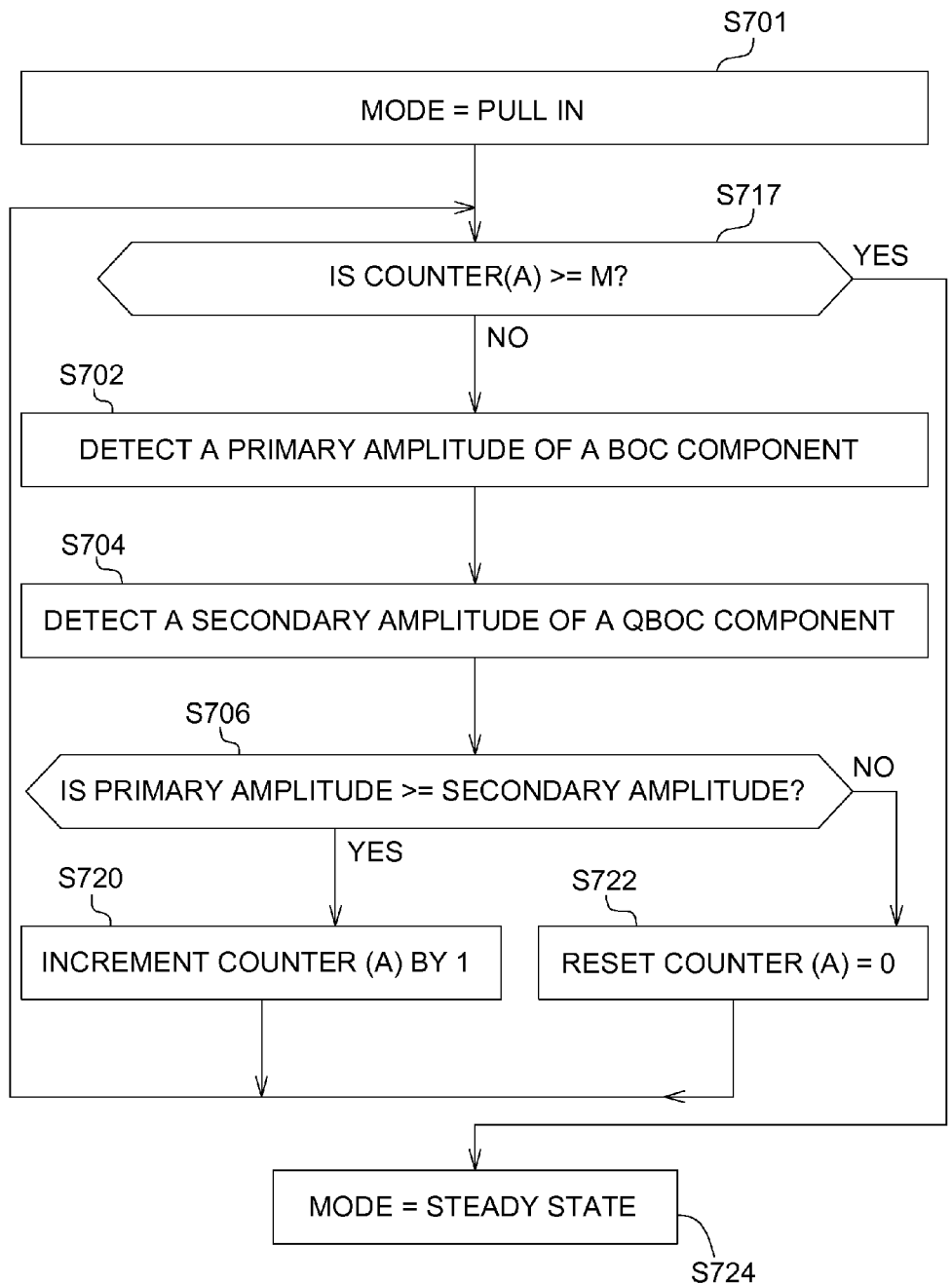
FIG. 10 is a flow chart of another embodiment of a method for receiving a received composite signal that comprises a binary offset carrier (BOC) modulated signal.

FIG. 10 illustrates a method of selecting or identifying a pull-in mode or a steady state mode for operation of any receiver, system or method described in this document. The method of FIG. 10 begins in step S701.

In step S701, a receiver is initialized, turned on or powered up and has the pull-in mode as the default or starting mode of operation. The pull-in mode is a pre-alignment state in which the receiver is attempting to align the code, phase and frequency of the local replica signal with the received composite signal to track and demodulate effectively, reliably the received composite signal. In the pull-in mode the demodulated energy may be divided between the BOC component and QBOC component of the received signal, making it more difficult to accurately, reliably recover or decode the modulation on the received composite signal. In contrast, in the steady state mode, the demodulated energy is mostly concentrated in the BOC component.

In step S717, a data processor or a digital receiver portion 192 determines if a counter value (e.g., counter A) or register (e.g., of a decision augmentation module 220 or counter) is greater than or equal to M. For the received composite BOC signal, if the primary amplitude continuously exceeds the secondary amplitude for a threshold number of consecutive sampling periods or M epochs, the receiver (11) or the digital receiver portion 192 switches to or is determined to be in the steady state mode, otherwise the receiver remains in or is determined to be in the pull-in mode. In one configuration, the threshold number or M may be any whole number or integer greater than three. However, the threshold number or M may be any suitable number that is determined by empirical evidence, operational tests, factory setting, programmable setting or otherwise of the receiver that reliably indicates operation of the receiver in the steady state mode for one or more received channels of the composite BOC signal. If the counter value is greater than or equal to M, the method continues with step S724. However, if the counter value is not greater than or equal to M, the method continues with step S702.

In step S702, a first detector 201 (e.g., in FIG. 1, FIG. 3 and FIG. 4) or data processor detects a primary amplitude of the BOC component. Step S702 may be executed in accordance with various techniques, which may be applied alternately or cumulatively.

Under a first technique, the first detector 201 or data processor detects or measures the signal energy or aggregate power of the BOC component comprising in-phase BOC component and a quadrature-phase BOC component.

Under a second technique, the first detector 201 or data processor applies the correlation $P_{BOC}^{(0,1)}$ of Equation 3 to provide an amplitude (e.g., an ideal amplitude) estimate for a BOC component of the received composite signal during a sampling period or a time interval. For example, the first detector 201 applies a correlation $P_{BOC}^{(0,1)}$ of Equation 3 to provide ideal amplitude estimation for BOC component:
$$\mathrm{Amp}(Y) = \sqrt{I\_Y^2 + Q\_Y^2},$$
where
I_Y is the in-phase BOC component, and
Q_Y is the quadrature-phase BOC component.

Under a third technique, the first detector 201 or the data processor uses the linear approximation Equation 4 to simplify or replace the calculation of Equation 3. In one embodiment, the linear approximation of Equation 4 has a bias that is acceptable and facilitates rapid estimation of the primary amplitude. Under the third technique, the estimating or detecting of the primary amplitude or the secondary amplitude (e.g., by detectors 201, 211) for the sampling period is based on the following equations that use linear approximation separately for the BOC and QBOC signal components:

$$\mathrm{Amp}^{approx}(Y) \triangleq \max(|I\_Y|, |Q\_Y|) + \mu\min(|I\_Y|, |Q\_Y|),$$

where
$Y = P_{BOC}^{W_X}$,
μ is a selected scale or a constant scaling factor (e.g., 0.5),
$W_X$ is the window size of the correlator,
I_Y is the in-phase xBOC component, and
Q_Y is the quadrature-phase xBOC component,
xBOC refers to the BOC or QBOC signal component of the received composite signal. In the above equation, for instance, the first detector 201 detects the BOC signal component and substitutes the BOC signal component for xBOC.

In step S704, a second detector 211 (in FIG. 1, FIG. 3 and FIG. 4) or the data processor detects a secondary amplitude of the QBOC component. Step S704 may be executed in accordance with various techniques, which may be applied alternately or cumulatively.

Under a first technique, the second detector 211 or data processor detects or measures the signal energy or aggregate power of the QBOC component comprising in-phase QBOC component and a quadrature-phase QBOC component.

Under a second technique, the second detector 211 or data processor applies a correlation $P_{QBOC}^{(0,1)}$ of Equation 3 to provide ideal amplitude estimation for QBOC component:
$$\mathrm{Amp}(Y) = \sqrt{I\_Y^2 + Q\_Y^2},$$
where
I_Y is the in-phase QBOC component, and
Q_Y is the quadrature-phase QBOC component.

Under a third technique, the linear approximation Equation 4 simplifies or replaces the calculation of FIG. 3. In one embodiment, the linear approximation of Equation 4 has a bias that is acceptable and facilitates rapid estimation of the primary amplitude. Under the third technique, the estimating or detecting the secondary amplitude (e.g., by the second detector 211 or data processor) for the sampling period is based on the following equations that use linear approximation separately for the QBOC signal components:

$$\mathrm{Amp}^{approx}(Y) \triangleq \max(|I\_Y|, |Q\_Y|) + \mu\min(|I\_Y|, |Q\_Y|),$$

where
$Y = P_{QBOC}^{W_X}$,
μ is a selected scale or a constant scaling factor (e.g., 0.5),
$W_X$ is the window size of the correlator,
I_Y is the in-phase QBOC component, and
Q_Y is the quadrature-phase QBOC component.

In step S706, a decision unit 35 or electronic data processor determines whether or not the primary amplitude is greater than or equal to the secondary amplitude for a sampling period. For example, in step S706 does the primary amplitude exceed the secondary amplitude? In step S706, if the primary amplitude is greater than or equal the secondary amplitude, the method continues with step S720. However, if the primary amplitude in not greater than or equal to the secondary amplitude, the method continues with step S722.

In step S722, the data processor or digital receiver portion 192 resets the counter (e.g., counter A), register or data storage device associated with the decision augmentation module 220 and then returns to step S717. For example, the data processor or digital receiver portion 192 sets the counter (e.g., counter A), register or the data storage device to zero.

In step S720, the data processor or digital receiver portion 192 increments the counter (e.g., counter A), a register or data storage device associated with the decision augmentation module 220. For example, the data processor or digital receiver portion 192 increments by one the counter (e.g., counter A), a register or data storage device associated with the decision augmentation module 220.

The methods of FIG. 11 through FIG. 14, inclusive, may incorporate by reference techniques, processes, features or elements from any other methods or systems disclosed in this document. For example, any method in FIG. 11 through FIG. 14, inclusive, may incorporate one or more embodiments or variations of any similar steps disclosed in FIG. 7A through FIG. 10 and the accompanying text. Like reference numbers shall refer to like elements in all drawings. As the context requires, like terminology can refer to like elements or features in the drawings.

Figure 11:
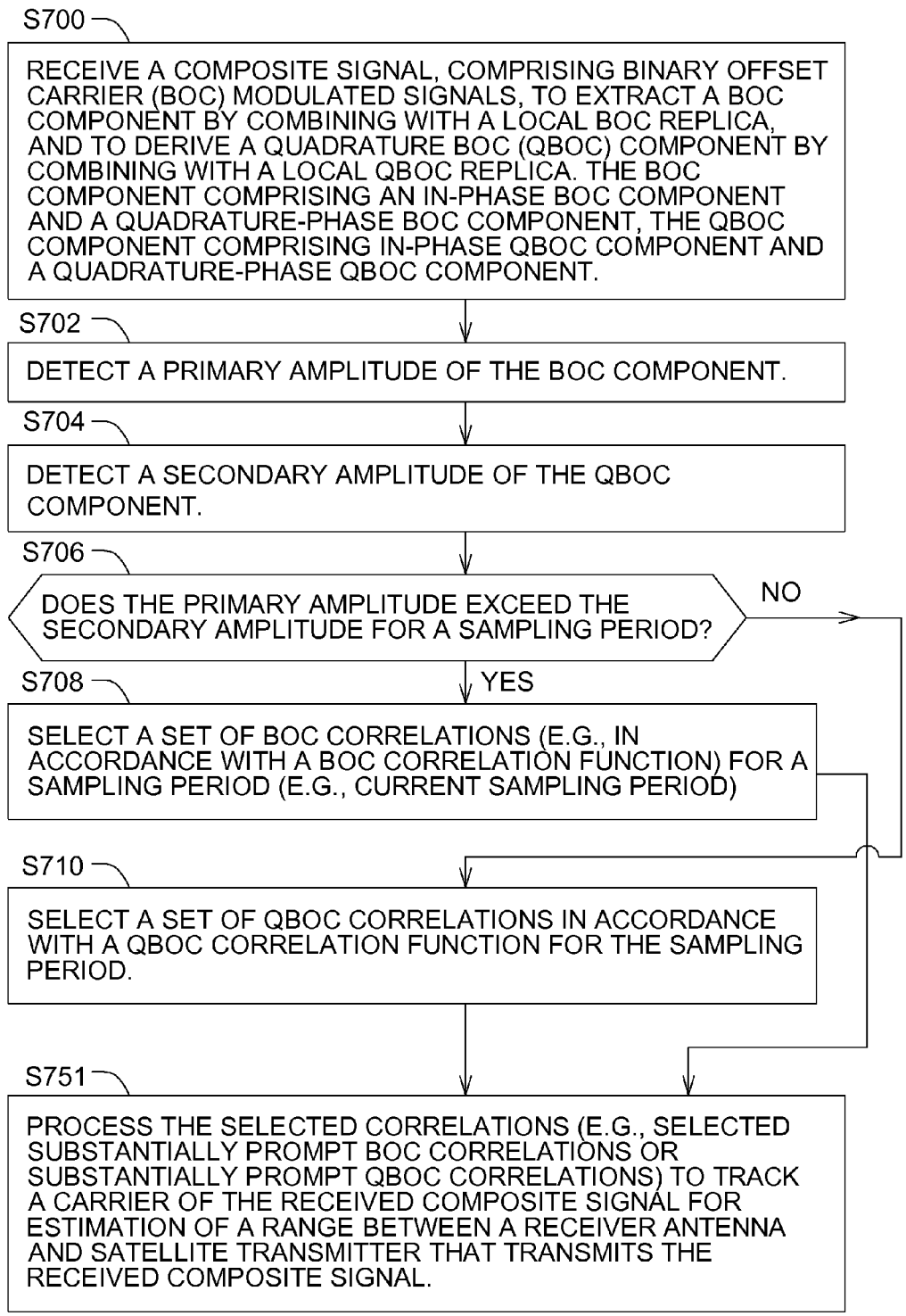
FIG. 11 is one embodiment of a method for receiving a composite signal.

FIG. 11 discloses a method of receiving a composite signal. The method of FIG. 11 is similar to the method of FIG. 7A, except the method of FIG. 11 replaces step S711 with S751. Like reference numbers in FIG. 7A and FIG. 11 indicate like steps or procedures.

Step S751 may be executed after step S708 or S710. In step S751, the data processor or digital receiver portion 192 processes the selected correlations (e.g., selected substantially prompt BOC correlations or substantially prompt QBOC correlations) to track a carrier of the received composite signal for estimation of a range between a receiver antenna and a satellite transmitter that transmits the received composite signal.

Figures 1, 2, 12:
FIG. 12 (collectively FIG. 12-1 and FIG. 12-2) is another embodiment of a method for receiving a composite signal.
Figures 2, 12:
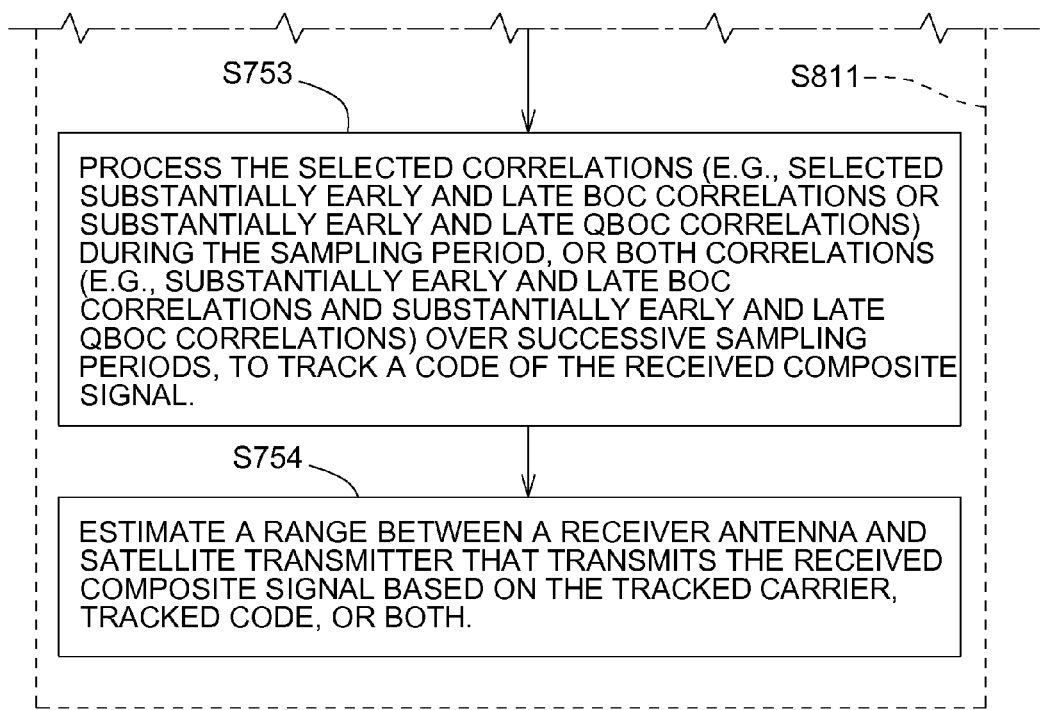

FIG. 12 discloses a method of receiving a composite signal. FIG. 12 refers to FIG. 12-1 and FIG. 12-2 collectively. The method of FIG. 12 is similar to the method of FIG. 7A, except the method of FIG. 12 replaces step S711 with step S811. Step S811 comprises steps S752, S753 and S754. Like reference numbers in FIG. 7A and FIG. 12 indicate like steps or procedures.

In step S752, the data processor or digital receiver portion 192 processes the selected correlations (e.g., selected substantially prompt BOC correlations or substantially prompt QBOC correlations) during the sampling period, or both correlations (e.g., substantially prompt BOC and QBOC correlations) over successive sampling periods, to track a carrier of the received composite signal. For example, the data processor or digital receiver portion 192 processes a first subset of the selected set of correlations to track a carrier of the received composite signal for estimation of a range between a receiver antenna and satellite transmitter that transmits the received composite signal. In one embodiment, the first subset comprises the prompt BOC correlation or the prompt QBOC correlation.

In step S753, the data processor or digital receiver portion 192 processes the selected correlations (e.g., selected substantially early and late BOC correlations or substantially early and late QBOC correlations) during the sampling period, or both correlations (e.g., substantially early and late BOC correlations and substantially early and late QBOC correlations) over successive sampling periods, to track a code of the received composite signal. For example, the data processor or digital receiver portion 192 processes a second subset of the selected correlations during the sampling period. The second subset comprises a BOC pair of an early BOC correlation and a late BOC correlation, or QBOC pair of a respective early QBOC correlation and a respective late QBOC correlation, where each of the pairs of the correlations has a first chip spacing to drive the code tracking. The data processor or digital receiver portion 192 is capable of processing the second subset of the selected set of correlations to form a first code error.

In step S754, the data processor or digital receiver portion 192 estimates a range between a receiver antenna and satellite transmitter that transmits the received composite signal based on the tracked carrier, the tracked code, or both.

As indicated by the dashed lines, steps S752, S753 and S754 may be collectively labeled as step S811. In certain embodiments, step S811 is somewhat similar to step S711 of FIG. 7A and aspects or features of S711 may be applied to step S811.

Figures 1, 13:
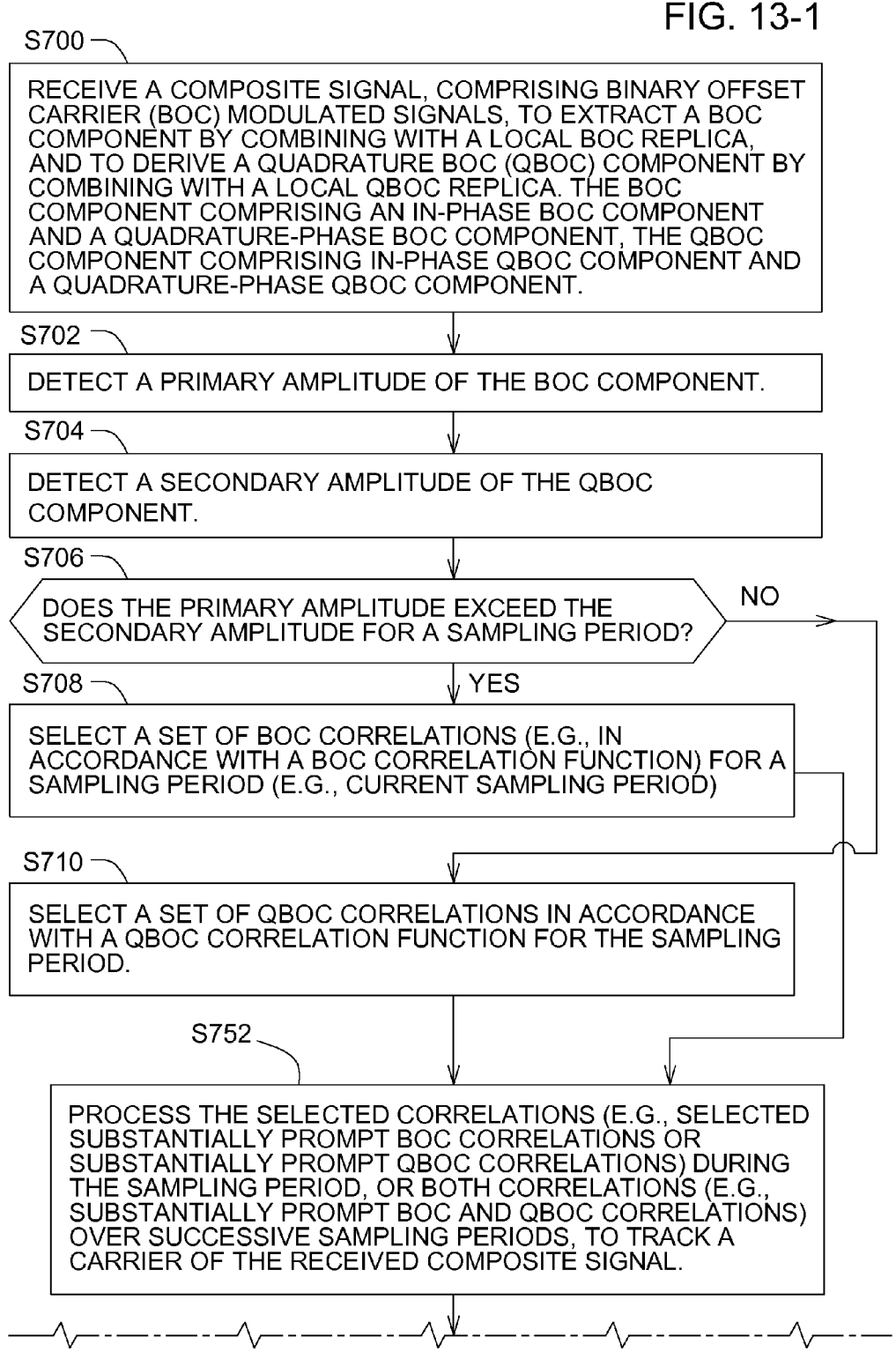
FIG. 13 (collectively FIG. 13-1 and FIG. 13-2) is yet another embodiment of a method for receiving a composite signal.
Figures 2, 13:
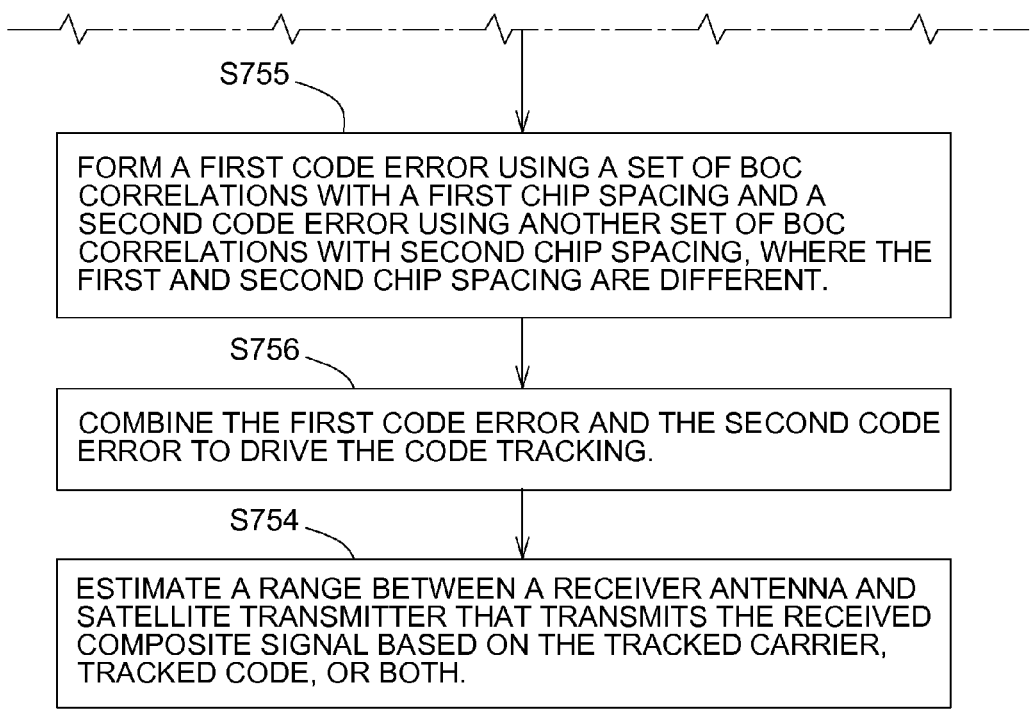

FIG. 13 discloses a method of receiving a composite signal. FIG. 13 refers to FIG. 13-1 and FIG. 13-2, collectively. The method of FIG. 13 is similar to the method of FIG. 7A, except the method of FIG. 13 replaces step S711 with steps S752, S755, S756, and S754. Like reference numbers in FIG. 7A, FIG. 12 and FIG. 13 indicate like steps or procedures.

In step S752, the data processor or digital receiver portion 192 processes the selected correlations (e.g., selected substantially prompt BOC correlations or substantially prompt QBOC correlations) during the sampling period, or both correlations (e.g., substantially prompt BOC and QBOC correlations) over successive sampling periods, to track a carrier of the received composite signal.

In step S755, the data processor or digital receiver portion 192 forms a first code error using a set of BOC correlations with a first chip spacing and a second code error using another set of BOC correlations with a second chip spacing, where the first and the second chip spacings are different. In one embodiment, the first chip spacing is within a range of approximately 0.25 chips to approximately 0.5 chips. In one embodiment, the second chip spacing is within a range of approximately 0.125 chips to approximately 0.25 chips.

In step S756, the data processor or the digital receiver portion 192 combines the first code error and the second code error (e.g., into a third code error) to drive the code tracking.

In step S754, the data processor or digital receiver portion 192 estimates a range between a receiver antenna and satellite transmitter that transmits the received composite signal based on the tracked carrier, the tracked code, or both.

FIG. 14 discloses a method of receiving a composite signal. The method of FIG. 14 starts in step S700. Like references in FIG. 14 and other drawings indicate like elements, steps or procedures.

In step S700, a receiver 11 (e.g., satellite navigation receiver) or a digital receiver portion 192 receives a binary offset carrier (BOC) modulated signals to extract a BOC component by mixing or combining with a local BOC replica, and to derive a quadrature BOC (QBOC) component by combining with a local QBOC replica. In one embodiment, the BOC component comprises an in-phase BOC component and a quadrature-phase BOC component and the QBOC component comprises in-phase QBOC component and a quadrature-phase QBOC component. For example, the receiver 11 comprises a code mixer 42 (FIG. 1) for mixing or combining the BOC signal with the local BOC or QBOC replica from one or more signal generators (e.g., multiplexed output of a first signal generator 32 and second signal generator 31).

In step S702, a first detector 201 (e.g., in FIG. 1, FIG. 3 and FIG. 4) or data processor detects a primary amplitude of the BOC component during a sampling period or interval. Step S702 may be executed in accordance with various techniques, which may be applied alternately or cumulatively, as more fully described in conjunction with FIG. 7A.

In step S716, the data processor or digital receiver portion 192 determines if a receiver is in a steady-state mode. Step S716 may be executed in accordance with various techniques, which may be applied alternatively or cumulatively.

Under a first technique, the data processor or digital receiver portion 192 determines that the receiver is operating in a steady-state mode if the detected primary amplitude equals or exceeds a threshold amplitude value over one or more sampling periods (e.g., over one or more previous sampling periods prior to a current sampling period.) For instance, the threshold amplitude value may be based on the primary amplitude or signal strength of the received signal that indicates a majority or most of the energy of the received signal lies within the BOC component versus the QBOC component for a sampling period.

Under a second technique, the data processor or digital receiver portion 192 determines that receiver is operating in the steady-state mode by determining that the primary amplitude is continuously greater than the secondary amplitude for equal to or greater than a threshold duration, wherein the steady-state mode is mutually exclusive to a pull-in mode. The threshold duration may equal one or more sampling periods or epochs or may comprise a generally continuous duration of sampling periods or epochs in which the primary amplitude is greater than the secondary amplitude.

In step S716 if the receiver is in a steady-state mode, the method continues with step S708. However, if the receiver is not in the steady-state mode or is in the pull-in mode, the method continues with step S801.

In step S708, the data processor or digital receiver portion 192 selects a set of BOC correlations (e.g., in accordance with a BOC correlation function) for a sampling period (e.g., current sampling period).

In step S801, the data processor or digital receiver portion 192 selects BOC or QBOC correlations that correspond to the signal component of the received composite signal with the greatest amplitude during a sampling period or with a greatest amplitude (e.g., mean or average amplitude) over one or more previous sampling periods.

In step S802, the data processor or digital receiver portion 192 processes the selected correlations (e.g., BOC correlations for steady state mode, or BOC or QBOC correlations for pull-in mode) during the sampling period to track a carrier of the received composite signal.

In step S803, the data processor or digital receiver portion 192 forms a first code error using the selected correlations (e.g., BOC correlations for steady-state mode, or BOC or QBOC correlations for pull-in mode) with a first chip spacing to drive the code tracking.

In step S754, the data processor or digital receiver portion 192 estimates a range between a receiver antenna and satellite transmitter that transmits the received composite signal based on the tracked carrier, the tracked code, or both.

The method and system disclosed in this document uses a decision-directed selection (DDSel). Under the decision-directed selection, the method and system of this disclosure uses the either BOC or QBOC terms, whichever component retains more signal energy to process both code and carrier acquisition or pull in, instead of using both BOC and QBOC. Because the method and system of this disclosure uses decision directed selection (DDSel), the method and system is well suited for reducing computational load as it either processing BOC or QBOC terms based on the selection, as opposed to processing both BOC and QBOC terms. In the method and system disclosed in this document, DDSel can promptly, reliably select the proper BOC or QBOC processing to acquire or pull-in the BOC signal at the receiver, where a wide correlator can employ a half-chip spacing delay line during pull-in or acquisition because of the absence of zero crossing points in the aggregate correlation function. Further, DDSel supports unambiguous determination of frequency error and phase error by eliminating or reducing their dependency on the code error through using dot-product carrier error function. DDSel uses an unambiguous DDSel frequency error term for carrier pull in or acquisition of the received signal. The method and system is well suited for providing faster pull-in performance than certain prior art because uses the error component (BOC or QBOC error component) with better signal-to-noise ratio (SNR), which helps to reduce the loop measurement fluctuation resulting from the noise.

For the input of BOC(m,n) or QBOC(m,n), the DDSel technique can apply within context of a wide correlator, a narrow correlator, a window correlator, or an combination of the foregoing correlators. DDSel can constrain the window/chip spacing to pull in or acquire the code of the received signal. DDSel uses envelope amplitude estimation to determine how to process the received signal in accordance with alternate BOC or QBOC processing paths. The method and system disclosed in this document can simplify the amplitude estimation with an approximation equation, as previously explained. In certain configurations, such as with the use of the above approximation equation, DDSel is capable of providing amplitude detection speed that is commensurate with a received BOC signal input applied to a half-chip spacing delay line.

An alternate embodiment of a method for receiving the composite signal combines two BOC early-minus-late code errors with different chip spacing to drive the code tracking. Under such an alternate operating mode, however, DDSel still provides the carrier tracking and amplitude estimation.

In another alternate embodiment, receiver operation mode can be switched from DDSel for acquisition mode, to single-window BOC (SWin-BOC) for lock in or post acquisition mode.

Having described the preferred embodiment, it will become apparent that various modifications can be made without departing from the scope of the invention as defined in the accompanying claims.

The following is claimed:

1. A method for receiving a received composite signal, the method comprising:
   receiving a composite signal, comprising binary offset carrier (BOC) modulated signals, to extract a BOC component by combining with a local BOC replica, and to derive a quadrature BOC (QBOC) component by combining with a local QBOC replica, the BOC component comprising an in-phase BOC component and a quadrature-phase BOC component, the QBOC component comprising in-phase QBOC component and a quadrature-phase QBOC component;
   detecting a primary amplitude of the BOC component;
   determining that a satellite receiver is operating in a steady-state mode by evaluating the detected primary amplitude;
   selecting a set of BOC correlations for a current sampling period if the satellite receiver is operating in the steady-state mode;
   processing the selected BOC correlations during the sampling period to track a carrier of the received composite signal;
   forming a first code error using the selected BOC correlations with a first chip spacing to drive code tracking; and
   estimating a range between a receiver antenna and a satellite transmitter that transmits the received composite signal.

2. The method according to claim 1 wherein the selecting of the BOC correlations comprises selecting a plurality of early, prompt and late BOC correlations for the sampling period; wherein the processing of the selected BOC correlations comprises processing of the selected prompt BOC correlations; and wherein forming of the first code error comprises using the early and late BOC correlations to form the first code error function.

3. The method according to claim 1 wherein the processing the selected BOC correlations further comprises tracking a carrier phase and frequency of the carrier.

4. The method according to claim 1 wherein the determining that a satellite receiver is operating in a steady-state mode by evaluating the detected primary amplitude over one or more previous sampling periods prior to a current sampling period to determine whether the detected primary amplitude exceeds a threshold amplitude value over one or more sampling periods.

5. The method according to claim 1 wherein the determining that the satellite receiver is operating in the steady-state mode comprises determining that the primary amplitude is continuously greater than the secondary amplitude for equal to or greater than a threshold duration, wherein the steady-state mode is mutually exclusive to a pull-in mode.

6. The method according to claim 1 further comprising:
    detecting a secondary amplitude of the QBOC component if the satellite receiver is not operating in the steady-state mode or is operating in the pull-in mode for a sampling period;
    selecting the BOC correlations for the sampling period if the primary amplitude equals or exceeds the secondary amplitude for the sampling period;
    selecting the QBOC correlations for the sampling period if the secondary amplitude is greater than the primary amplitude.

7. The method according to claim 1 wherein the set of BOC correlations is modeled by the following equation to form a first error function or first-early minus late function:

$$TAP_{BOC}^{W_X} = AW_X \sum_{i=0, di=F_{Chip}/F_S}^{N_{Chip}} \left\{ \begin{array}{c} c_i c_{i-\tau} \cdot \\ \sin(2\pi N_{BOC} i)\sin(2\pi N_{BOC}(i-\tau)) \cdot \\ e^{j\delta\theta_i} \end{array} \right\}$$

$$= \frac{A}{2} W_X R(\tau) \cos(2\pi N_{BOC}\tau) e^{j\delta\varphi}$$

$$= \underbrace{\frac{A}{2} W_X R(\tau) \cos(2\pi N_{BOC}\tau) \cos\delta\varphi}_{I\_TAP_{BOC}^{W_X}} + \underbrace{j\frac{A}{2} W_X R(\tau) \cos(2\pi N_{BOC}\tau) \sin\delta\varphi}_{Q\_TAP_{BOC}^{W_X}},$$

where
 $TAP_{BOC}^{W_X}$ is the correlation based on the BOC input and BOC local replica with a selection of PN TAP, where PN TAP can be early, prompt or late,
 i is chip phase in unit of chips,
 $N_{Chip}$ is number of chips per millisecond,
 di is sample phase increment in unit of chips,
 A is the amplitude of signal at level of millisecond integration,
 $W_X$ is the window size in chips,
 $N_{BOC}$ is equal to m/n of BOC (m,n), where m is $f_m/f_c$ and n is $f_n/f_c$, $f_m$ is a first subcarrier frequency, $f_n$ is the actual chip frequency, and $f_c$ is the reference chipping rate,
 $F_{Chip}$ is the chipping rate in chips/second,
 $F_S$ is the sampling rate in samples/second,
 $R(\tau)$ is the correlation function for PN code,
 $\tau$ is the chip phase error estimated at receiver side,
 $\delta\theta_i$ is the carrier phase estimation error for each sample,
 $\delta\varphi$ is the average carrier phase estimation error over $N_{Chip}$ period,
 $I\_TAP_{BOC}^{W_X}$ is the in-phase or real part of $TAP_{BOC}^{W_X}$, and
 $I\_TAP_{BOC}^{W_X}$ is the quadrature or imaginary part of $TAP_{BOC}^{W_X}$.

8. The method according to claim 1 wherein the primary amplitude comprises the combined signal power of the BOC in-phase component and the BOC quadrature phase component.

9. The method according to claim 1 further comprising
    forming a first code error using a set of BOC correlations with a first chip spacing and a second code error using another set of BOC correlations with a second chip spacing, and combining the first code error and the second code error to drive the code tracking in accordance with the following composite error function:

$$\tau_{MWin-BOC} = \alpha \frac{|P_{BOC}^{(0,Wa)}| - |P_{BOC}^{(1-Wa,1)}|}{A_{DDSet}} + \beta \frac{|P_{BOC}^{(0,Wb)}| - |P_{BOC}^{(1-Wb,1)}|}{A_{DDSet}}$$

where
 $\alpha$ is the linear gain applied on the first BOC-derived code error estimation with window Wa,
 $\beta$ is the linear gain applied on the secondary BOC-derived code error estimation with window Wb.

10. A system for receiving a received composite signal, the system comprising:
    a receiver front end for receiving a composite signal comprising binary offset carrier (BOC) modulated signals;
    a first signal generator for generating a chip replica for any sampling period;
    a second signal generator for generating a local BOC replica or a quadrature BOC replica for any sampling period;
    an electronic data processor adapted to extract a BOC component by combining the received signal with the local BOC replica and to derive a quadrature BOC (QBOC) component by combining the received signal with the local QBOC replica, the BOC component comprising an in-phase BOC component and a quadrature-phase BOC component, the QBOC component comprising in-phase QBOC component and a quadrature-phase QBOC component;
    a first detector for detecting a primary amplitude of the BOC component;
    an evaluator of the data processor determining whether the primary amplitude is operating in a steady-state mode by evaluating the detected primary amplitude;
    a selector of the data processor for selecting a primary set of BOC correlations in accordance with a BOC correlation function for the sampling period if the receiver is operating in the steady-state mode;
    a tracking module of the electronic data processor for processing the selected correlations to track a carrier of the received composite signal;
    a data processor for forming a first code error using the primary set of BOC correlations with a first chip spacing; and
    a data processor for estimating a range between a receiver antenna and satellite transmitter that transmits the received composite signal.

11. The system according to claim 10 further comprises:
    a second detector for detecting a secondary amplitude of the QBOC component; and
    an evaluator of the data processor determining whether the primary amplitude exceeds the secondary amplitude for a sampling period.

12. The system according to claim 11 wherein the selector is adapted to select a set of QBOC correlations in accordance with a QBOC correlation function for the sampling period if the secondary amplitude exceeds the primary amplitude for the sampling period wherein the selected xBOC correlations with greater amplitude supports unambiguous code acquisition of the received signal; where xBOC means BOC or QBOC.

13. The system according to claim 11 wherein the data processor is adapted to form adapted to form a second code error using secondary set of BOC correlations with a second chip spacing, distinct from the first chip spacing, and the data processor adapted to combine the first code error and the second code error to drive the code tracking.

\* \* \* \* \*